US011919261B2

(12) United States Patent
Ahn et al.

(10) Patent No.: US 11,919,261 B2
(45) Date of Patent: Mar. 5, 2024

(54) AUTOMATED REMOVAL APPARATUS, SYSTEM, AND METHOD FOR SELECTIVELY REMOVING TRIMMED PORTIONS OF A LAMINATED PLY IN A PLY-BY-PLY FABRICATION PROCESS

(71) Applicant: The Boeing Company, Chicago, IL (US)

(72) Inventors: Jonathan Y. Ahn, Seattle, WA (US); Chace Wilcoxson, Kent, WA (US); Lisa C. Carlson, Auburn, WA (US); Gregory R. Klempel, Seattle, WA (US); Austin T. McAnelly, Snohomish, WA (US); Deborah A. Fisher, Renton, WA (US); Scott E. Krajca, Seattle, WA (US)

(73) Assignee: The Boeing Company, Arlington, VA (US)

( * ) Notice: Subject to any disclaimer, the term of this patent is extended or adjusted under 35 U.S.C. 154(b) by 498 days.

(21) Appl. No.: 17/337,344

(22) Filed: Jun. 2, 2021

(65) Prior Publication Data
US 2021/0394466 A1 Dec. 23, 2021

Related U.S. Application Data

(60) Provisional application No. 63/043,099, filed on Jun. 23, 2020.

(51) Int. Cl.
*B25J 15/06* (2006.01)
*B25J 11/00* (2006.01)
(Continued)

(52) U.S. Cl.
CPC ......... *B29C 70/545* (2013.01); *B25J 15/0641* (2013.01); *B25J 15/065* (2013.01);
(Continued)

(58) Field of Classification Search
CPC .................. B29C 70/545; B29C 70/30; B29C 2793/0027; B29C 31/08; B29C 70/38;
(Continued)

(56) References Cited

U.S. PATENT DOCUMENTS 4,978,417 A 12/1990 Grimshaw et al.
5,183,252 A 2/1993 Wolber et al.
(Continued)

FOREIGN PATENT DOCUMENTS

EP 1367165 A1 * 12/2003
WO 9800356 A1 1/1998

OTHER PUBLICATIONS

EP1367165A1 Machine Translation of Description (Year: 2023).*
(Continued)

*Primary Examiner* — Cynthia L Schaller

(57) ABSTRACT

There is provided an automated removal apparatus for selectively removing one or more trimmed portions of a laminated ply in a ply-by-ply fabrication process. The automated removal apparatus includes a rotatable reel having a plurality of retractable vacuum panels attached around the rotatable reel. Each retractable vacuum panel has one or more retractable vacuum pad assemblies, and each retractable vacuum pad assembly has a vacuum pad with a vacuum port and a self-sealing valve. The automated removal apparatus further includes actuator assemblies attached to the plurality of retractable vacuum panels, friction reducing elements attached around the rotatable reel, a drive assembly attached to the rotatable reel, and a pneumatic system attached to the rotatable reel and including a valve manifold operable to control an air flow to the actuator assemblies and to one or more vacuum generators to generate a vacuum flow.

20 Claims, 25 Drawing Sheets

(51) Int. Cl.
*B29C 70/30* (2006.01)
*B29C 70/54* (2006.01)
*B65G 47/91* (2006.01)

(52) U.S. Cl.
CPC .......... *B25J 15/0691* (2013.01); *B29C 70/30* (2013.01); *B65G 47/91* (2013.01); *B25J 11/005* (2013.01); *B29C 2793/0027* (2013.01)

(58) Field of Classification Search
CPC .. B25J 15/0641; B25J 15/065; B25J 15/0691; B25J 11/005; B25J 15/0057; B25J 15/0616; B65G 47/91; B65G 29/02; B65G 47/848; B65H 2406/343; B65H 2406/345; B65H 2406/3661; B65H 5/08; B32B 38/0004; B26D 7/18
See application file for complete search history.

(56) References Cited

U.S. PATENT DOCUMENTS

| | | | |
|---|---|---|---|
| 8,048,261 | B2 | 11/2011 | McCowin |
| 8,424,583 | B2 | 4/2013 | McCowin |
| 2008/0080962 | A1 | 4/2008 | Holtmeier |
| 2011/0192545 | A1* | 8/2011 | McCowin ............. B29C 70/386 156/511 |
| 2014/0290864 | A1* | 10/2014 | Ahn ....................... H10K 71/18 156/759 |
| 2016/0122136 | A1* | 5/2016 | Sardella ................. B65H 5/228 406/70 |
| 2020/0379429 | A1* | 12/2020 | Cook .................... B23Q 17/007 |

OTHER PUBLICATIONS

Extended European Search Report (EESR), European Patent Office, dated Nov. 22, 2021, for Application No. EP21177346.0, Applicant The Boeing Company, 10 pages.

* cited by examiner

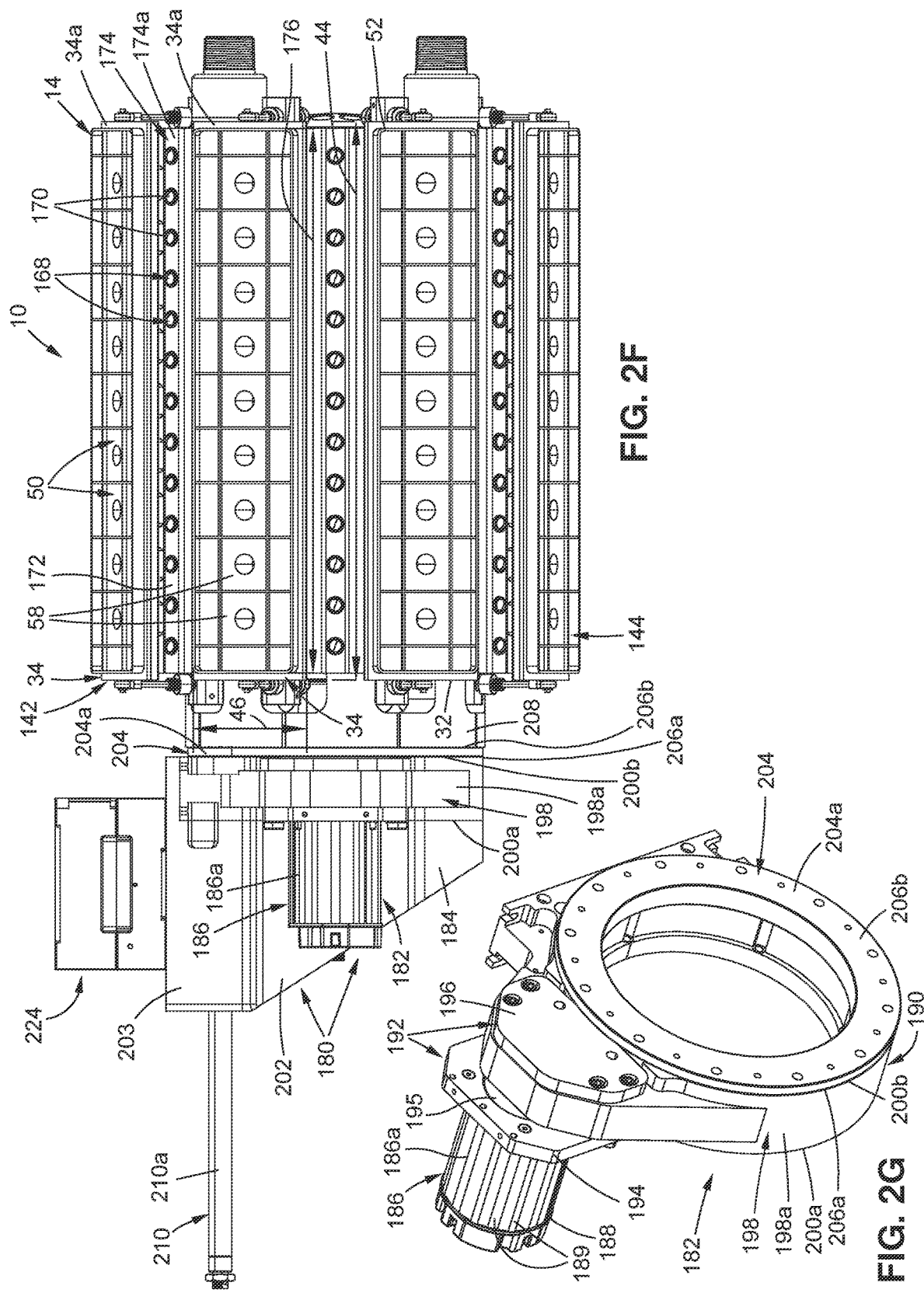

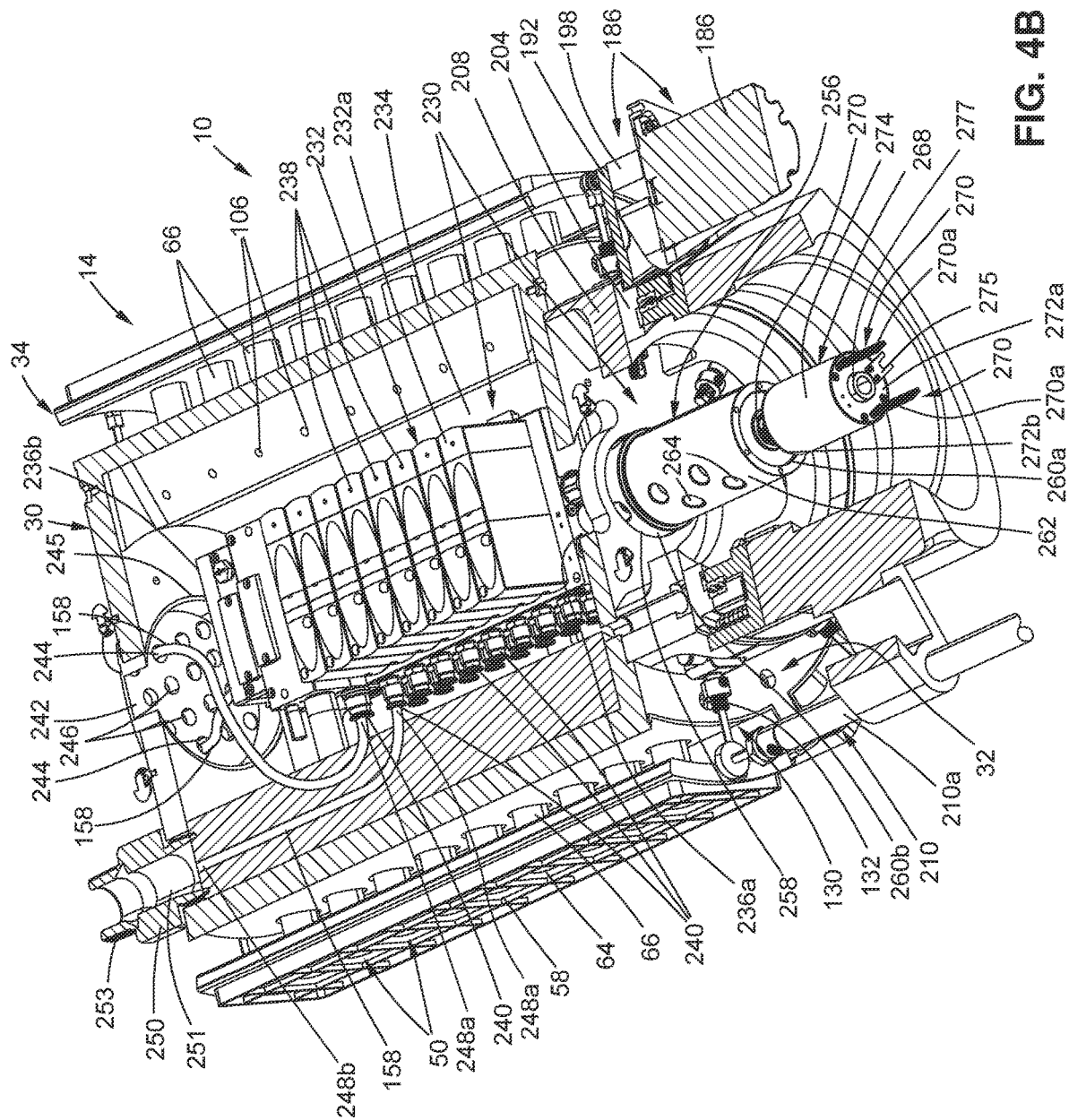

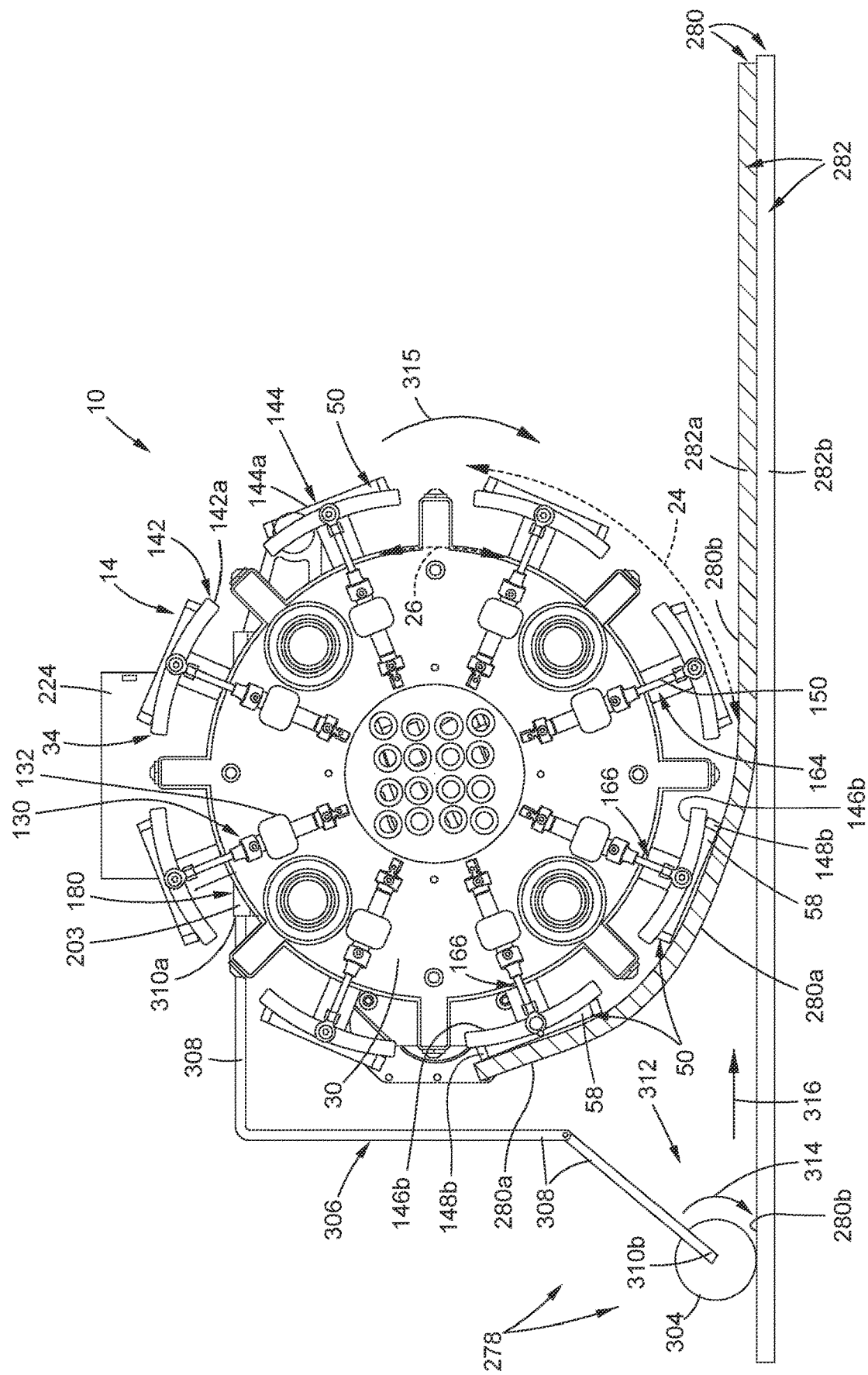

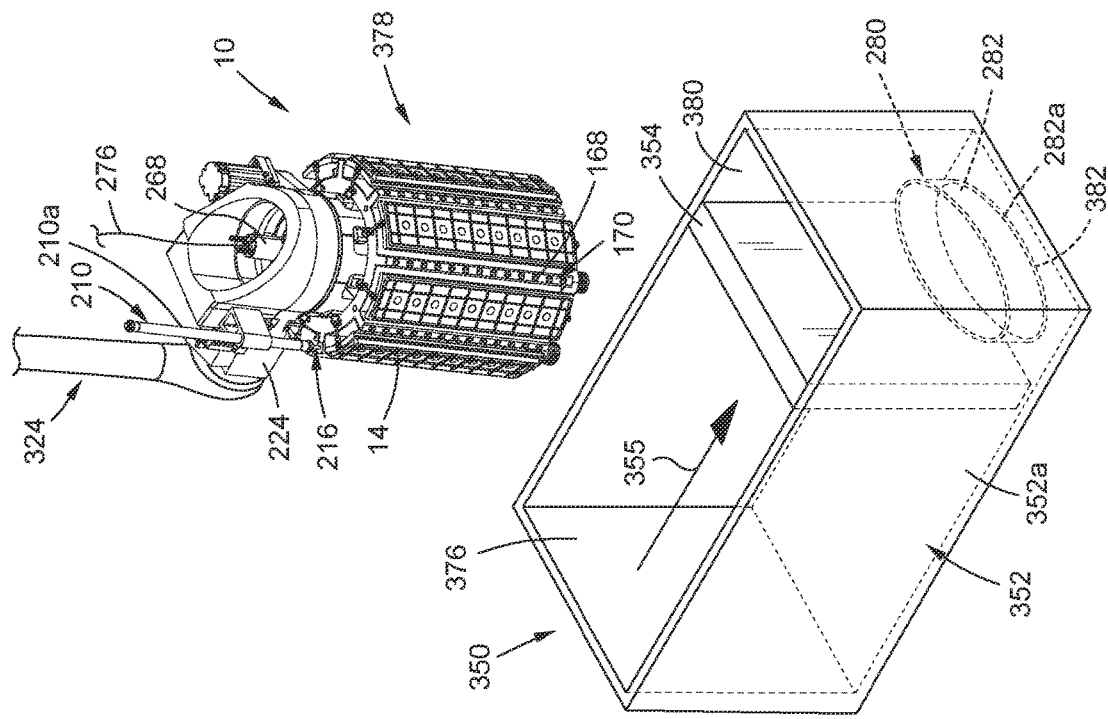
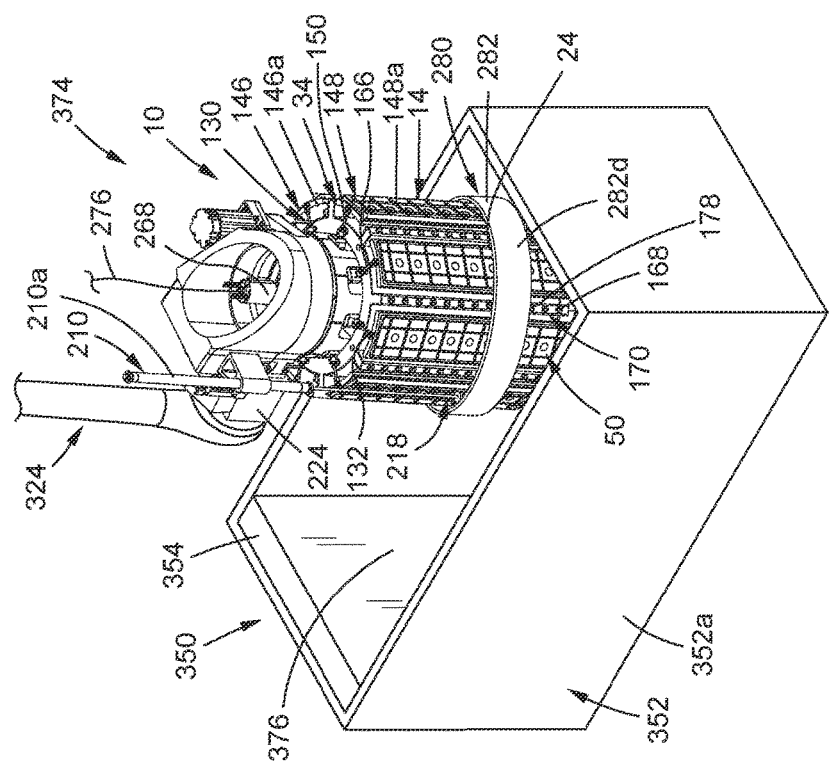
FIG. 11A
FIG. 11B

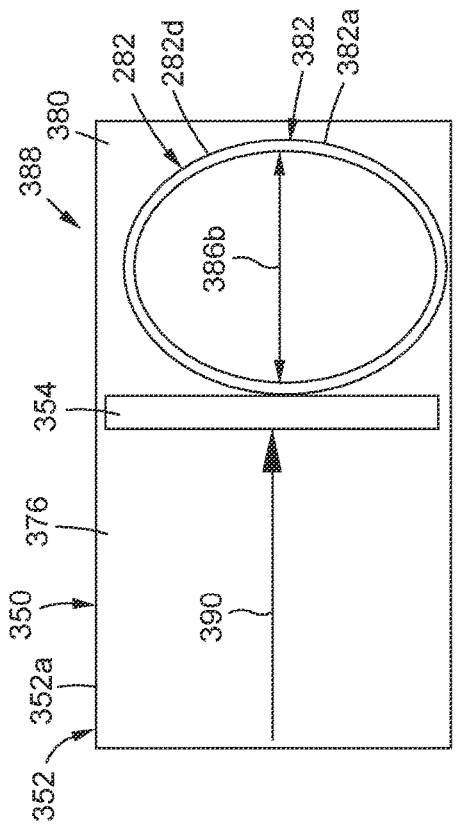
FIG. 12A
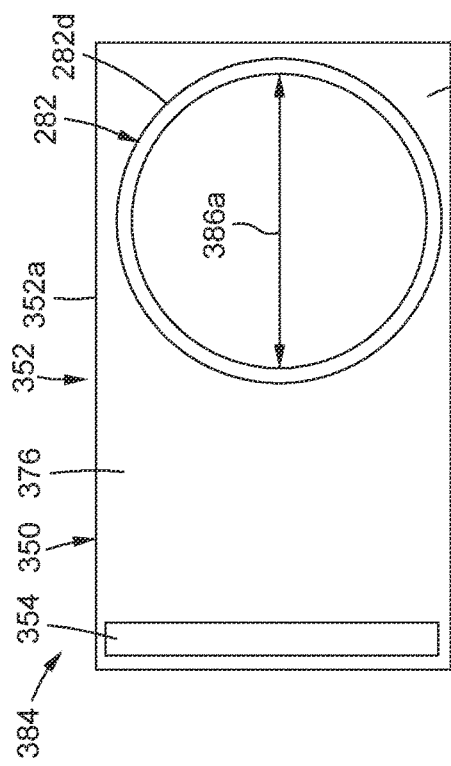
FIG. 12B
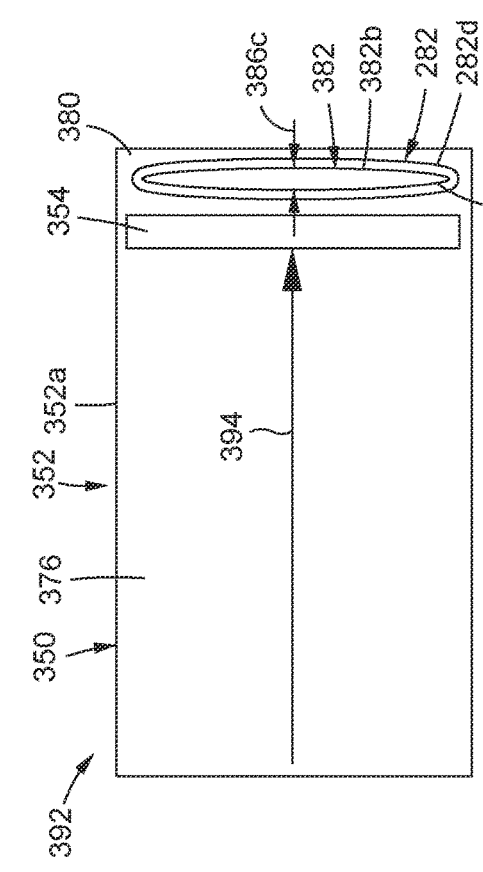
FIG. 12C
FIG. 12D

AUTOMATED REMOVAL APPARATUS, SYSTEM, AND METHOD FOR SELECTIVELY REMOVING TRIMMED PORTIONS OF A LAMINATED PLY IN A PLY-BY-PLY FABRICATION PROCESS

CROSS-REFERENCE TO RELATED APPLICATION

This nonprovisional application claims priority to U.S. Provisional Application Ser. No. 63/043,099, filed Jun. 23, 2020, which is incorporated herein by reference in its entirety.

FIELD

The disclosure relates generally to apparatuses, systems, and methods for composite laminate fabrication processes, and more particularly, to automated apparatuses, systems, and methods of removing trimmed portions of laminated plies in a ply-by-ply fabrication process used in the manufacture of composite structures and parts.

BACKGROUND

Composite structures may be used in a wide variety of applications, including in the manufacture of aircraft, due to their high strength-to-weight ratios, corrosion resistance and other favorable properties. In particular, in aircraft manufacturing, composite structures or parts may be used to form the wings, including stringers, spars, and wing panels, the fuselage, the tail sections, and other parts of the aircraft. Such composite structures or parts may be formed from composite laminates comprising multiple stacked composite plies, or layers, laminated together.

In a ply-by-ply fabrication process used in composite laminate formation, an individual composite ply, for example, one formed of a composite tape or sheet, is typically laminated to a backing material, such as a backing film, a release film, or a peel ply layer, to form a laminated ply. One or more edges of the laminated ply may be cut or trimmed on a flat surface of a carrier apparatus such as a mobile table or conveyor belt, to form a net cut ply. Before transferring the net cut ply on the carrier apparatus to another production line station for formation, or lay up, with other net cut plies on a tool, mold, or form, the cut or trimmed scraps of composite material and/or backing material are typically separated and removed from around the net cut ply and appropriately disposed of. Since multiple net cut plies may require trimming in the ply-by-ply fabrication process, hundreds of trimmed scrap pieces may need to be removed and disposed of.

Known methods and systems exist for removing and disposing of such trimmed scraps from a net cut ply in a ply-by-ply fabrication process. One known method and system includes two or more workers walking along the length of the carrier apparatus, manually separating and picking up the trimmed scraps from around the net cut ply, manually separating the trimmed scrap composite material from the trimmed scrap backing material, if desired, manually removing the trimmed scraps from the carrier apparatus, and manually disposing of the trimmed scraps in a waste disposal apparatus. However, such known manual removal and disposal method and system may result in increased labor for scrap management of each laminated ply, including removal and disposal of the scrap portions, increased time involved in removal and disposal of the scrap portions, and overall increased costs of forming the composite laminates using manual removal and disposal with the ply-by-ply fabrication process. Moreover, it may be difficult to manually separate and pick up the trimmed scraps without engaging and/or peeling one or more portions of the net cut ply.

In addition, known manual apparatuses exist for removing trimmed scraps from a net cut ply in a ply-by-ply fabrication process. One such known manual apparatus includes a manual spool to wind up trimmed scrap for removal from around the net cut ply. However, such manual spool is not automated, and may result in increased labor to manually operate the manual spool, and increased time to manually wind up the trimmed scrap on the manual spool.

Accordingly, there is a need for an automated apparatus, system, and method for selectively removing one or more trimmed portions of a laminated ply in a ply-by-ply fabrication process that eliminates manual removal and disposal of trimmed scraps, that avoids engagement with and peeling of one or more portions of a net cut ply during removal of trimmed scraps, and that provide advantages over known apparatuses, systems, and methods.

SUMMARY

Example implementations of the present disclosure provide an automated removal apparatus, system, and method for selectively removing one or more trimmed portions of a laminated ply in a ply-by-ply fabrication process. As discussed in the below detailed description, versions of the automated removal apparatus, system, and method may provide significant advantages over known apparatuses, systems, and methods.

In a version of the disclosure, there is provided an automated removal apparatus for selectively removing one or more trimmed portions of a laminated ply in a ply-by-ply fabrication process. The automated removal apparatus comprises a rotatable reel comprising a plurality of retractable vacuum panels attached around a hub portion of the rotatable reel. Each of the plurality of retractable vacuum panels comprises one or more retractable vacuum pad assemblies. Each of the one or more retractable vacuum pad assemblies has a vacuum pad with a vacuum port and a self-sealing valve.

The automated removal apparatus further comprises a plurality of actuator assemblies attached to the plurality of retractable vacuum panels. The automated removal apparatus further comprises a plurality of friction reducing elements attached around the rotatable reel. The automated removal apparatus further comprises a drive assembly attached to the rotatable reel.

The automated removal apparatus further comprises a pneumatic system attached to the rotatable reel. The pneumatic system comprises a valve manifold operable to control an air flow to actuate the plurality of actuator assemblies, and operable to control the air flow to one or more vacuum generators to generate a vacuum flow through one or more of the vacuum ports. The vacuum flow generates a vacuum force configured to pull up and hold the one or more trimmed portions against one or more of the vacuum pads, when the rotatable reel is rotated over the one or more trimmed portions to be removed.

In another version of the disclosure, there is provided an automated removal system for selectively removing one or more trimmed portions of a laminated ply in a ply-by-ply fabrication process. The automated removal system comprises a robot assembly comprising a robot having a robotic arm, and comprising a control unit, and a power unit. The automated removal system further comprises a carrier apparatus for carrying the one or more trimmed portions.

The automated removal system further comprises an automated removal apparatus attached to the robot assembly. The automated removal apparatus comprises a rotatable reel comprising a plurality of retractable vacuum panels attached around a hub portion of the rotatable reel. Each of the plurality of retractable vacuum panels comprises one or more retractable vacuum pad assemblies. Each retractable vacuum pad assembly has a vacuum pad with a vacuum port and a self-sealing valve.

The automated removal apparatus further comprises a plurality of piston assemblies attached to the plurality of retractable vacuum panels. The automated removal apparatus further comprises a plurality of friction reducing elements attached around the rotatable reel, and positioned between the plurality of retractable vacuum panels. The automated removal apparatus further comprises a drive assembly attached to the rotatable reel. The automated removal apparatus further comprises a connector assembly attached between the drive assembly and the robotic arm of the robot.

The automated removal apparatus further comprises a pneumatic system attached to the rotatable reel. The pneumatic system comprises a valve manifold operable to control an air flow to actuate the plurality of piston assemblies, and operable to control the air flow to one or more vacuum generators to generate a vacuum flow through one or more of the vacuum ports. The vacuum flow generates a vacuum force configured to pull up and hold the one or more trimmed portions against one or more of the vacuum pads, when the rotatable reel is rotated over the one or more trimmed portions to be removed.

In another version of the disclosure, there is provided an automated removal method for selectively removing one or more trimmed portions of a laminated ply in a ply-by-ply fabrication process. The automated removal method comprises the step of positioning an automated removal apparatus over the one or more trimmed portions of the laminated ply, to be removed, in the ply-by-ply fabrication process.

The automated removal apparatus comprises a rotatable reel comprising a plurality of retractable vacuum panels attached around a hub portion of the rotatable reel. Each of the plurality of retractable vacuum panels comprises one or more retractable vacuum pad assemblies. Each of the one or more retractable vacuum pad assemblies has a vacuum pad with a vacuum port and a self-sealing valve. The automated removal apparatus further comprises a plurality of actuator assemblies attached to the plurality of retractable vacuum panels. The automated removal apparatus further comprises a plurality of friction reducing elements attached around the rotatable reel.

The automated removal apparatus further comprises a drive assembly attached to the rotatable reel. The automated removal apparatus further comprises a connector assembly attached to the drive assembly. The automated removal apparatus further comprises a pneumatic system attached to the rotatable reel. The pneumatic system comprises a valve manifold operable to control an air flow to actuate the plurality of actuator assemblies, and operable to control the air flow to one or more vacuum generators to generate a vacuum flow through one or more of the vacuum ports.

The automated removal method further comprises the step of rotating the rotatable reel, via the drive assembly, onto the one or more trimmed portions to be removed. Piston rods of the plurality of actuator assemblies are in an extended position, to extend the plurality of retractable vacuum panels and the one or more retractable vacuum pad assemblies.

The automated removal method further comprises the step of compressing the one or more retractable vacuum pad assemblies against the one or more trimmed portions, to cause the self-sealing valve to open to an open position from a closed position, for each vacuum pad of the one or more retractable vacuum pad assemblies that is compressed, and to apply a vacuum force from the vacuum air flow, to pull up and hold a section of the one or more trimmed portions against the vacuum pad. The automated removal method further comprises the step of winding the one or more trimmed portions, held by the vacuum force, around an outer circumference of the rotatable reel for removal.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary versions, but which are not necessarily drawn to scale. The drawings are examples and not meant as limitations on the description or claims.

FIG. 2F is an illustration of a rear view of the automated removal apparatus of FIG. 2A;

FIG. 2G is an illustration of a rear perspective view of an exemplary version of a rotary stage assembly of a drive assembly of the automated removal apparatus of FIG. 2F;

FIG. 4B is an illustration of a left side perspective partial cross-sectional view of the automated removal apparatus of FIG. 4A showing the pneumatic system;

FIG. 5 is an illustration of a right side view of an exemplary version of an automated removal apparatus of the disclosure having a wheel assembly;

FIG. 11A is an illustration of a bottom perspective partial view of an exemplary version of an automated removal apparatus of the disclosure in a release position;

FIG. 11B is an illustration of a bottom perspective view of the automated removal apparatus of FIG. 11A in a post-release position;

FIG. 12A is schematic illustration of a top view of a rolled-up scrap portion in a pre-compacted position in a disposal assembly;

FIG. 12B is a schematic illustration of a top view of the rolled-up scrap portion of FIG. 12A, compacted into a first compacted position in the disposal assembly;

FIG. 12C is a schematic illustration of a top view of the rolled-up scrap portion of FIG. 12B, compacted further into a second compacted position in the disposal assembly;

FIG. 12D is a schematic illustration of a top view of multiple rolled-up scrap portions compacted together in a multiple scrap compacted position in the disposal assembly;

The figures shown in this disclosure represent various aspects of the versions presented, and only differences will be discussed in detail.

DETAILED DESCRIPTION

Disclosed versions or embodiments will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "in one version" or "in a version" do not necessarily refer to the same version. Particular features, structures, or characteristics may be combined in any suitable manner consistent with this disclosure.

As used herein, "comprising" is an open-ended term, and as used in the claims, this term does not foreclose additional structure or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

Figure 1:
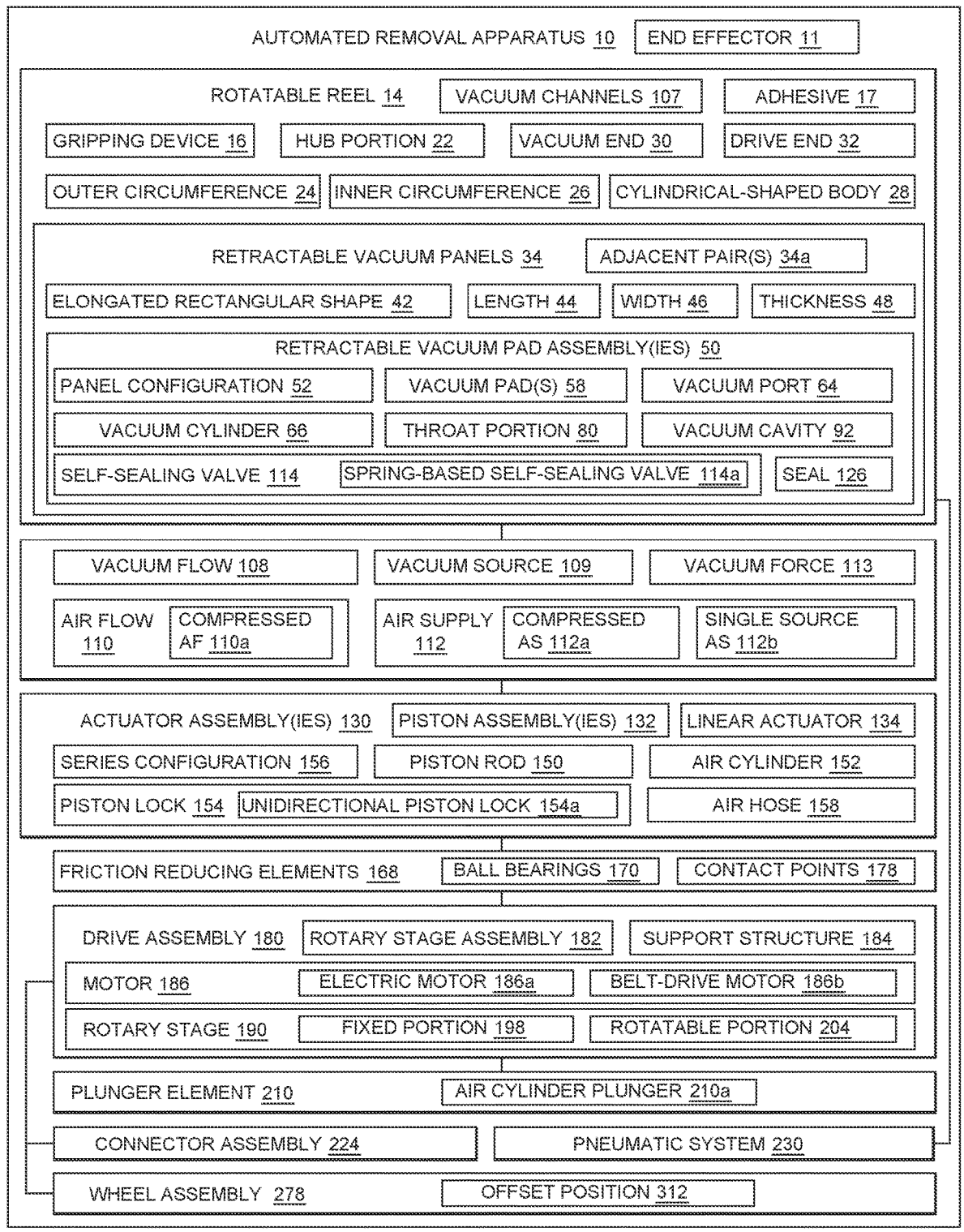
FIG. 1 is an illustration of a functional block diagram showing an exemplary version of an automated removal apparatus of the disclosure.

Now referring to the Figures, FIG. 1 is an illustration of a functional block diagram showing an exemplary version of an automated removal apparatus 10 of the disclosure. The automated removal apparatus 10 is used in an automated removal system 12 (see FIG. 7). The automated removal apparatus 10 and the automated removal system 12 are designed to selectively remove one or more trimmed portions 280 (see FIGS. 5, 7) of a laminated ply 294 (see FIG. 7) in a ply-by-ply fabrication process 296. (see FIG. 7), discussed in detail below.

The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein.

Figure 2A:
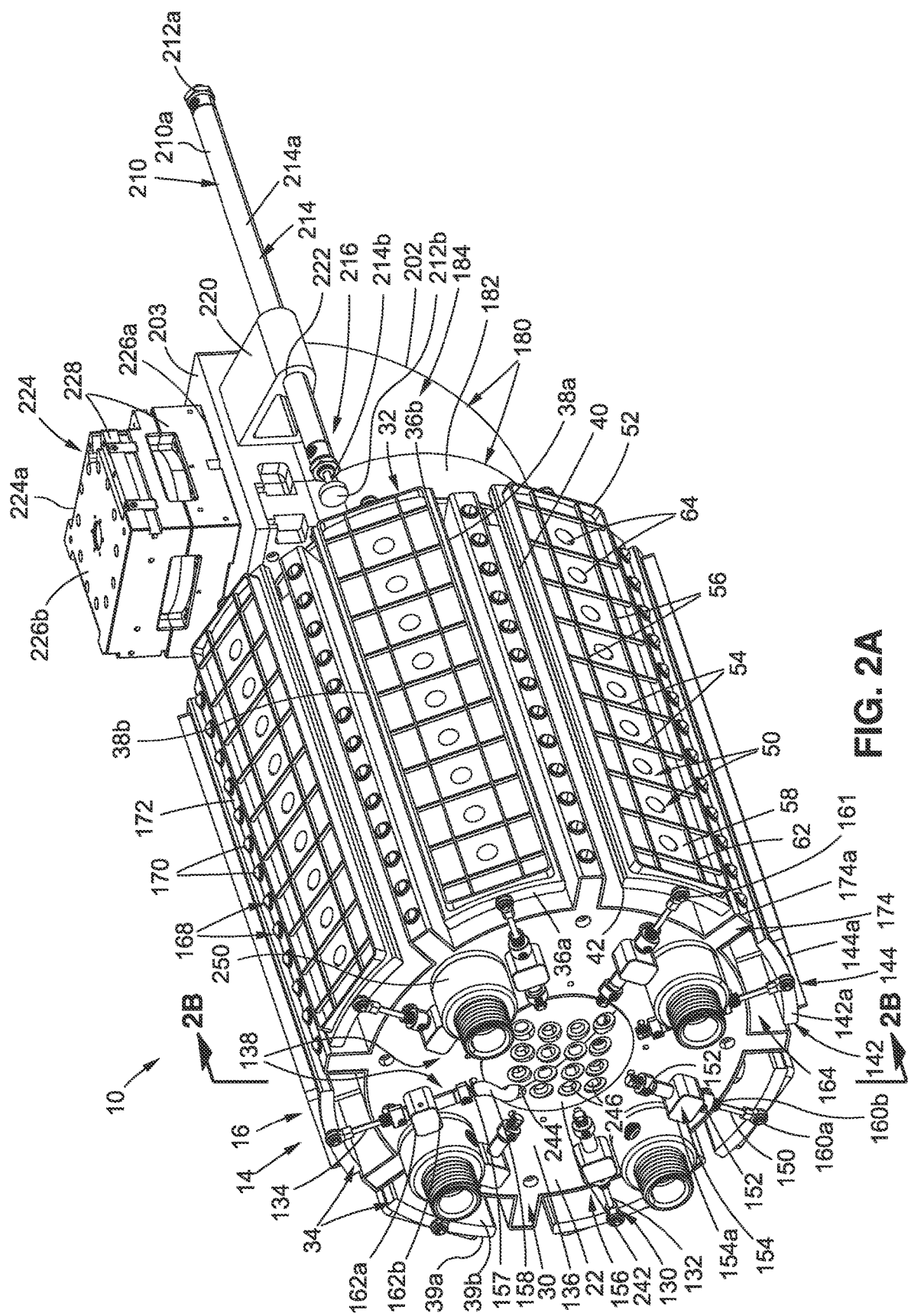
FIG. 2A is an illustration of a right side front perspective view of an exemplary version of an automated removal apparatus of the disclosure, showing a plurality of retractable vacuum panels in an extended position.
Figure 2B:
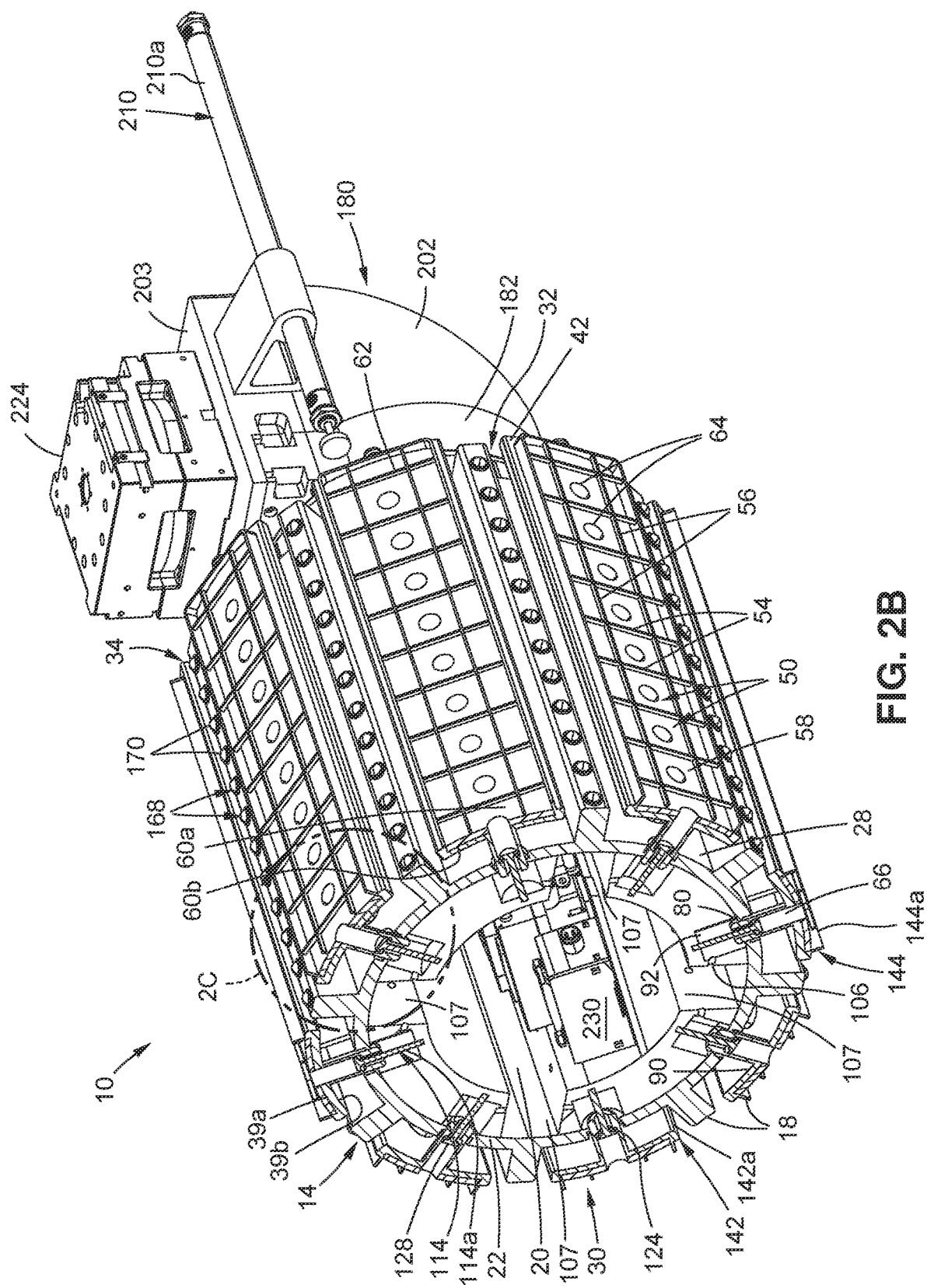
FIG. 2B is an illustration of a right side front perspective view of the automated removal apparatus of FIG. 2A, and shows a cross-sectional end view taken along lines 2B-2B of FIG. 2A.
Figure 2C:
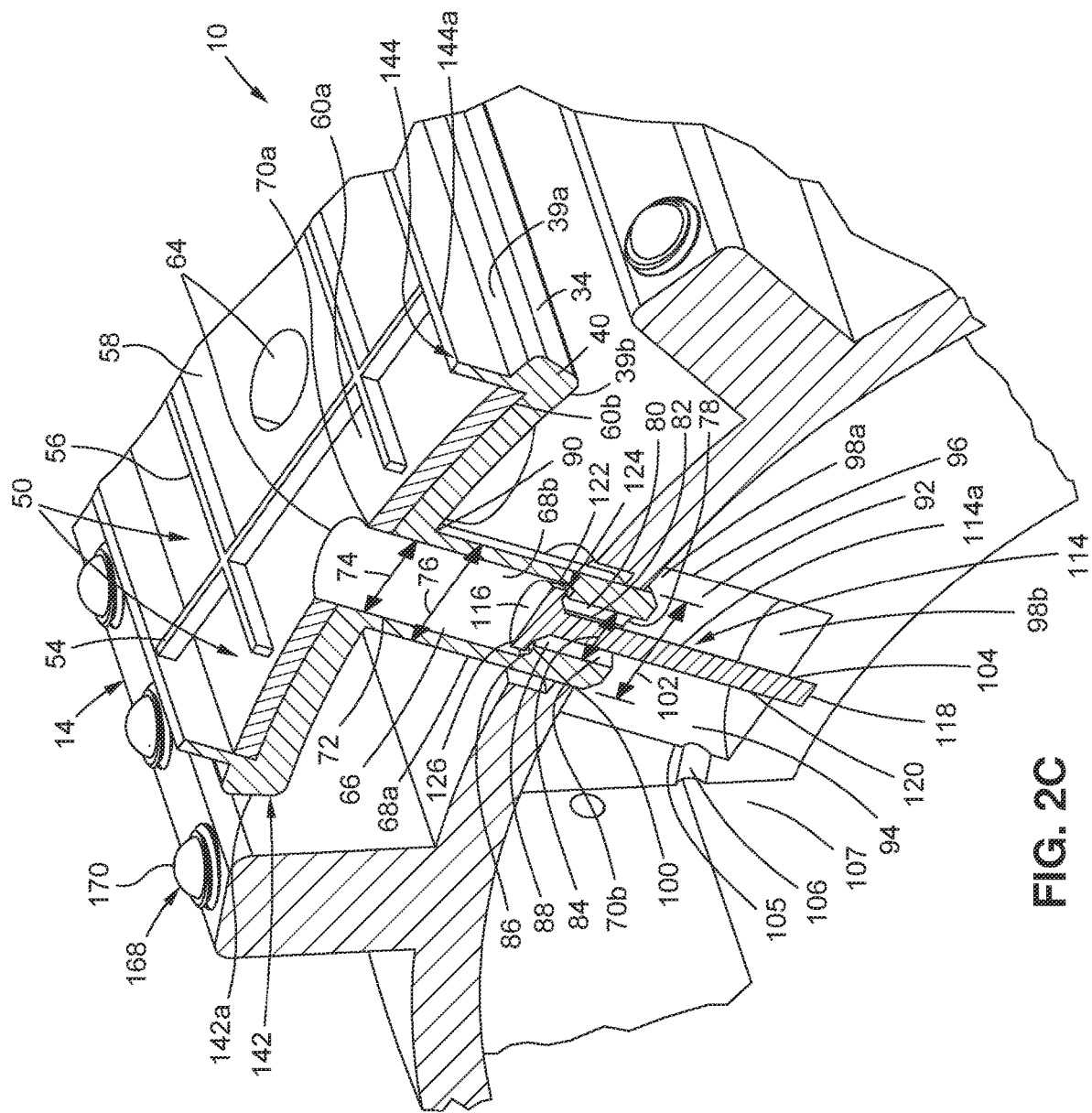
FIG. 2C is an illustration of an enlarged view of circle 2C of FIG. 2B.
Figure 2D:
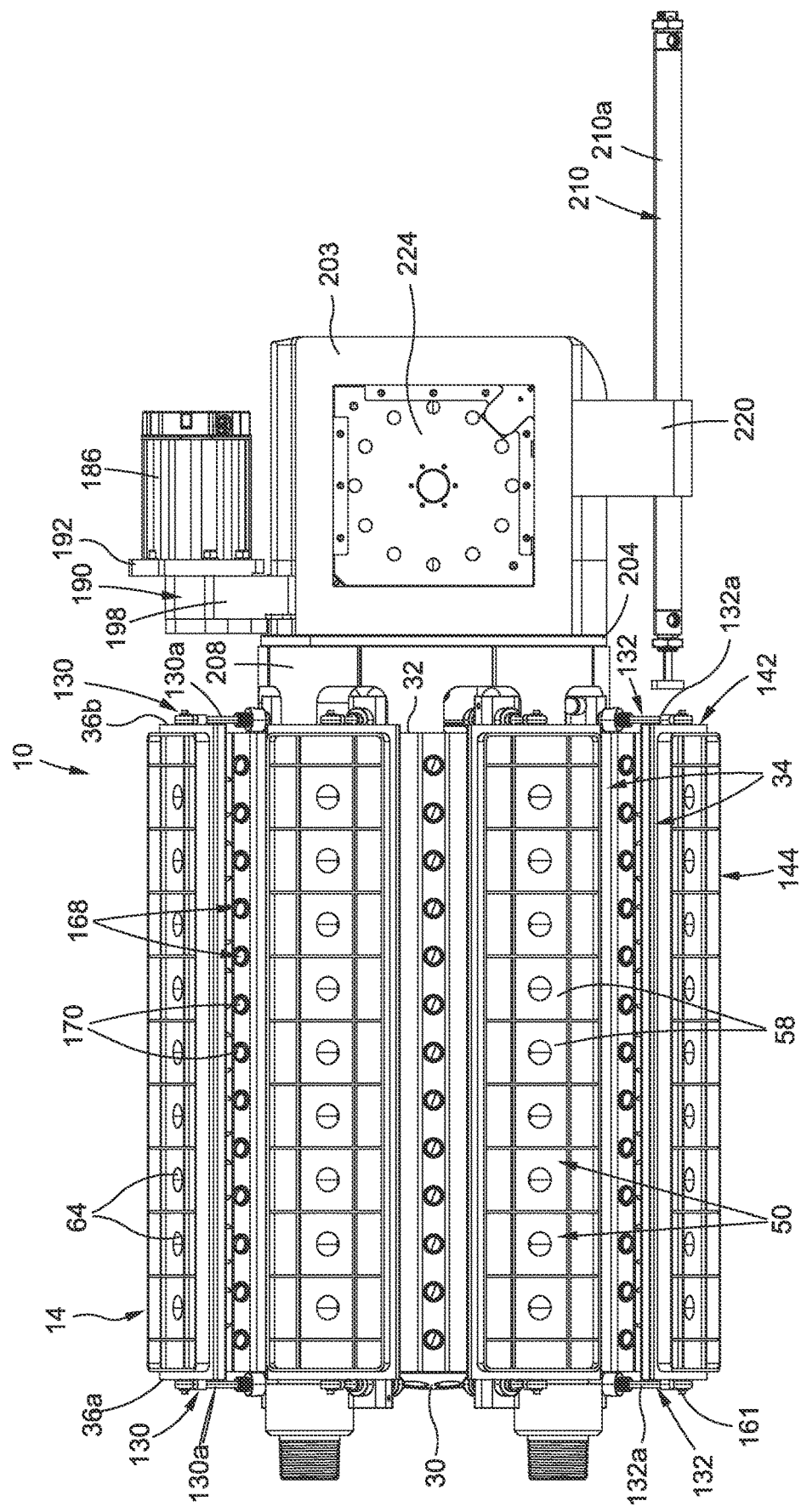
FIG. 2D is an illustration of a top view of the automated removal apparatus of FIG. 2A.
Figure 2E:
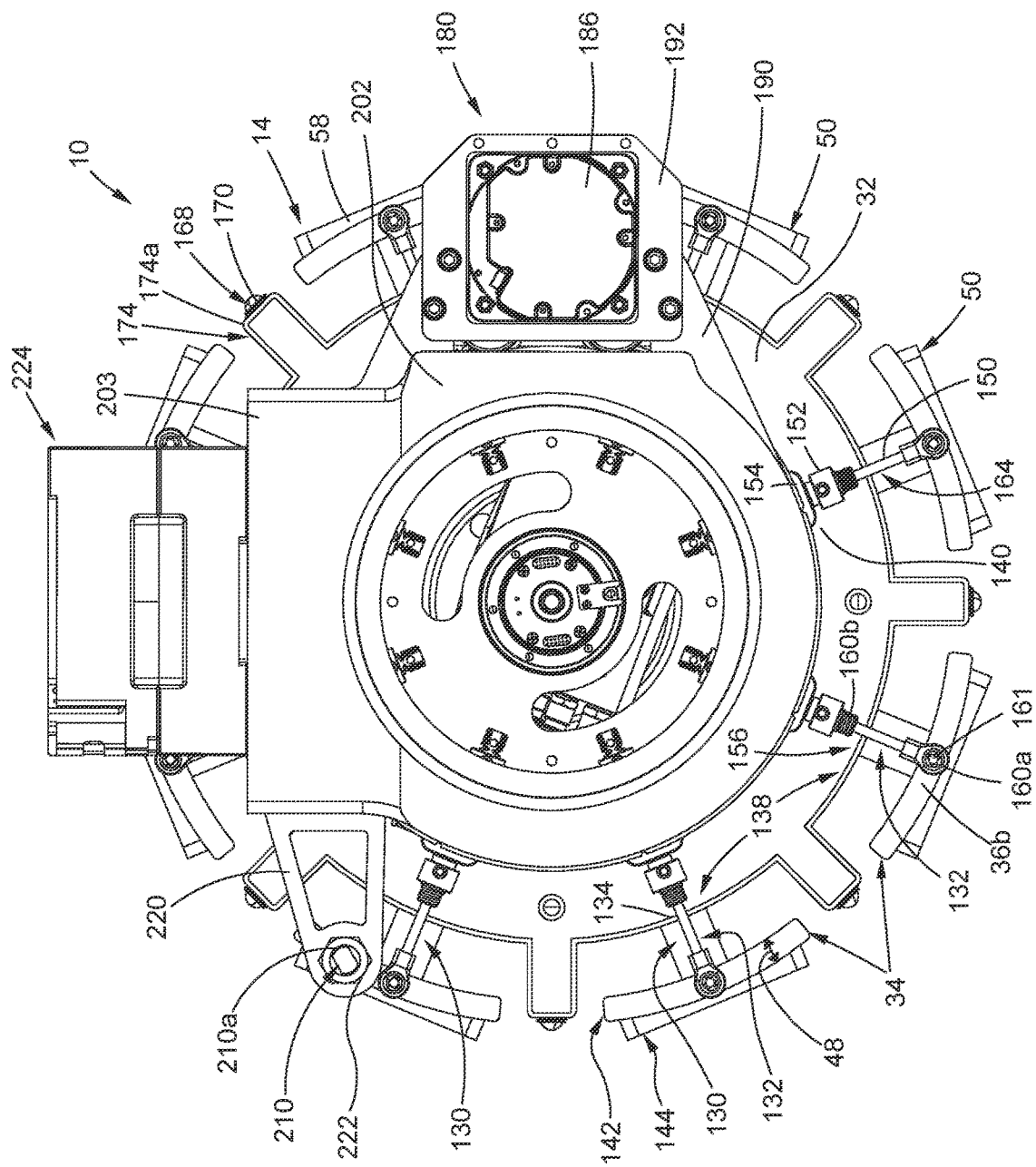
FIG. 2E is an illustration of a left side view of the automated removal apparatus of FIG. 2A.

Various views of the automated removal apparatus 10 are shown in FIGS. 2A-2F and 3A-3D. FIG. 2A is an illustration of a right side front perspective view of an exemplary version of an automated removal apparatus 10 of the disclosure. FIG. 2B is an illustration of a right side front perspective view of the automated removal apparatus 10 of FIG. 2A, and shows a cross-sectional end view taken along lines 2B-2B of FIG. 2A. FIG. 2C is an illustration of an enlarged view of circle 2C of FIG. 2B. FIG. 2D is an illustration of a top view of the automated removal apparatus 10 of FIG. 2A. FIG. 2E is an illustration of a left side view of the automated removal apparatus 10 of FIG. 2A. FIG. 2F is an illustration of a rear view of the automated removal apparatus 10 of FIG. 2A. FIGS. 2A-2F show a plurality of retractable vacuum panels 34, discussed in detail below, in an extended position 142.

Figure 3A:
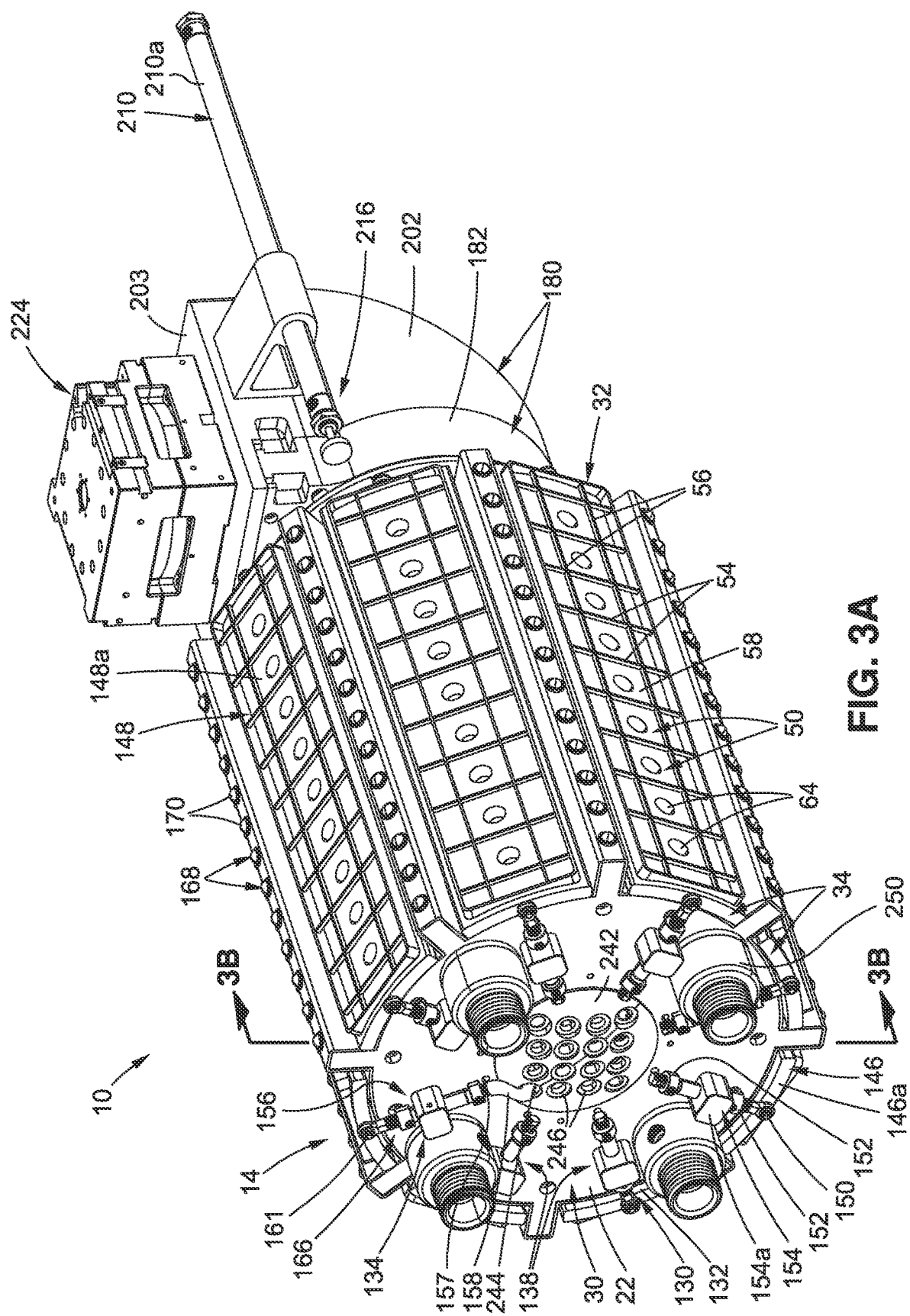
FIG. 3A is an illustration of a right side front perspective view of an exemplary version of an automated removal apparatus of the disclosure showing a plurality of retractable vacuum panels in a retracted position.
Figure 3B:
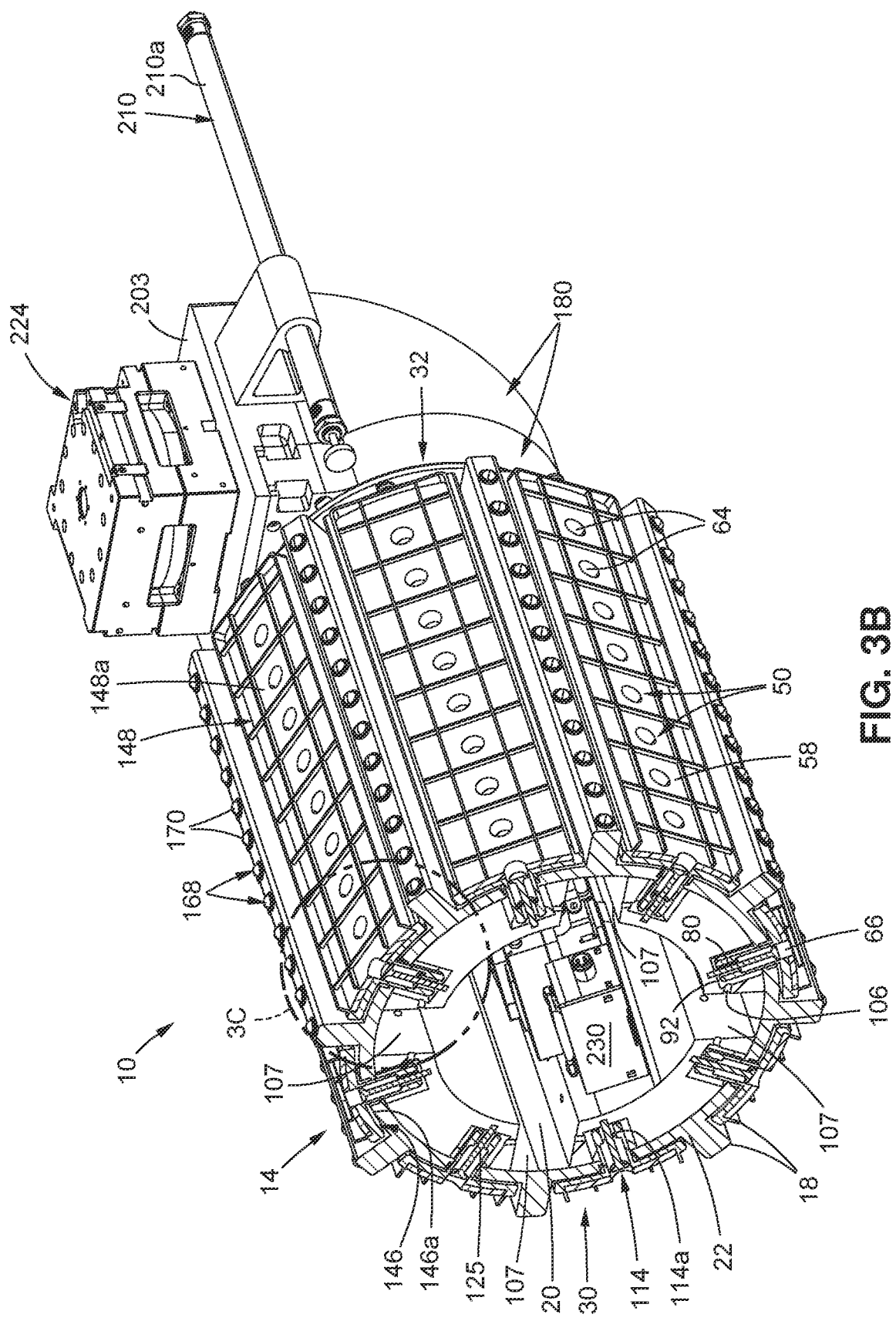
FIG. 3B is an illustration of a right side front perspective view of the automated removal apparatus of FIG. 3A, and shows a cross-sectional end view taken along lines 3B-3B of FIG. 3A.
Figure 3C:
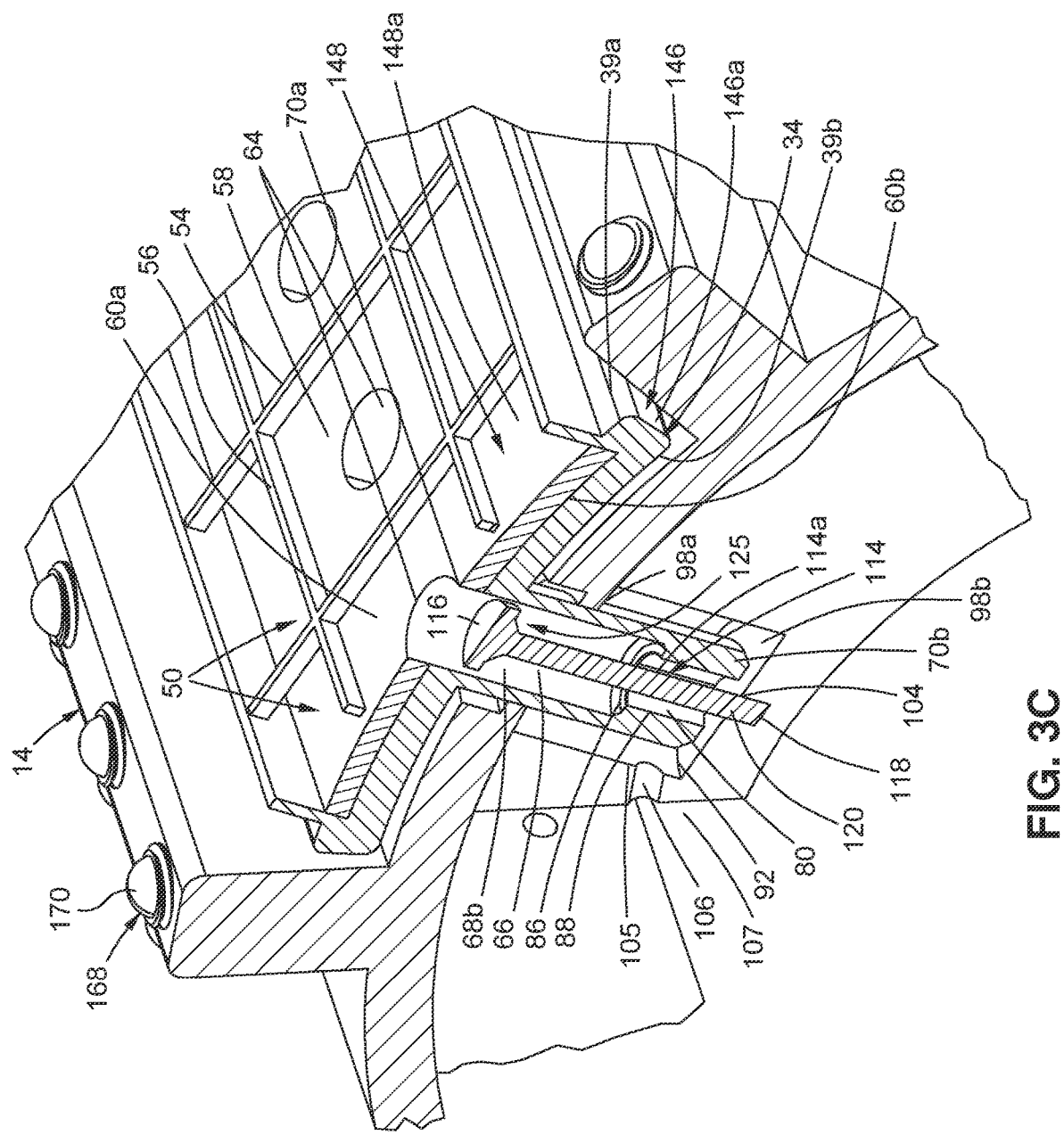
FIG. 3C is an illustration of an enlarged view of circle 3C of FIG. 3B.
Figure 3D:
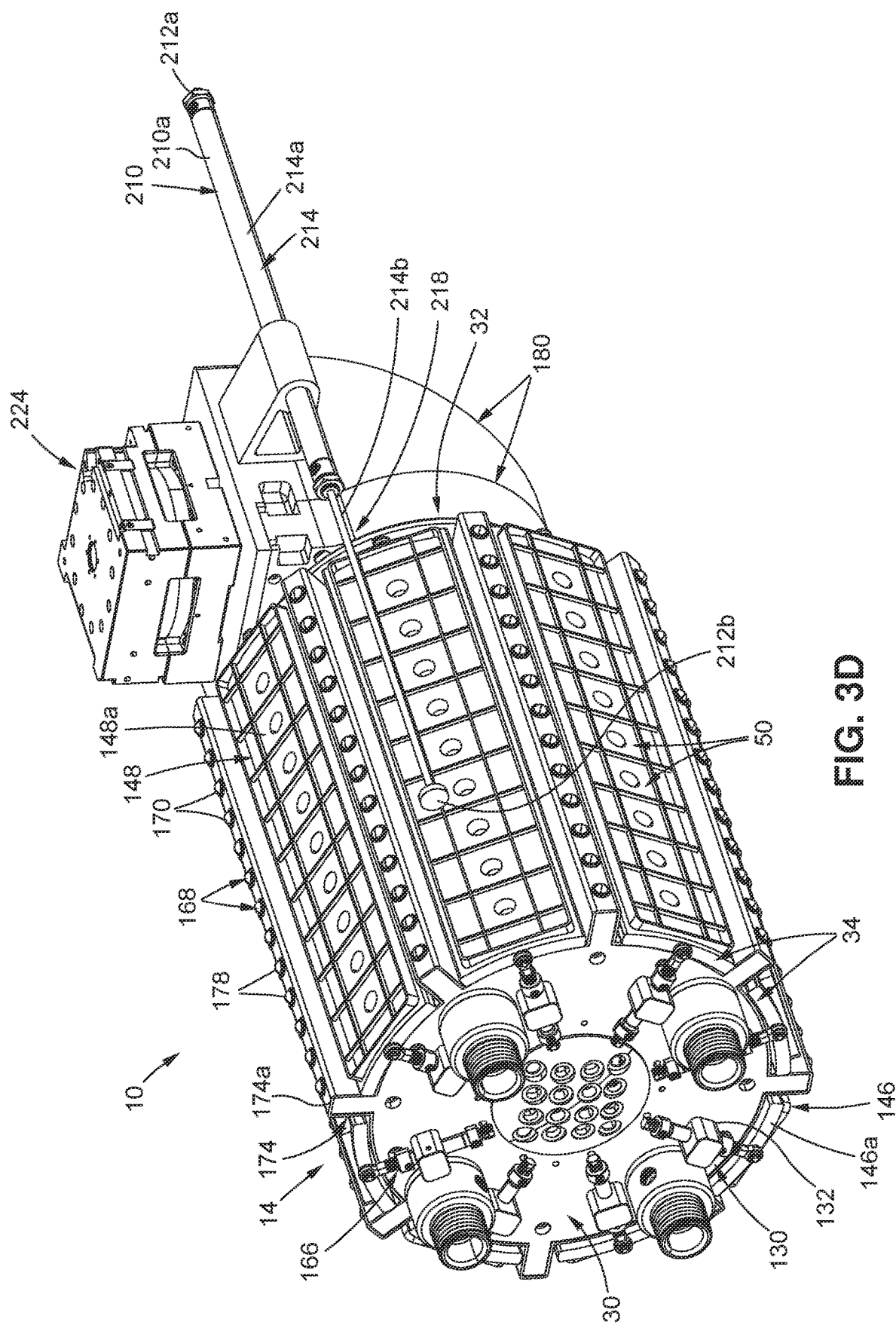
FIG. 3D is an illustration of a right side front perspective view of the automated removal apparatus of FIG. 3A, showing a plunger element in an extended position.

FIG. 3A is an illustration of a right side front perspective view of an exemplary version of an automated removal apparatus 10 of the disclosure. FIG. 3B is an illustration of a right side front perspective view of the automated removal apparatus 10 of FIG. 3A, and shows a cross-sectional end view taken along lines 3B-3B of FIG. 3A. FIG. 3C is an illustration of an enlarged view of circle 3C of FIG. 3B. FIG. 3D is an illustration of a right side front perspective view of the automated removal apparatus 10 of FIG. 3A, showing a plunger element 210, discussed in detail below, in an extended position 218. FIGS. 3A-3D show the plurality of retractable vacuum panels 34, discussed in detail below, in a retracted position 146.

As shown in FIGS. 1, 2A-2F, and 3A-3D, the automated removal apparatus 10 comprises a rotatable reel 14. The rotatable reel 14 functions as a gripping device 16 (see FIGS. 1, 2A) to grip the one or more trimmed portions 280 (see FIG. 7) around the rotatable reel 14 for removal. As discussed below, in one version, the rotatable reel 14 uses a vacuum force 113 (see FIG. 1) to pull up and hold one or more trimmed portions 280 (see FIG. 7) of the laminated ply 294 (see FIG. 7) around the rotatable reel 14. In another version, the rotatable reel 14 may use an adhesive 17 (see FIG. 1), or another suitable gripping mechanism, to grip or hold the one or more trimmed portions 280 of the laminated ply 294 around the rotatable reel 14.

The rotatable reel 14 has an exterior 18 (see FIG. 2B), an interior 20 (see FIG. 2B), a hub portion 22 (see FIGS. 1, 2A-2B), an outer circumference 24 (see FIGS. 1, 5), and an inner circumference 26 (see FIGS. 1, 5). As further shown in FIGS. 1 and 2B, the rotatable reel 14, and in particular, the hub portion 22, has, in one version, a substantially cylindrical-shaped body 28, such as a barrel shape. In another version, the rotatable reel 14, and in particular, the hub portion 22, has another suitable shape. The rotatable reel 14 further has a vacuum end 30 (see FIGS. 1, 2A-2B, 2D, 3A-3B) and a drive end 32 (see also FIGS. 1. 2A-2B, 2D-2E, 3A-3B, 3D) positioned opposite the vacuum end 30.

In an exemplary version, the rotatable reel 14 comprises a plurality of retractable vacuum panels 34 (see FIGS. 1, 2A-2F, 3A-3D) attached and disposed around the rotatable reel 14, and in particular, attached and disposed around the hub portion 22 of the rotatable reel 14. As shown in FIG. 2A, each of the plurality of retractable vacuum panels 34 comprises a first end 36a, a second end 36b (see also FIG. 2E), a first side 38a, and a second side 38b. As shown in FIG. 2C, each of the plurality of retractable vacuum panels 34 comprises a top side 39a, a bottom side 39b, and a body portion 40. In one version, as shown in FIG. 2A, each retractable vacuum panel 34 has an elongated rectangular shape 42. In another version, each retractable vacuum panel 34 has another suitable geometric shape. Each retractable vacuum panel 34 further has a length 44 (see FIGS. 1, 2F), a width 46 (see FIGS. 1, 2F), and a thickness 48 (see FIGS. 1, 2E). The length 44 may be longer or shorter depending on the length of the one or more trimmed portions that are rolled up, wound up, or reeled up around the rotatable reel 14. The width 46 may be wider or narrower depending on the width of the one or more trimmed portions that are rolled up, wound up, or reeled up around the rotatable reel 14.

As further shown in FIG. 2A, each of the plurality of retractable vacuum panels 34 is attached between the vacuum end 30 and the drive end 32 of the rotatable reel 14. The rotatable reel 14 may include two or more retractable vacuum panels 34 spaced apart from each other and attached around the hub portion 22 of the rotatable reel 14. As shown in FIG. 2A, in one version, the rotatable reel 14 has eight (8) retractable vacuum panels 34 evenly spaced apart from each other and attached around the hub portion 22 of the rotatable reel 14. In other versions, the rotatable reel 14 has another suitable number of retractable vacuum panels 34, for example, two (2) to seven (7) retractable vacuum panels 34, or more than eight (8) retractable vacuum panels 34.

As shown in FIGS. 1, 2A-2F, and 3A-3D, each of the plurality of retractable vacuum panels 34 comprises one or more retractable vacuum pad assemblies 50 coupled to, or integrated with, each retractable vacuum panel 34. As shown in FIGS. 2A and 2F, in one version, nine (9) entire retractable vacuum pad assemblies 50 are arranged along the length 44 (see FIG. 2F) of each individual retractable vacuum panel 34 in a panel configuration 52 (see FIG. 2A). In other versions, each retractable vacuum panel 34 includes, or contains, one (1) retractable vacuum pad assembly 50, includes, or contains, two (2) to eight (8) retractable vacuum pad assemblies 50, or includes or contains, ten (10) or more retractable vacuum pad assemblies 50. As shown in FIGS. 2A-2C, 3A, and 3C, the retractable vacuum pad assemblies 50 are preferably partitioned and sectioned apart from each other, via one or more vertical partition elements 54. One or more horizontal partition elements 56 (see FIGS. 2A-2C, 3A, 3C) may span the length 44 (see FIG. 2F) of the retractable vacuum panel 34, and may intersect two or more vertical partition elements 54.

As shown in FIGS. 1, 2A-2D, 2F, and 3A-3C, each of the one or more retractable vacuum pad assemblies 50 comprises a vacuum pad 58, or a vacuum plate. Each vacuum pad 58 has a top exterior side 60a (see FIGS. 2B-2C, 3C), a bottom interior side 60b (see FIGS. 2B-2C, 3C), and a substantially rectangular configuration 62 (see FIG. 2B). As shown in FIGS. 2B and 2C, the bottom interior side 60b of each vacuum pad 58 may be coupled, or attached, onto the top side 39a of the retractable vacuum panel 34, and this may allow for replacement, if desired, of a vacuum pad 58 that may be worn or used, with a vacuum pad 58 that is unused. Alternatively, the bottom interior side 60b of each vacuum pad 58 may be integrated with the top side 39a of the retractable vacuum panel 34. In this version, the retractable vacuum panel 34, with one or more vacuum pads 58 that are worn or used, may be replaced, if desired, with another retractable vacuum panel 34 with one or more vacuum pads 58 that are unused. As further shown in FIG. 2A, the vacuum pads 58 are partitioned and sectioned apart from each other with the vertical partition elements 54 and the horizontal partition elements 56.

Each of the one or more retractable vacuum pad assemblies 50 further comprises a vacuum port 64 (see FIGS. 1, 2A-2D, 3A-3C) formed in the top exterior side 60a of the vacuum pad 58. The one or more vertical partition elements 54 (see FIG. 2A) and the one or more horizontal partition elements 56 (see FIG. 2A) may form a seal around the vacuum port 64 (see FIG. 2A), when the vacuum pad 58 (see FIG. 2A) is compressed against the one or more trimmed portions 280 (see FIG. 7).

Each of the one or more retractable vacuum pad assemblies 50 further comprises a vacuum cylinder 66 (see FIGS. 1, 2B-2C, 3B-3C). As shown in FIG. 2C, the vacuum cylinder 66 has an exterior 68a, an interior 68b, a first end 70a (see also FIG. 3C), a second end 70b (see also FIG. 3C), and a cylindrical body 72 formed between the first end 70a and the second end 70b. As shown in FIG. 2C, the vacuum cylinder 66 further has an inner diameter 74 and an outer diameter 76. The first end 70a of the vacuum cylinder 66 terminates at the vacuum port 64, and the second end 70b of the vacuum cylinder 66 terminates at a base opening 78 (see FIG. 2C). The vacuum cylinder 66 further has a throat portion 80 (see FIGS. 1, 2B-2C, 3B-3C) formed in the interior 68b of the vacuum cylinder 66 at, or near, the second end 70b, and the throat portion 80 terminates at the base opening 78. As shown in FIG. 2C, the throat portion 80 has a cylinder-shaped configuration 82 and an inner diameter 84. As shown in FIG. 2C, the inner diameter 84 of the throat portion 80 is smaller than the inner diameter 74 of the vacuum cylinder 66. The throat portion 80 (see FIG. 2C) also has a top edge portion 86 (see FIGS. 2C, 3C) and sides 88 (see FIGS. 2C, 3C) depending downwardly from the top edge portion 86, and forming an angle with respect to the top edge portion 86, for example, forming a 90 degree angle, or another suitable size angle. As shown in FIGS. 2B-2C, the vacuum pad 58 and the vacuum cylinder 66 together have a generally T-shaped configuration 90.

Each of the one or more retractable vacuum pad assemblies 50 further comprises a vacuum cavity 92 (see FIGS. 1, 2B-2C, 3B-3C) formed in the hub portion 22 of the rotatable reel 14, and positioned below, or inwardly from, the vacuum cylinder 66. As shown in FIG. 2C, each vacuum cavity 92 has an interior 94 and has a cylindrical shape 96. Each vacuum cavity 92 further comprises a top end 98a (see FIGS. 2C, 3C) and a bottom end 98b (see FIGS. 2C, 3C). Each vacuum cavity 92 has a cavity opening 100 (see FIG. 2C) at the top end 98a, and the cavity opening 100 has a cavity opening diameter 102 (see FIG. 2C). As shown in FIG. 2C, the cavity opening diameter 102 is greater in length than the outer diameter 76 of the vacuum cylinder 66. The cavity opening 100 is of a sufficient size and shape to receive the vacuum cylinder 66, when the second end 70b of the vacuum cylinder 66 of the retractable vacuum pad assembly 50 is retracted into the vacuum cavity 92. Each vacuum cavity 92 further comprises a central recessed opening 104 (see FIGS. 2C, 3C) formed in the bottom end 98b.

Each vacuum cavity 92 further comprises through a side 105 (see FIGS. 2C, 3C) of the vacuum cavity 92 at least one channel opening 106 (see FIGS. 2B-2C, 3B-3C). The channel opening 106 opens up to a vacuum channel 107 (see FIGS. 2B, 2C, 3B, 3C) formed through the interior 20 of the rotatable reel 14. As shown in FIGS. 2B and 3B, in one version, the rotatable reel 14 has four (4) vacuum channels 107 that extend the length 44 (see FIG. 2F) of the retractable vacuum panels 34. In other versions, the rotatable reel 14 has one (1) to three (3) vacuum channels 107, or has more than four (4) vacuum channels 107. Each vacuum channel 107 delivers a vacuum flow 108 (see FIG. 1), via the channel openings 106, to the retractable vacuum pad assemblies 50 located on each side of the vacuum channel 107, and out through the vacuum ports 64. As shown in FIGS. 2B and 3B, in one version, each vacuum channel 107 has the capability of delivering the vacuum flow 108 through one or more of eighteen (18) vacuum pads 58 of one or more of eighteen (18) retractable vacuum pad assemblies 50, and out through one or more of eighteen (18) vacuum ports 64. In other versions, each vacuum channel 107 has the capability of delivering the vacuum flow 108 through one (1) to seventeen (17) vacuum pads 58, or through greater than eighteen (18) vacuum pads 58. The vacuum flow 108 is generated from a vacuum source 109 (see FIG. 1), discussed in further detail below. The vacuum flow 108 flows into the channel opening 106, and subsequently, into the vacuum cavity 92, into the vacuum cylinder 66, through the vacuum pad 58, and out through the vacuum port 64.

In addition, as discussed in further detail below, the rotatable reel 14 houses a pneumatic system 230 configured to receive and control an air flow 110 (see FIG. 1), such as a compressed air flow 110a (see FIG. 1), from an air supply 112 (see FIG. 1), such as a compressed air supply 112a (see FIG. 1). In a preferred version, the air supply 112 is a single source air supply 112b (see FIG. 1). Further, the vacuum flow 108 from the vacuum source 109 generates a vacuum force 113 (see FIG. 1).

Each of the one or more retractable vacuum pad assemblies 50 further comprises a self-sealing valve 114 (see FIGS. 1, 2B-2C, 3B-3C). As shown in FIGS. 2C and 3C, each self-sealing valve 114 has a head end 116, a tail end 118, and a shaft body 120 formed between the head end 116 and the tail end 118. As shown in FIGS. 2C and 3C, in one version, the tail end 118 of the self-sealing valve 114 is inserted into and fixed in the central recessed opening 104 of the bottom end 98b of the vacuum cavity 92. In one version, the self-sealing valve 114 may be a stationary valve, or fixed valve. As further shown in FIG. 2C, the head end 116 of the self-sealing valve 114 is seated on the top edge portion 86 of the throat portion 80 of the vacuum cylinder 66, which serves as a valve seat 122.

As shown in FIG. 2B, in one version, the self-sealing valve 114 has a T-shaped configuration 128. In another version, the self-sealing valve 114 has another suitable configuration or shape. In one version, the self-sealing valve 114 (see FIGS. 1, 2B-2C, 3B-3C) comprises a spring-based self-sealing valve 114a (see FIGS. 1, 2B-2C, 3B-3C). In another version, the self-sealing valve 114 comprises another suitable type of self-sealing valve known in the art.

FIGS. 2B-2C show the self-sealing valve 114 in a closed position 124, where the head end 116 of the self-sealing valve 114 is seated on the valve seat 122, to form a seal 126 (see FIGS. 1, 2C), and to prevent vacuum flow 108 (see FIG. 1) from flowing from the channel opening 106 and the vacuum cavity 92 into the vacuum cylinder 66 and out through the vacuum port 64. When the self-sealing valve 114 is in the closed position 124, as shown in FIG. 2C, the second end 70b of the vacuum cylinder 66 is adjacent to, or substantially adjacent to, the top end 98a of the vacuum cavity 92, and the retractable vacuum panel 34 is in an extended position 142 (see FIGS. 2A-2F), such as a fully extended position 142a (see FIGS. 2A-2C), and the retractable vacuum pad assembly 50 is in an extended position 144 (see FIGS. 2A-2F), such as a fully extended position 144a (see FIGS. 2A-2C). When the retractable vacuum pad assembly 50 is in the extended position 144, such as the fully extended position 144a, the self-sealing valve is in the closed position 124 and sealed, and there is no vacuum leakage or leakage of the vacuum flow 108.

FIGS. 3B-3C show the self-sealing valve 114 in an open position 125, where the head end 116 (see FIG. 3C) of the self-sealing valve 114 is no longer seated on the top edge portion 86 (see FIG. 3C) of the throat portion 80 (see FIG. 3C), and the seal 126 (see FIG. 2C) is opened to allow vacuum flow 108 (see FIG. 1) to flow from the channel opening 106 (see FIGS. 3B-3C) and the vacuum cavity 92 (see FIGS. 3B-3C) into the vacuum cylinder 66 (see FIGS. 3B-3C) and out through the vacuum port 64 (see FIGS. 3B-3C). When the self-sealing valve 114 is in the open position 125, as shown in FIG. 3C, the second end 70b of the vacuum cylinder 66 is adjacent to, or substantially adjacent to, the bottom end 98b of the vacuum cavity 92, and the retractable vacuum panel 34 is in a retracted position 146 (see FIGS. 3A-3D), such as a fully retracted position 146a (see FIGS. 3A-3D), and the retractable vacuum pad assembly 50 is in a retracted position 148 (see FIGS. 3A-3D), such as a fully retracted position 148a (see FIGS. 3A-3D).

The self-sealing valve 114 is operable to open to the open position 125 from the closed position 124, when the vacuum pad 58 is compressed against the one or more trimmed portions 280 (see FIG. 7) to be removed. When the rotatable reel 14 is positioned over the one or more trimmed portions 280 to be removed, and rotates on, and over, the one or more trimmed portions 280 to be removed, each vacuum pad 58 positioned on and over the one or more trimmed portions 280 can be compressed against the one or more trimmed portions 280, and such compression causes the self-sealing valve 114 to open to the open position 125 (see FIGS. 1, 3B-3C) from the closed position 124 (see FIGS. 1, 2B-2C). Thus, with the compression of the vacuum pad 58 against the one or more trimmed portions 280, the self-sealing valve 114 is caused to open to the open position 125, as the vacuum cylinder 66 (see FIG. 3C) is compressed and moves inwardly toward the bottom end 98b (see FIG. 3C) of the vacuum cavity 92 (see FIG. 3C). As shown in FIG. 3C, the interior 68b of the vacuum cylinder 66 substantially surrounds the head end 116 and shaft body 120 of the self-sealing valve 114. The vacuum cylinder 66 moves inwardly around the self-sealing valve 114, and the self-sealing valve 114 does not move and is fixed. When one or more vacuum pads 58 of the retractable vacuum pad assemblies 50 are compressed, and in turn, when the retractable vacuum panel 34 is compressed, each self-sealing valve 114 of each vacuum pad 58 that is compressed, is opened up to pull vacuum, and the vacuum flow 108 (see FIG. 1) generates the vacuum force 113 (see FIG. 1) against the one or more trimmed portions 280 (see FIG. 7). Although FIGS. 3A-3B show all of the plurality of retractable vacuum panels 34 retracted, or withdrawn, in a retracted position 146, and all of the retractable vacuum pad assemblies 50 retracted, or withdrawn, in a retracted position 148, when the rotatable reel 14 rotates and rolls over, and pulls up, the one or more trimmed portions 280, not all of the plurality of retractable vacuum panels 34 have to be retracted, or withdrawn, at one time, and not all of the retractable vacuum pad assemblies 50 have to be retracted, or withdrawn, at one time.

As further shown in FIGS. 1, 2A, 2E, 3A, and 3D, the automated removal apparatus 10 further comprises a plurality of actuator assemblies 130 attached to the plurality of retractable vacuum panels 34. In one version, the plurality of actuator assemblies 130 comprise a plurality of piston assemblies 132 (see FIGS. 1, 2A, 2D, 2E, 3A, 3D). In another version, the plurality of actuator assemblies 130 comprise another suitable actuator assembly known in the art. Each actuator assembly 130, such as the piston assembly 132, is in the form of a linear actuator 134 (see FIGS. 1, 2A, 2E, 3A) configured to extend and retract each retractable vacuum panel 34, and in turn, each retractable vacuum pad assembly 50. As shown in FIGS. 2A and 3A, in one version, eight (8) actuator assemblies 130, such as piston assemblies 132, are coupled, or attached, to a surface 136 of the vacuum end 30 of the rotatable reel 14, and may be arranged in a wheel spoke configuration 138. In another version, the actuator assemblies 130, such as the piston assemblies 132, may be coupled, or attached, in another suitable arrangement, to the vacuum end 30. As shown in FIG. 2E, in one version, eight (8) actuator assemblies 130, such as eight (8) piston assemblies 132, are coupled, or attached, in the wheel spoke configuration 138 around a surface 140 of the drive end 32 of the rotatable reel 14. In another version, the actuator assemblies 130, such as the piston assemblies 132, may be coupled, or attached, in another suitable arrangement, to the drive end 32.

FIG. 2D shows a pair 130a of actuator assemblies 130, such as a pair 132a of piston assemblies 132, attached to each retractable vacuum panel 34, with one of each pair 130a attached at an opposite end of the retractable vacuum panel 34. As shown in FIG. 2D, one of the pair 130a of actuator assemblies 130, such as one of the pair 132a of piston assemblies 132, is attached to the first end 36a of each retractable vacuum panel 34. As further shown in FIG. 2D, the other of the pair 130a of actuator assemblies 130, such as the other of the pair 132a of piston assemblies 132, is attached to the second end 36b of each retractable vacuum panel 34. Each pair 130a of actuator assemblies 130, such as each pair 132a of piston assemblies 132, is configured to actuate, extend, or deploy each retractable vacuum panel 34 and the one or more retractable vacuum pad assemblies 50, and is configured to retract each retractable vacuum panel 34 and the one or more retractable vacuum pad assemblies 50.

Each of the plurality of piston assemblies 132 comprises a piston rod 150 (see FIGS. 1, 2A, 2E, 3A), an air cylinder 152 (see FIGS. 1, 2A, 2E, 3A), and a piston lock 154 (see FIGS. 1, 2A, 2E, 3A), connected in a series configuration 156 (see FIGS. 1, 2A, 2E, 3A). As shown in FIGS. 2A and 2E, each piston rod 150 comprises a first end 160a attached to the retractable vacuum panel 34, and comprises a second end 160b attached to the air cylinder 152. The first end 160a of each piston rod 150 on the vacuum end 30 (see FIG. 2A) of the rotatable reel 14 is attached to the first end 36a (see FIG. 2A) of each retractable vacuum panel 34, via an attachment element 161 (see FIGS. 2A, 2D, 3A), such as in the form of a bolt, a pin, a screw, a joint, or another suitable attachment element. The first end 160a of each piston rod 150 on the drive end 32 (see FIG. 2E) of the rotatable reel 14 is attached to the second end 36b (see FIG. 2E), respectively, of each retractable vacuum panel 34, via the attachment element 161 (see FIG. 2E), such as in the form of a bolt, a pin, a screw, a joint, or another suitable attachment element. As shown in FIGS. 2A and 2E, the piston rod 150 is in an extended position 164. As shown in FIGS. 3A and 3D, the piston rod 150 is in a compressed position 166.

As shown in FIGS. 2A and 3A, the air cylinder 152 of each of the plurality of piston assemblies 132 has a free end 157 that is configured for connection to, and connects to, an air hose 158 (see FIGS. 2A, 3A), for receiving air flow 110 (see FIG. 1), such as compressed air flow 110a (see FIG. 1), discussed in further detail below with respect to FIGS. 4A-4B. Air flow 110, such as compressed air flow 110a, to the air cylinders 152 (see FIG. 2A) allows the air cylinders 152 to actuate or extend the piston rods 150, which, in turn, causes the plurality of retractable vacuum panels 34 and the one or more retractable vacuum pad assemblies 50, to actuate or extend outwardly, as the piston rods 150 are connected to the plurality of retractable vacuum panels 34.

As further shown in FIGS. 2A and 3A, the piston lock 154 is attached to, or attached around, a portion of the air cylinder 152. The piston lock has a first end 162a (see FIG. 2A) and a second end 162b (see FIG. 2A). In one version, the piston lock 154 is a unidirectional piston lock 154a (see FIGS. 1, 2A, 3A) that allows the piston rod 150 to be compressed and held in the compressed position 166, and prevents the piston rod 150 from extending. By preventing the piston rod 150 from extending, the piston lock 154, such as the unidirectional piston lock 154a, enables the vacuum flow 108 (see FIG. 1) to continue even after the one or more trimmed portions 280 are already wound around the outer circumference 24 (see FIG. 1) of the rotatable reel 14 and already engaged, and until the one or more trimmed portions 280 are ready to be released from the rotatable reel 14. When the process restarts, air flow 110, such as compressed air flow 110a, sent to the air cylinder 152 and the piston rod 150 resets the piston lock 154, such as the unidirectional piston lock 154a.

The automated removal apparatus 10 further comprises a plurality of friction reducing elements 168 (see FIGS. 1, 2A-2F, 3A-3D) attached and disposed around the rotatable reel 14, and in particular, attached and disposed around the hub portion 22 of the rotatable reel 14. In one version, the plurality of friction reducing elements 168 comprise a plurality of ball bearings 170 (see FIGS. 1, 2A-2F, 3A-3D). The ball bearings 170 may be made of a metal, such as steel, stainless steel, aluminum, or another suitable hard and durable metal, or the ball bearings 170 may be made of a plastic material. In another version, the plurality of friction reducing elements 168 comprise other suitable friction reducing elements 168 having a smooth surface to facilitate release of the one or more trimmed portions 280 from the rotatable reel 14.

As shown in FIGS. 2A and 2F, the plurality of friction reducing elements 168, such as the plurality of ball bearings 170, are preferably arranged in one or more rows 172 attached to, or disposed on, a raised portion 174, such as in the form of a platform 174a, that is non-retractable and fixed. As shown in FIG. 2F, the raised portion 174, such as the platform 174a, has a length 176 that is substantially equal to the length 44 of the retractable vacuum panel 34.

As further shown in FIG. 2F, the plurality of friction reducing elements 168, such as the plurality of ball bearings 170, are positioned between the plurality of retractable vacuum panels 34. In one version, each row 172 of the plurality of friction reducing elements 168, such as the plurality of ball bearings 170, on the raised portion 174, such as the platform 174a, is positioned between adjacent pairs 34a (see FIG. 2F) of retractable vacuum panels 34. In another version, each row 172 of the plurality of friction reducing elements 168, such as the plurality of ball bearings 170, may be arranged in some other manner with respect to the retractable vacuum panels 34, for example, such as two or more retractable vacuum panels 34 positioned between two rows 172 of the plurality of friction reducing elements 168, such as the plurality of ball bearings 170. When the plurality of retractable vacuum panels 34 are retracted to the retracted position 146 (see FIG. 3D), the raised portion 174 (see FIG. 3D), such as the platform 174a (see FIG. 3D), with the plurality of friction reducing elements 168, such as the plurality of ball bearings 170, does not retract, and the plurality of friction reducing elements 168, such as the plurality of ball bearings 170, remain as contact points 178 (see FIGS. 1, 3D, 11A) to facilitate release of the one or more trimmed portions 280 (see FIGS. 7, 11A) from the rotatable reel 14. When the plurality of friction reducing elements 168, such as the plurality of ball bearings 170, function as the sole, or only, contact points 178, the contact points 178 are the highest points in contact with the one or more trimmed portions 280, and the one or more trimmed portions 280 can easily slide along the surfaces of the plurality of friction reducing elements 168, such as the plurality of ball bearings 170, and slide off of the rotatable reel 14. The plurality of friction reducing elements 168, such as the plurality of ball bearings 170, serve as a hard stop for the one or more trimmed portions 280 wound up, or reeled up, on the rotatable reel 14.

The automated removal apparatus 10 further comprises a drive assembly 180 (see FIGS. 1, 2A-2B, 2E-2F, 3A-3B, 3D) attached to the rotatable reel 14. The drive assembly 180 is configured to drive, power, and control, and drives, powers, and controls the rotation of the rotatable reel 14. As shown in FIG. 2F, the drive assembly 180 comprises a rotary stage assembly 182 attached to a support structure 184.

Now referring to FIG. 2G, FIG. 2G is an illustration of a rear perspective view of an exemplary version of the rotary stage assembly 182 of the drive assembly 180 of the automated removal apparatus 10 of FIG. 2F. The rotary stage assembly 182 of the drive assembly 180 comprises a motor 186 (see FIGS. 1, 2D-2G). In one version, the motor 186 comprises an electric motor 186a (see FIGS. 1, 2F-2G). The electric motor 186a may comprise a belt-drive motor 186b (see FIG. 1), or another suitable type of electric motor known in the art. The electric motor 186a produces a rotary force that drives, or runs, the rotatable reel 14. The motor 186, such as the electric motor 186a, may be powered by a battery, an electric generator, or another suitable power source known in the art. As shown in FIG. 2G, the motor 186 has a cylindrical body 188 with longitudinal grooves 189.

The rotary stage assembly 182 of the drive assembly 180 further comprises a rotary stage 190 (see FIGS. 1, 2D, 2G). As shown in FIG. 2G, the rotary stage 190 is connected to the motor 186, via an attachment assembly 192. As shown in FIG. 2G, the attachment assembly 192 comprises a collar portion 194 attached to the rotary stage 190. The collar portion 194 has an opening 195 (see FIG. 2G) through which a portion of the motor 186 is inserted. The attachment assembly 192 further comprises a face plate 196 (see FIG. 2G) attached to the rotary stage 190.

As shown in FIGS. 2F and 2G, in one version, the rotary stage 190 comprises a fixed portion 198, such as in the form of a fixed casing 198a, or another suitable fixed portion. The motor 186 is attached to the fixed portion 198, such as the fixed casing 198a, via the attachment assembly 192. The fixed portion 198, such as the fixed casing 198a, has a first side 200a (see FIGS. 2F, 2G) and a second side 200b (see FIGS. 2F, 2G). As shown in FIG. 2F, the first side 200a of the fixed portion 198, such as the fixed casing 198a, is attached to the support structure 184 of the drive assembly 180. As shown in FIGS. 2A and 2F, the support structure 184 comprises a cylindrical cover portion 202 and a block portion 203 (see also FIG. 2D). The support structure 184 is preferably made of one or more metal materials, such as steel, stainless steel, or another hard and durable metal material.

As further shown in FIGS. 2F and 2G, the rotary stage 190 comprises a rotatable portion 204, such as in the form of a rotatable ring 204a. The rotatable portion 204, such as the rotatable ring 204a, has a first side 206a (see FIGS. 2F, 2G) attached to the second side 200b of the fixed portion 198, such as the fixed casing 198a. The rotatable portion 204, such as the rotatable ring 204a, has a second side 206b (see FIGS. 2F, 2G) attached to an offset element 208 (see FIGS. 2D, 2F) of the rotatable reel 14. As shown in FIG. 2F, the offset element 208 is attached to the drive end 32 of the rotatable reel 14.

The automated removal apparatus 10 may further comprise a plunger element 210 (see FIGS. 1, 2A-2B, 2D-2F, 3A-3B, 3D) coupled to the drive assembly 180. In one version, the plunger element 210 comprises an air cylinder plunger 210a (see FIGS. 1, 2A-2B, 2D-2F, 3A-3B, 3D), or pneumatic plunger. In another version, the plunger element 210 comprises an actuator, or another suitable plunger element, or device, to assist in moving, pushing, and releasing the one or more trimmed portions 280 (see FIG. 7) off the rotatable reel 14. As shown in FIG. 2A, the plunger element 210, such as the air cylinder plunger 210a, has a first end 212a, a second end 212b, and an elongated body 214. As further shown in FIG. 2A, the elongated body 214 has a fixed portion 214a and an extendable portion 214b. As shown in FIGS. 1, 2A, 3A, the plunger element 210, such as the air cylinder plunger 210a, is in a retracted position 216. As shown in FIG. 3D, the plunger element 210, such as the air cylinder plunger 210a, is in an extended position 218.

The plunger element 210, such as the air cylinder plunger 210a, is operable to move from the retracted position 216 (see FIG. 2A) to the extended position 218 (see FIG. 3D), to assist in moving, pushing, and releasing the one or more trimmed portions 280 off the rotatable reel 14, when the one or more trimmed portions 280 are ready to be released from the rotatable reel 14. In one version, the plunger element 210, such as the air cylinder plunger 210a, is extended and retracted using an air cylinder mechanism or device (not shown) disposed within the interior of the fixed portion 214a of the elongated body 214. In another version, another mechanism, such as an mechanical actuating mechanism or hydraulic actuating mechanism, is used to extend and retract the plunger element 210.

As shown in FIGS. 2A and 3A, the plunger element 210, such as the air cylinder plunger 210a, is coupled to the drive assembly 180. In particular, the plunger element 210, such as the air cylinder plunger 210a, is coupled to the block portion 203 (see FIGS. 2A, 3A) of the support structure 184 (see FIG. 2A) of the drive assembly 180, via a bracket element 220 (see FIG. 2A). However, the plunger element 210 may be coupled, or attached, to another portion of the automated removal apparatus 10. The bracket element 220 has an opening 222 (see FIG. 2A) through which a portion of the fixed portion 214a of the elongated body 214 of the plunger element 210, such as the air cylinder plunger 210a, is inserted and fixed to the bracket element 220.

The automated removal apparatus 10 may further comprise a connector assembly 224 (see FIGS. 1, 2A-2B, 2D-2F, 3A-3B, 3D). In one version, the connector assembly 224 comprises a tool change connector assembly 224a (see FIG. 2A). As shown in FIG. 2A, the connector assembly 224 has a first end 226a, a second end 226b, and one or more connector portions 228. As further shown in FIG. 2A, the first end 226a of the connector assembly 224 is attached to the block portion 203 of the support structure 184 of the drive assembly 180.

The automated removal apparatus 10 further comprises a pneumatic system 230 (see FIGS. 1, 2B, 3B, and 4A-4B) attached to the rotatable reel 14. As shown in FIGS. 2B, 3B, and 4A-4B, the pneumatic system 230 is mainly located in the interior 20 (see FIG. 2B) of the rotatable reel 14.

Figure 4A:
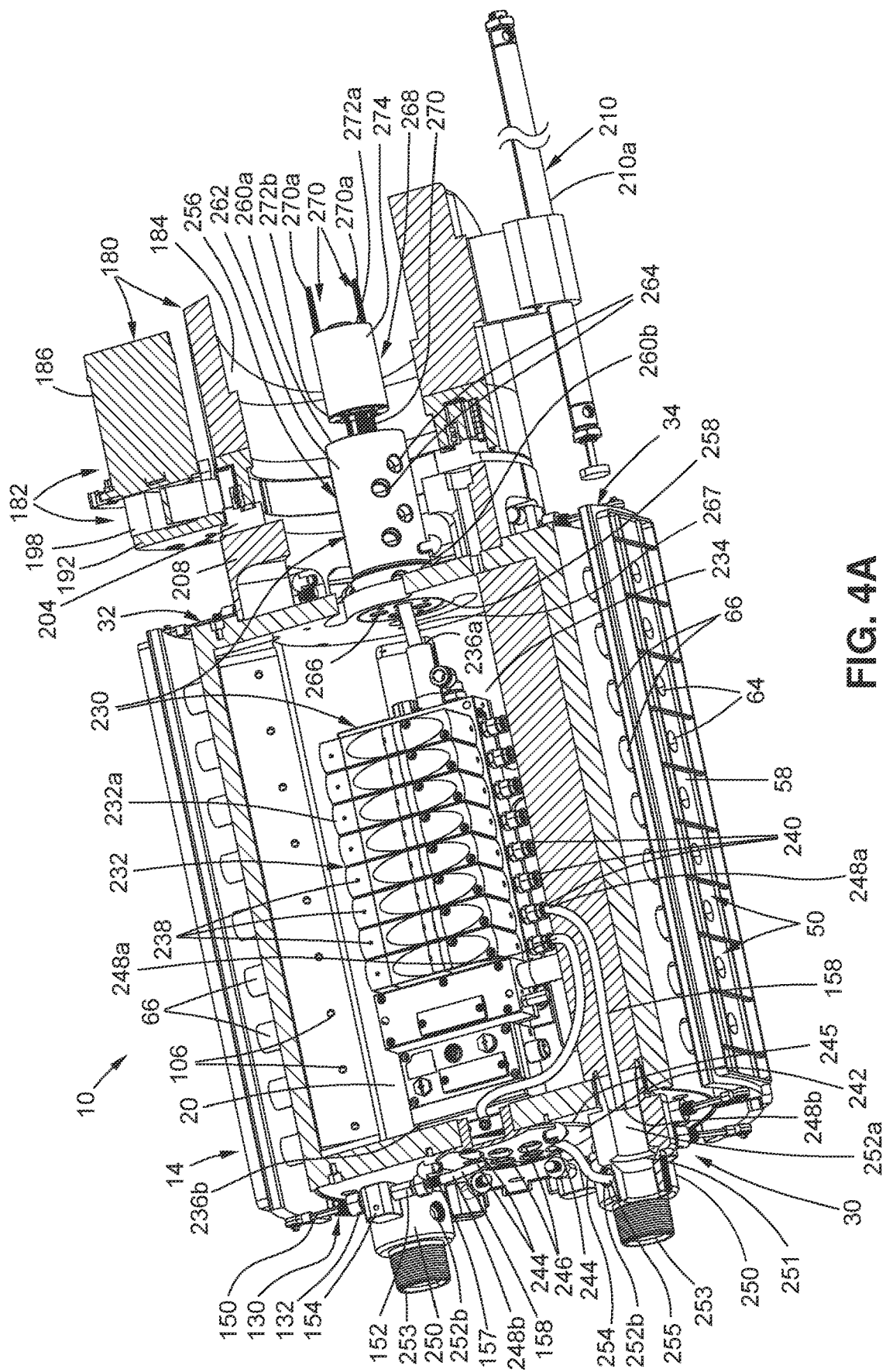
FIG. 4A is an illustration of a top perspective partial cross-sectional view of an exemplary version of an automated removal apparatus showing a pneumatic system.

Now referring to FIGS. 4A-4B, FIG. 4A is an illustration of a top perspective partial cross-sectional view of an exemplary version of an automated removal apparatus 10 showing a pneumatic system 230. FIG. 4B is an illustration of a left side perspective partial cross-sectional view of the automated removal apparatus 10 with the pneumatic system 230 of FIG. 4A.

As shown in FIGS. 4A-4B, the pneumatic system 230 comprises a valve manifold 232, such as a pneumatic valve manifold 232a, disposed within a cavity 234 inside the rotatable reel 14. The valve manifold 232, such as the pneumatic valve manifold 232a, has a first end 236a (see FIGS. 4A-4B) and a second end 236b (see FIGS. 4A-4B). In one version, the valve manifold 232, such as the pneumatic valve manifold 232a, is a FESTO pneumatic valve manifold, obtained from Festo Corporation USA of Islandia, New York, a subsidiary of Festo SE & Co., of Germany. (FESTO is a registered trademark owned by Festo SE & Co., of Germany.)

As shown in FIGS. 4A-4B, the valve manifold 232, such as the pneumatic valve manifold 232a, comprises a plurality of control valves 238 coupled, or attached, to a plurality of fittings 240. The plurality of control valves 238 may comprise air-pilot valves, solenoid valves, or another type of control valve known in the art. The valve manifold 232, such as the pneumatic valve manifold 232a, controls what the air flow 110 (see FIG. 1), such as the compressed air flow 110a (see FIG. 1), from an air supply 112 (see FIG. 1), such as a compressed air supply 112a (see FIG. 1), is used for. Preferably, the air supply 112 is a single source air supply 112b (see FIG. 1). Additionally, the valve manifold 232, such as the pneumatic valve manifold 232a, sends signals to open and close the correct control valve 238.

The valve manifold 232, such as the pneumatic valve manifold 232a, is operable to control, and controls, the air flow 110, such as the compressed air flow 110a (see FIG. 1), to actuate the plurality of actuator assemblies 130 (see FIGS. 4A-4B), such as the plurality of piston assemblies 132 (see FIGS. 4A-4B). In particular, the valve manifold 232, such as the pneumatic valve manifold 232a, is operable to control the air flow 110, such as the compressed air flow 110a, to the piston locks 154 (see FIG. 4A), and to the air cylinders 152 (see FIG. 4A) to extend or compress the piston rods 150 (see FIG. 4A), which in turn, extend or retract the plurality of retractable vacuum panels 34 (see FIGS. 4A-4B) of the rotatable reel 14 (see FIGS. 4A-4B), and to extend or retract the one or more retractable vacuum pad assemblies 50 (see FIGS. 4A-4B).

As shown in FIG. 4A, the free end 157 of the air cylinder 152 is attached to an air hose 158. The air hose 158 extends from one of the fittings 240 through an end plate 242 (see FIGS. 4A-4B) having a plurality of holes 244 (see FIGS. 4A-4B). The end plate 242 is attached to a first opening 245 (see FIGS. 4A-4B) in the cavity 234, where the first opening 245 is located at the vacuum end 30 of the rotatable reel 14. As shown in FIGS. 4A-4B, the end plate 242 is positioned opposite the second end 236b of the valve manifold 232. In one version, the holes 244 (see FIGS. 2A, 3A, 4A-4B) of the end plate 242 (see FIGS. 2A, 3A, 4A-4B) are in a 4×4 (four by four) hole pattern 246 (see FIGS. 2A, 3A, 4A-4B) with sixteen (16) holes 244, and the end plate 242 is configured to accommodate one (1) to sixteen (16) air hoses 158 through the holes 244. In other versions, the end plate 242 may have one (1) to fifteen (15) holes 244 or more than sixteen (16) holes 244.

The end plate 242 is configured to receive, and receives, one or more air hoses 158 (see FIGS. 2A, 3A, 4A-4B) each inserted through one of the one or more holes 244. Although only one air hose 158 is shown in FIG. 4A attached to a free end 157 of the air cylinder 152, each free end 157 of each air cylinder 152 of each actuator assembly 130, such as the piston assembly 132, on both the vacuum end 30 and the drive end 32 is configured to be attached to an air hose 158 that is attached to one of the fittings 240 of the valve manifold 232. Preferably, all of the sixteen (16) air cylinders 152 on the vacuum end 30 and the drive end 32 of the rotatable reel 14 are attached to air hoses 158, and each air hose 158 is preferably attached to one of the fittings 240 of the valve manifold 232.

Each of the one or more air hoses 158 (see FIGS. 2A, 3A, 4A-4B) has a first end 248a (see FIGS. 4A-4B) connected to one of the fittings 240 of the valve manifold 232, such as the pneumatic valve manifold 232a, and each of the one or more air hoses 158 has a second end 248b (see FIG. 4A) attached to the free end 157 of the air cylinder 152 of the actuator assembly 130, such as the piston assembly 132. The air hose 158 is configured to carry, and carries, the air flow 110a, such as the compressed air flow 110a, from the valve manifold 232 to the air cylinder 152 of the actuator assembly 130, such as the piston assembly 132.

The valve manifold 232, such as the pneumatic valve manifold 232a, is further operable to control, and controls, the air flow 110, such as the compressed air flow 110a (see FIG. 1), to one or more vacuum generators 250 (see FIGS. 2A, 3A, 4A-4B) to generate a vacuum flow 108 (see FIG. 1) to the vacuum cavities 92 (see FIGS. 2B, 3B), to the vacuum cylinders 66 (see FIGS. 4A-4B), through the vacuum pads 58 (see FIGS. 4A-4B), and out through the vacuum ports 64 (see FIGS. 4A-4B) of the retractable vacuum pad assemblies 50 (see FIGS. 4A-4B). The valve manifold 232, such as the pneumatic valve manifold 232a, controls the on and off of the air flow 110 to the piston assemblies 132 and to the vacuum generators 250. The valve manifold 232, such as the pneumatic valve manifold 232a, further selectively pulls vacuum and controls the vacuum flow 108 out of each individual vacuum port 64 (see FIGS. 4A-4B).

In one version, the automated removal apparatus 10 has four (4) vacuum generators 250 (see FIGS. 2A, 3A, 4A-4B) positioned at the vacuum end 30 of the rotatable reel 14. In other versions, the automated removal apparatus 10 may have one (1) to three (3) vacuum generators 250, or more than four (4) vacuum generators 250. Each vacuum generator 250 comprises a nozzle 251 (see FIGS. 4A-4B) located within the vacuum generator 250. As shown in FIG. 4A, each vacuum generator 250 has a first inlet opening 252a, a second inlet opening 252b, and an exhaust outlet 253. As further shown in FIGS. 4A-4B, an air hose 158 is attached at a first end 248a of one of the fittings 240 and is attached at a second end 248b to the first inlet opening 252a, in order to carry the air flow 110, such as the compressed air flow 110a, to the vacuum generator 250, from the valve manifold 232.

Although only one air hose 158 is shown in FIG. 4A attached to the first inlet opening 252a of the vacuum generator 250 from the valve manifold 232, each first inlet opening 252a of each vacuum generator 250 is configured to be attached to an air hose 158 that is attached to one of the fittings 240 of the valve manifold 232. Preferably, each of the four (4) vacuum generators 250 on the vacuum end 30 of the rotatable reel 14 has the first inlet opening 252a attached to an air hose 158, and each air hose 158 is preferably attached to one of the fittings 240 of the valve manifold 232.

The air flow 110, such as the compressed air flow 110a, flows through the first inlet opening 252a (see FIG. 4A) and is directed through the nozzle 251 (see FIG. 4A), which constricts the air flow 110, such as the compressed air flow 110a. The air flow 110, such as the compressed air flow 110a, enters the first inlet opening 252a at a high pressure and a low velocity, and as it passes through the nozzle 251, which constricts the air flow 110, the air flow 110, such as the compressed air flow 110a, increases in velocity and decreases in pressure.

When the air flow 110, such as the compressed air flow 110a, flows through the first inlet opening 252a and through the nozzle 251, a Venturi effect is created inside the vacuum generator 250. As used herein, "Venturi effect" means a reduction in air pressure that results when air speed increases as it flows through a constricted section of a tube or pipe, for example, the nozzle 251 inside the vacuum generator 250.

The air flow 110, such as compressed air flow 110a, is used to generate the Venturi effect in the vacuum generators 250. A portion of this air flow 110, such as the compressed air flow 110a, is then exhausted out through the exhaust outlet 253 (see FIG. 4A). Another portion of this air flow 110, such as the compressed air flow 110a, generates the vacuum flow 108 (see FIG. 1) which flows through the second inlet opening 252b (see FIG. 4A), through a vacuum tube 254 (see FIG. 4A), through the vacuum channels 107 (see FIGS. 2B, 3B), through the one or more of the retractable vacuum pad assemblies 50, and out through one or more of the vacuum ports 64 of the one or more retractable vacuum pad assemblies 50. The vacuum flow 108 generates the vacuum force 113 (see FIG. 1), for example, a vacuum suction, to pull up and hold one or more sections 280a (see FIG. 7) of the one or more trimmed portions 280 (see FIG. 7) against one or more vacuum pads 58 (see FIGS. 4A-4B). The vacuum source 109 (see FIG. 1) of the vacuum flow 108 comprises the air flow 110, such as the compressed air flow 110a, that is constricted and generated by the Venturi effect in the vacuum generators 250. The vacuum flow 108 creates suction by means of the Venturi effect.

As shown in FIG. 4A, at the second inlet opening 252b of the vacuum generator 250, the vacuum tube 254 has an end 255 attached to the second inlet opening 252b. The vacuum tube 254 extends from the second inlet opening 252b, through one of the holes 244 (see FIG. 4A) in the end plate 242 (see FIG. 4A), and into one of the vacuum channels 107 (see FIGS. 2B, 3B) within the interior 20 (see FIGS. 2B, 3B) of the rotatable reel 14 (see FIG. 4A).

The vacuum tube 254 is configured to carry, and carries, the vacuum flow 108 (see FIG. 1) between the vacuum generator 250, the vacuum channels 107, and the retractable vacuum pad assemblies 50 (see FIG. 4A), via the channel openings 106 (see FIG. 4A). The vacuum flow 108 is drawn through the vacuum cavity 92 (see FIG. 2B), the vacuum cylinder 66 (see FIG. 2B), through the vacuum pad 58 (see FIGS. 2B, 4A), and out through the vacuum port 64 (see FIGS. 2A, 4A), when the self-sealing valve 114 (see FIGS. 3B-3C) is in the open position 125 (see FIGS. 3B-3C). The vacuum flow 108 generates the vacuum force 113 (see FIG. 1) that is configured to pull up and hold, and that pulls up and holds, one or more sections 280a (see FIG. 5) of the one or more trimmed portions 280 (see FIG. 5) against the vacuum pad 58 that is in contact with, and compressed against, the one or more trimmed portions 280. The rotatable reel 14 of the automated removal apparatus 10 is operable to roll up, wind up, or reel up, the one or more trimmed portions 280, held by the vacuum force 113, around the outer circumference 24 (see FIGS. 1, 5) of the rotatable reel 14 for removal. Preferably, the outer circumference 24 of the rotatable reel 14 corresponds to a length of each of the one or more trimmed portions 280 to be rolled up, wound up, or reeled up around the rotatable reel 14.

Although only one vacuum tube 254 is shown in FIG. 4A attached to the second inlet opening 252b of the vacuum generator 250, each second inlet opening 252b of each vacuum generator 250 is configured to be attached to a vacuum tube 254 that is coupled to, or attached to, one of the vacuum channels 107 within the interior 20 of the rotatable reel 14. Preferably, each of the four (4) vacuum generators 250 on the vacuum end 30 of the rotatable reel 14 has the second inlet opening 252b attached to a vacuum tube 254, and each vacuum tube 254 is preferably attached to one of the vacuum channels 107.

As shown in FIGS. 4A-4B, the pneumatic system 230 further comprises a rotary union 256 inserted and attached through a second opening 258 in the cavity 234. The second opening 258 is located at the drive end 32 (see FIGS. 4A-4B) of the rotatable reel 14. The rotary union 256 has a first end 260a, a second end 260b, and a cylindrical housing 262 disposed between the first end 260a and the second end 260b. The cylindrical housing 262 has a plurality of holes 264 (see FIGS. 4A-4B) formed through the exterior of the cylindrical housing 262. As shown in FIGS. 4A-4B, the second end 260b of the rotary union 256 is inserted and attached through the second opening 258 and faces opposite the first end 236a of the valve manifold 232, such as the pneumatic valve manifold 232a. As shown in FIG. 4A, the second end 260b of the rotary union 256 has a plurality of ports 266 configured to connect to, and connecting to, one or more air inlet hoses 267 connected to the first end 236a of the valve manifold 232. Air flow 110 (see FIG. 1), such as compressed air flow 110a (see FIG. 1), flows from the rotary union 256 through the air inlet hose 267 (see FIG. 4A) into the valve manifold 232.

As used herein, "rotary union" means a rotating part that provides an interface between a rotating or rotatable component, i.e., the rotatable reel 14, and a stationary component, i.e., slip ring 268 and air line 276 (see FIG. 9A), and that allows transfer of air, air pressure, or other gases and fluids between the stationary component and the rotating component. The rotary union 256 may be made of a metal material, such as aluminum, steel, stainless steel, or another suitable metal material.

As shown in FIGS. 4A-4B, the pneumatic system 230 further comprises a slip ring 268 coupled to the first end 260a of the rotary union 256. FIGS. 4A-4B show a plurality of wires 270 between the slip ring 268 and the rotary union 256. The slip ring 268 has a first end 272a (see FIGS. 4A-4B), a second end 272b (see FIGS. 4A-4B), and a cylindrical body 274 (see FIGS. 4A-4B) formed between the first end 272a and the second end 272b. As shown in FIGS. 4A-4B, portions of the plurality of wires 270 are inserted through the first end 260a of the rotary union 256 and are housed in the cylindrical housing 262, and other portions of the plurality of wires 270 are inserted through the second end 272b of the slip ring 268, extend through the cylindrical body 274 of the slip ring 268, and extend out of the first end 272a of the slip ring 268. As shown in FIGS. 4A-4B, free ends 270a of the plurality of wires 270 extend out of the first end 272a of the slip ring 268. As further shown in FIG. 4B, a fixed contact 275 is attached to the first end 272a of the slip ring 268. Although one fixed contact 275 is shown in FIG. 4B, more than one fixed contacts 275 may be attached to the first end 272a of the slip ring 268. As further shown in FIG. 4B, the first end 272a of the slip ring 268 has an air line fitting 277 configured to receive and connect to an air line 276 (see FIGS. 9A-9B, 10), discussed below, for delivering air flow 110 (see FIG. 1), such as compressed air flow 110a (see FIG. 1), through the slip ring 268, through the rotary union 256, and to the valve manifold 232 for dispersion to the plurality of piston assemblies 132 and to the vacuum generators 250.

As used herein, "slip ring" means an electromechanical device that allows for the transmission of power and electrical signals from a stationary component to a rotating component, and allows for making an electrical connection through the rotating component. The slip ring 268 may be made of a metal material, such as aluminum, steel, stainless steel, or another suitable metal material.

The rotary union 256 and the slip ring 268 allow for continuous rotation of the rotary union 256 and the rotatable reel 14, while delivering air flow 110 and electrical power and signals. In addition, the rotary union 256 and the slip ring 268 allow for multiple wires 270 to be attached without the wires 270 getting twisted or tangled, and allow for the rotary union 256 and rotatable reel 14 to rotate freely.

FIG. 4A further shows the drive assembly 180, including the rotary stage assembly 182 and the support structure 184. FIGS. 4A-4B further show the motor 186, the attachment assembly 192, the fixed portion 198, and the rotatable portion 204 of the rotary stage assembly 182. FIGS. 4A-4B further show the offset element 208 and the plunger element 210, such as the air cylinder plunger 210a.

Now referring to FIG. 5, FIG. 5 is an illustration of a right side view of an exemplary version of an automated removal apparatus 10 of the disclosure having an optional wheel assembly 278 attached to the drive assembly 180, and, in particular, attached to the block portion 203 of the support structure 184 (see FIG. 2A) of the drive assembly 180. FIG. 5 shows the rotatable reel 14 and the wheel assembly 278 in use with one or more trimmed portions 280. The one or more trimmed portions 280 may comprise one or more scrap portions 282 (see FIGS. 5, 7), and may comprise one or more non-scrap portions 284 (see FIG. 7). The one or more scrap portions 282 comprise one or more of, a scrap composite material portion 282a (see FIGS. 5, 7), a scrap backing material portion 282b (see FIGS. 5, 7), and a combination 282c (see FIG. 7) of the scrap composite material portion 282a coupled to the scrap backing material portion 282b. The one or more non-scrap portions 284 comprise one or more of, a non-scrap composite material portion 284a (see FIGS. 6A-6B, 7), a non-scrap backing material portion 284b (see FIG. 7), and a combination 284c (see FIG. 7) of the non-scrap composite material portion 284a coupled to the non-scrap backing material portion 284b.

Figure 7:
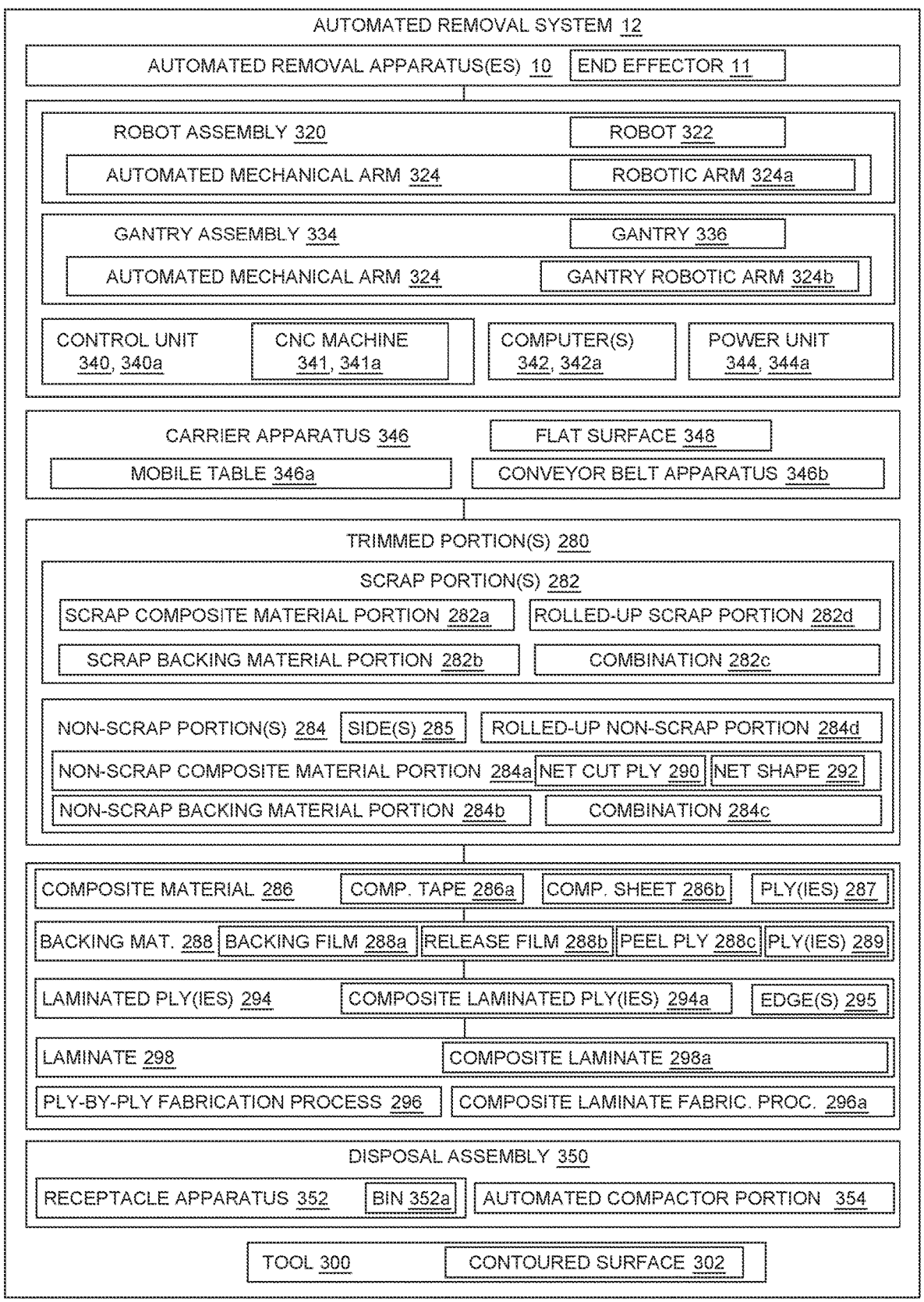
FIG. 7 is an illustration of a functional block diagram showing an exemplary version of an automated removal system of the disclosure.

The scrap composite material portion 282a and the non-scrap composite material portion 284a may comprise a composite material 286 (see FIG. 7). The scrap backing material portion 282b and the non-scrap backing material portion 284b may comprise a backing material 288 (see FIG. 7). In one version, the non-scrap composite material portion 284a is preferably in the form of a net cut ply 290 (see FIG. 7) having a net shape 292 (see FIG. 7). The one or more trimmed portions 280 comprise trimmed portions 280 of a laminated ply 294 (see FIG. 7), such as a composite laminated ply 294a (see FIG. 7), used in a ply-by-ply fabrication process 296 (see FIG. 7), such as a composite laminate fabrication process 296a (see FIG. 7), to form a laminate 298 (see FIG. 7), such as a composite laminate 298a (see FIG. 7).

As shown in FIG. 5, in one version, the wheel assembly 278 comprises a wheel 304 attached to an extending arm attachment 306. The extending arm attachment 306 is comprised of one or more elongated members 308 connected together and/or formed in a continuous manner. The extending arm attachment 306 has a first end 310a (see FIG. 5) attached, or coupled, to the drive assembly 180, and in particular, attached to the block portion 203 located below the connector assembly 224. The extending arm attachment 306 has a second end 310b (see FIG. 5) attached to the wheel 304. In one version, the wheel assembly 278 may be controlled by a control unit 340 (see FIG. 7), such as a computer numerical control (CNC) machine 341 (see FIG. 7), and may be powered by a power unit 344 (see FIG. 7). In other versions, the wheel assembly 278 may be controlled and powered with a pneumatic control and power system, an electric motor control and power system, or another suitable control and power system.

As shown in FIG. 5, the wheel assembly 278 extends aft of, and in an offset position 312 to, the rotatable reel 14. The extending arm attachment 306 is configured to position and move, and positions and moves, the wheel 304 with respect to the rotatable reel 14, and behind, or aft of, the rotatable reel 14, in the offset position 312. In one version, the offset position 312 is controlled by the control unit 340 (see FIG. 7) and by the location of the extending arm attachment 306 and the wheel 304. The offset position 312 may be automatically set to account for the starting location of the one or more trimmed portions 280, so as not to unintentionally engage and peel any part of the non-scrap portion 284 (see FIG. 7), such as the net cut ply 290 (see FIGS. 7, 9A). As further shown in FIG. 5, the wheel 304 of the wheel assembly 278 rotates in a wheel rotation direction 314, and the rotatable reel 14 rotates in a rotatable reel rotation direction 315. In operation, the wheel rotation direction 314 and the rotatable reel rotation direction 315 are the same direction. However, the rotatable reel 14 and the wheel 304 may rotate in the opposite direction, and both are configured to rotate in either a forward direction or backward direction.

As further shown in FIG. 5, when the rotatable reel 14 rotates in the rotatable reel rotation direction 315, one or more sections 280a of the trimmed portion 280, comprising the scrap composite material portion 282a, are pulled up and held against one or more vacuum pads 58 of the retractable vacuum pad assemblies 50 of the plurality of retractable vacuum panels 34, due to the vacuum force 113 (see FIG. 1). As further shown in FIG. 5, the rotatable reel 14 rolls up, winds up, or reels up, the trimmed portion 280, comprising the scrap composite material portion 282a, held by the vacuum force 113, around the outer circumference 24 of the rotatable reel 14 for removal. As further shown in FIG. 5, as the trimmed portion 280, comprising the scrap composite material portion 282a, is taken up, wound up, or reeled up, by the rotatable reel 14 of the automated removal apparatus 10, the wheel 304 of the wheel assembly 278 holds down the trimmed portion 280 comprising the scrap backing material portion 282b to separate the scrap backing material portion 282b from the scrap composite material portion 282a, as the rotatable reel 14 and the wheel 304 move along a forward direction 316, with the rotatable reel 14 contacting a surface 280b of the trimmed portion 280 comprising the scrap composite material portion 282a, and with the wheel 304 contacting a surface 280b of the trimmed portion 280 comprising the scrap backing material portion 282b. The scrap backing material portion 282b held down by the wheel assembly 278 may be left on a carrier apparatus 346 (see FIGS. 7, 9A) and re-used, may be taken up, wound up, or reeled up, by the rotatable reel 14 for removal and disposal in a similar manner as the scrap composite material portion 282a, or may be disposed of in another manner.

As shown in FIG. 5, the retractable vacuum pad assemblies 50 with the vacuum pads 58 holding the scrap composite material portion 282a are in an intermediate retracted position 148b, and the retractable vacuum panels 34 with the vacuum pads 58 holding the scrap composite material portion 282a are in an intermediate retracted position 146b, and the piston rods 150 of the piston assemblies 132 on the vacuum end 30 with the vacuum pads 58 holding the scrap composite material portion 282a are in a compressed position 166.

FIG. 5 further shows retractable vacuum panels 34 in the extended position 142, such as the fully extended position 142a, for the vacuum pads 58 that are not yet holding the scrap composite material portion 282a. FIG. 5 further shows retractable vacuum pad assemblies 50 in the extended position 144, such as the fully extended position 144a, for the vacuum pads 58 that are not yet holding the scrap composite material portion 282a. FIG. 5 further shows the piston rods 150 of the plurality of actuator assemblies 130, such as the plurality of piston assemblies 132, on the vacuum end 30 in the extended position 164 for the vacuum pads 58 that are not yet holding the scrap composite material portion 282a. FIG. 5 further shows the inner circumference 26 of the rotatable reel 14.

Figure 6B:
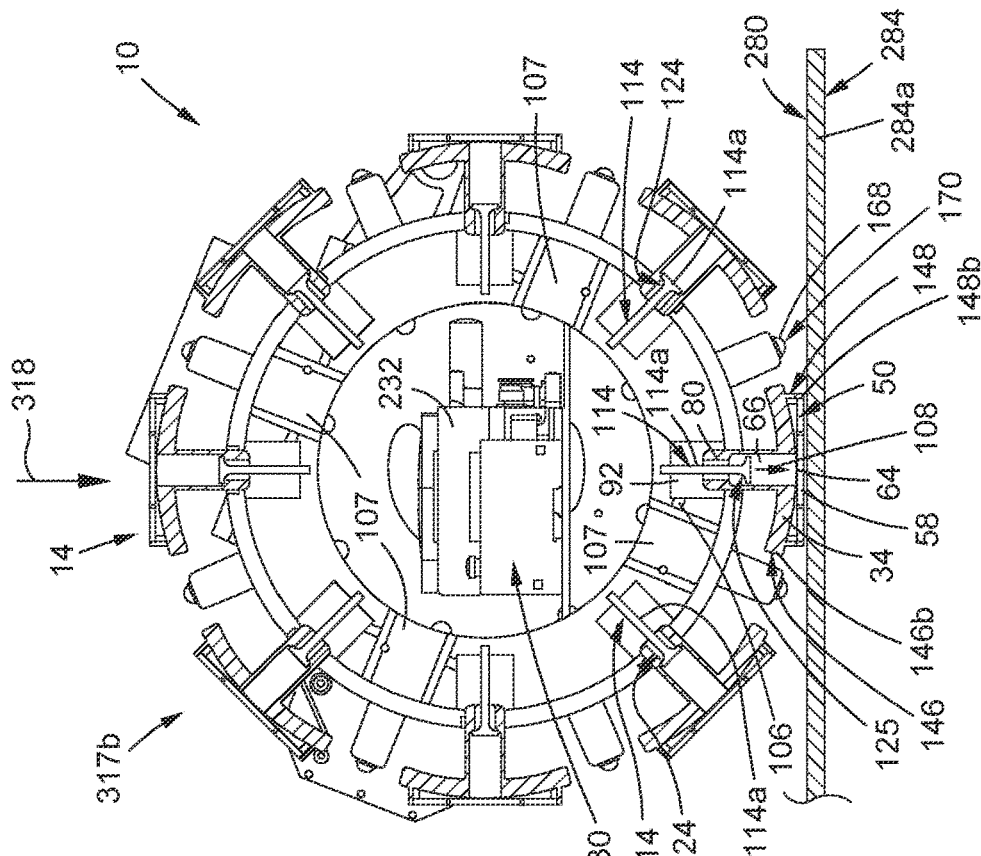
FIG. 6B is an illustration of a right side partial cross-sectional view of the automated removal apparatus of FIG. 6A, with the vacuum pad compressed against the non-scrap portion and showing the self-sealing valve in an open position.
Figure 6A:
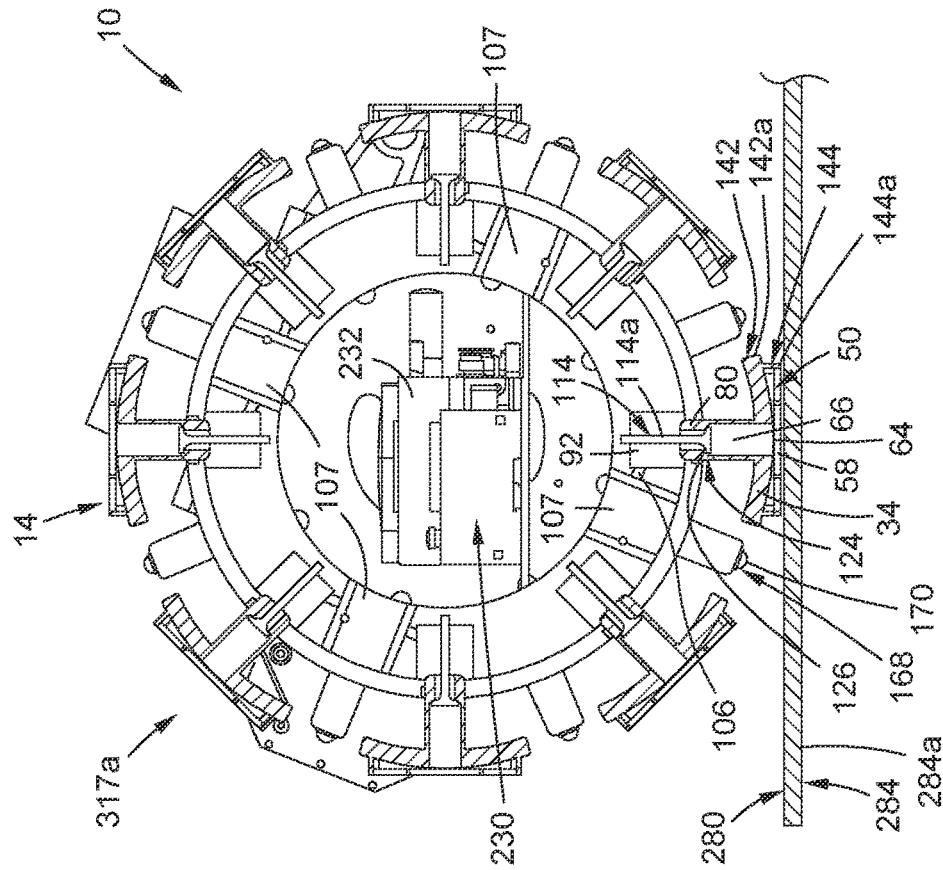
FIG. 6A is an illustration of a right side partial cross-sectional view of an exemplary version of an automated removal apparatus of the disclosure with a vacuum pad in contact with a non-scrap portion to be removed and with a self-sealing valve in a closed position.

Now referring to FIG. 6A, FIG. 6A is an illustration of a right side partial cross-sectional view of an exemplary version of an automated removal apparatus 10 of the disclosure with a vacuum pad 58 of a retractable vacuum pad assembly 50 of the rotatable reel 14 in contact with a trimmed portion 280 comprising a non-scrap portion 284, in the form of a non-scrap composite material portion 284a, to be removed, and showing a self-sealing valve 114, such as a spring-based self-sealing valve 114a, in a closed position 124. FIG. 6A shows a first position 317a of the rotatable reel 14, where the self-sealing valve 114 is in the closed position 124 seated against the throat portion 80 to form a seal 126 sealing off the vacuum cavity 92 from the vacuum cylinder 66 and the vacuum port 64.

FIG. 6A further shows the retractable vacuum pad assembly 50 that is in contact with the trimmed portion 280, in the extended position 144, such as the fully extended position 144a, and shows the retractable vacuum panel 34 in the extended position 142, such as the fully extended position 142a. FIG. 6A further shows the channel opening 106 between the vacuum channel 107 and the vacuum cavity 92, and shows the pneumatic system 230 including the valve manifold 232. FIG. 6A further shows the friction reducing elements 168, such as the ball bearings 170, on each side of the retractable vacuum pad assembly 50 that is in contact with the trimmed portion 280, at the same level, or substantially the same level, as the retractable vacuum panel 34.

Now referring to FIG. 6B, FIG. 6B is an illustration of a right side partial cross-sectional view of the automated removal apparatus 10 of FIG. 6A, with one vacuum pad 58 of one retractable vacuum pad assembly 50 compressed against the trimmed portion 280 comprising the non-scrap portion 284, in the form of the non-scrap composite material portion 284a, and showing the self-sealing valve 114, such as the spring-based self-sealing valve 114a, for this retractable vacuum pad assembly 50 in the open position 125. FIG. 6B shows a second position 317b of the rotatable reel 14, where the rotatable reel 14 is compressed in a downward compression direction 318, and one vacuum pad 58, or one row of vacuum pads 58, is compressed downwardly into the trimmed portion 280, to cause the self-sealing valve 114 to open to the open position 125 from the closed position 124 (see FIG. 6A). As shown in FIG. 6B, when the vacuum pad 58 compresses downwardly into the trimmed portion 280, the vacuum cylinder 66 moves inwardly into the vacuum cavity 92 and around the self-sealing valve 114, and the vacuum flow 108 is allowed to flow from the vacuum channel 107 through the channel opening 106, into the vacuum cavity 92, past the throat portion 80 into the vacuum cylinder 66 and out the vacuum port 64 to generate a vacuum force 113 (see FIG. 1), to pull up and hold the trimmed portion 280 against the vacuum port 64 and the vacuum pad 58. By compressing the vacuum pad 58 down against the non-scrap composite material portion 284a, the self-sealing valve 114 opens to the open position 125 to let the vacuum flow 108 get drawn through the retractable vacuum pad assembly 50. As further shown in FIG. 6B, the self-sealing valves 114, such as the spring-based self-sealing valves 114a, of the retractable vacuum pad assemblies 50, where the vacuum pads 58 are not compressed against the trimmed portion 280, remain in the closed position 124. The self-sealing valves 114 remains in the closed position 124 until the rotatable reel 14 applies compression to the one or more trimmed portions 280 to open the self-sealing valves 114.

FIG. 6B further shows the retractable vacuum pad assembly 50 that is compressed into the trimmed portion 280, in the retracted position 148, such as the intermediate retracted position 148b, and shows the retractable vacuum panel 34 in the retracted position 146, such as the fully retracted position 146a. FIG. 6B further shows the pneumatic system 230 including the valve manifold 232. FIG. 6B further shows the friction reducing elements 168, such as the ball bearings 170, on each side of the retractable vacuum pad assembly 50 that is compressed into the trimmed portion 280 now at the same level, or substantially the same level, as the vacuum pad 58.

Now referring to FIG. 7, FIG. 7 is an illustration of a functional block diagram showing an exemplary version of an automated removal system 12 of the disclosure. In another version of the disclosure, there is provided the automated removal system 12 for selectively removing one or more trimmed portions 280 of a laminated ply 294, such as a composite laminated ply 294a, in a ply-by-ply fabrication process 296, such as a composite laminate fabrication process 296a. As shown in FIG. 7, the automated removal system 12 comprises one or more automated removal apparatuses 10. As discussed above, the automated removal apparatus 10 comprises the rotatable reel 14 (see FIGS. 1, 2A). The rotatable reel 14 comprises the plurality of retractable vacuum panels 34 (see FIGS. 1, 2A) attached around the hub portion 22 (see FIGS. 1, 2A) of the rotatable reel 14. Each of the plurality of retractable vacuum panels 34 comprises one or more retractable vacuum pad assemblies 50 (see FIGS. 1, 2A). Each of the one or more retractable vacuum pad assemblies 50 comprises a vacuum pad 58 (see FIGS. 1, 2A) with a vacuum port 64 (see FIGS. 1, 2A), a vacuum cylinder 66 (see FIGS. 1, 2B) with a self-sealing valve 114 (see FIGS. 1, 2B), and a vacuum cavity 92 (see FIGS. 1, 2B). When the rotatable reel 14 rotates on the one or more trimmed portions 280 to be removed, the vacuum pad 58 is compressed against the one or more trimmed portions 280 and causes the self-sealing valve 114 to open to an open position 125 (see FIGS. 3C, 6B) from a closed position 124 (see FIGS. 2C, 6A).

As discussed above, the automated removal apparatus 10 further comprises the plurality of actuator assemblies 130 (see FIGS. 1, 2A), such as the plurality of piston assemblies 132 (see FIGS. 1, 2A), attached to the plurality of retractable vacuum panels 34. As discussed above, the automated removal apparatus 10 further comprises the plurality of friction reducing elements 168 (see FIGS. 1, 2A), such as the plurality of ball bearings 170 (see FIGS. 1, 2A), attached around the rotatable reel 14, and positioned between the plurality of retractable vacuum panels 34.

As discussed above, the automated removal apparatus 10 further comprises the drive assembly 180 (see FIGS. 1, 2A) attached to the rotatable reel 14. As discussed above, the automated removal apparatus 10 may further comprise the plunger element 210 (see FIGS. 1, 2A), such as the air cylinder plunger 210a (see FIGS. 1, 2A), coupled to the drive assembly 180. The plunger element 210, such as the air cylinder plunger 210a, is operable to assist in moving the one or more trimmed portions 280 off of the rotatable reel 14. As discussed above, the automated removal apparatus 10 may further comprise the connector assembly 224 (see FIGS. 1, 2A) attached to the drive assembly 180.

As discussed above, the automated removal apparatus 10 further comprises the pneumatic system 230 (see FIGS. 4A-4B) attached to the rotatable reel 14. The pneumatic system 230 comprises the valve manifold 232 (see FIGS. 4A-4B) operable to control the air flow 110 (see FIG. 1), such as the compressed air flow 110a (see FIG. 1), to actuate the plurality of actuator assemblies 130, such as the plurality of piston assemblies 132. The valve manifold 232 is also operable to control the air flow 110, such as the compressed air flow 110a, to one or more vacuum generators 250 (see FIGS. 2A, 4A) to generate a vacuum flow 108 (see FIG. 1) through one or more of the vacuum ports 64 (see FIGS. 2A, 4A), and the vacuum flow 108 generating a vacuum force 113 (see FIG. 1) configured to pull up and hold the one or more trimmed portions 280 (see FIGS. 5, 6B, 7) against one or more of the vacuum pads 58, when the rotatable reel 14 is rotated over the one or more trimmed portions 280 to be removed. The rotatable reel 14 is operable to roll up, wind up, or reel up, the one or more trimmed portions 280, held by the vacuum force 113, around the outer circumference 24 (see FIG. 1, 5) of the rotatable reel 14, to selectively remove the one or more trimmed portions 280 of the laminated ply 294 (see FIG. 7), such as the composite laminated ply 294a (see FIG. 7), in the ply-by-ply fabrication process 296 (see FIG. 7), such as the composite laminate fabrication process 296a (see FIG. 7).

As discussed above, the automated removal apparatus 10 may further comprise the wheel assembly 278 (see FIG. 5) attached to the drive assembly 180. The wheel assembly 278 extends aft of, and in an offset position 312 (see FIG. 5) to, the rotatable reel 14.

Figure 9A:
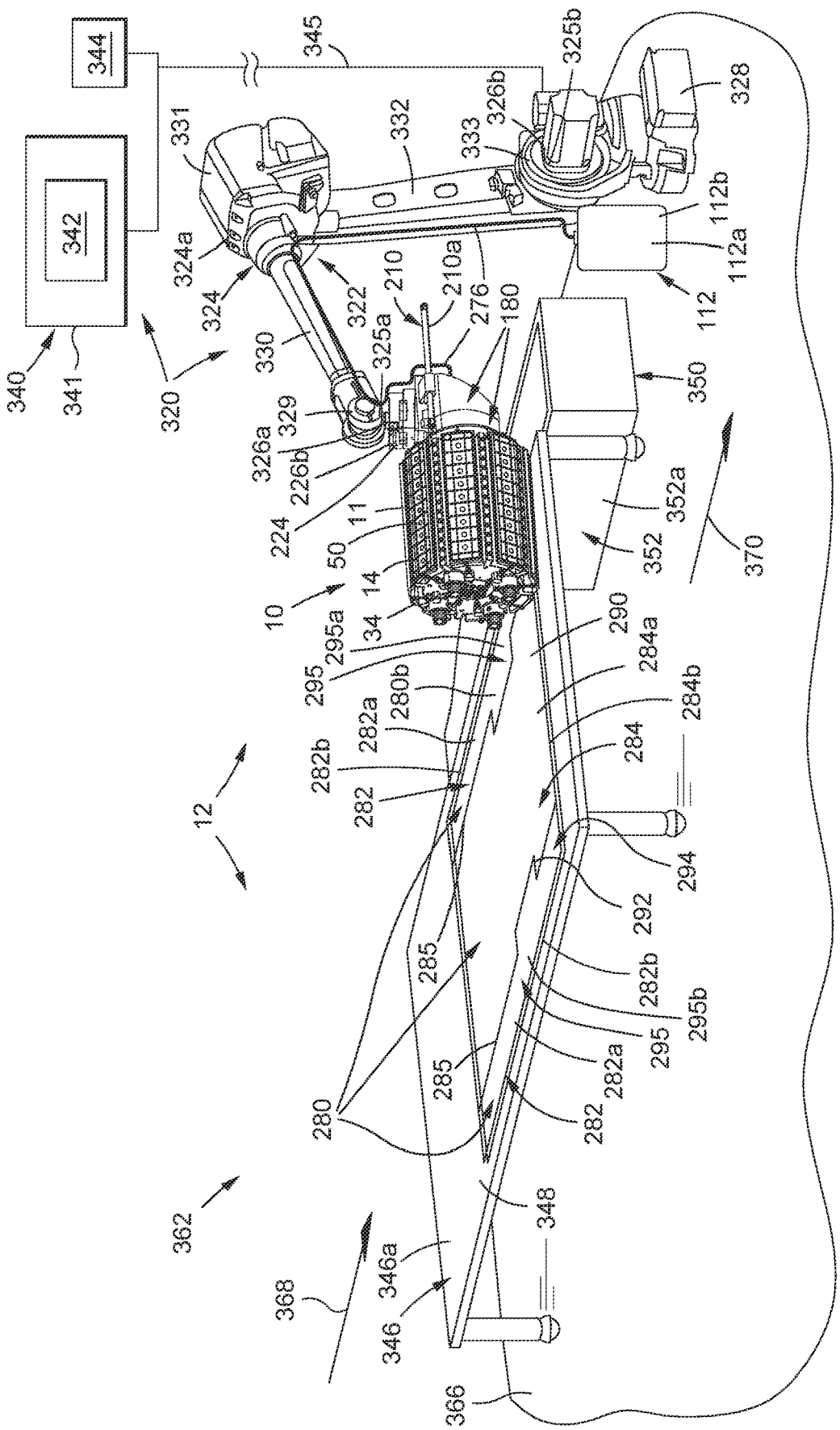
FIG. 9A is an illustration of an exemplary version of an automated removal system of the disclosure having one automated removal apparatus attached to a robot assembly.

In one version, as shown in FIG. 7, the automated removal system 12 comprises a robot assembly 320, or robot manipulator, attached to the automated removal apparatus 10, and the automated removal apparatus 10 functions as an end effector 11 (see also FIG. 1). As shown in FIG. 7, the robot assembly 320 comprises a robot 322 having an automated mechanical arm 324 comprising a robotic arm 324a. The robotic arm 324a has a first end 326a (see FIG. 9A) attached to the connector assembly 224, and has a second end 326b (see FIG. 9A) attached to a base 328 (see FIG. 9A). The connector assembly 224 is attached between the drive assembly 180 of the automated removal apparatus 10 and the first end 326a of the robotic arm 324a of the robot 322. As shown in FIG. 9A, the robotic arm 324a comprises a wrist portion 329 at the first end 326a, a lower arm portion 330 connected between the wrist portion 329 and an elbow portion 331, an upper arm portion 332 connected to the elbow portion 331, and a shoulder portion 333 connected to the upper arm portion 332 at the second end 326b.

Figure 10:
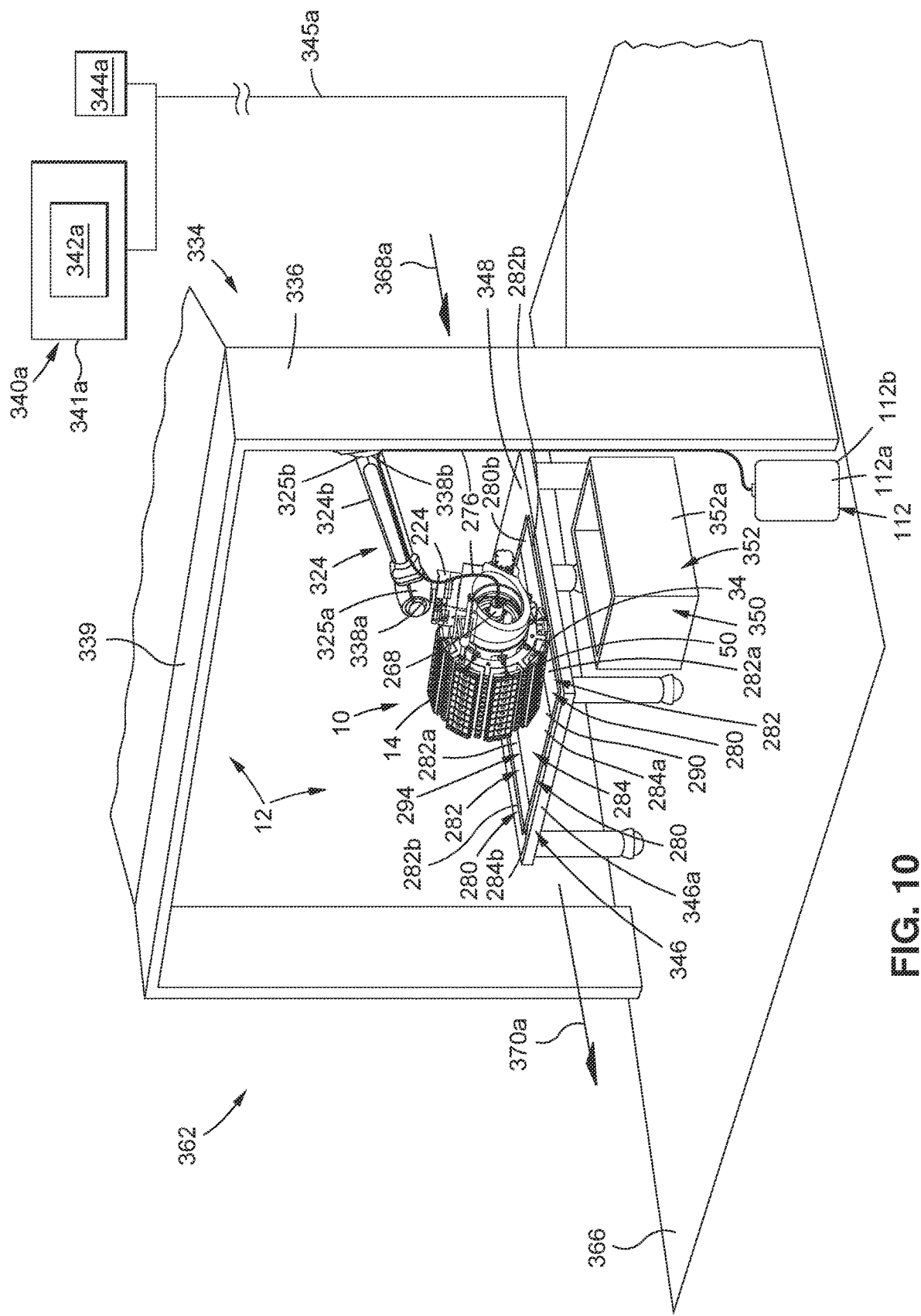
FIG. 10 is an illustration of another exemplary version of an automated removal system of the disclosure having one automated removal apparatus attached to a gantry assembly.

In another version, as shown in FIG. 7, the automated removal system 12 comprises a gantry assembly 334 attached to the automated removal apparatus 10. As shown in FIG. 7, the gantry assembly 334 comprises a gantry 336 having an automated mechanical arm 324 comprising a gantry robotic arm 324b. The gantry robotic arm 324b has a first end 338a (see FIG. 10) attached to the connector assembly 224, and has a second end 338b (see FIG. 10) attached to the gantry 336. As shown in FIG. 10, the gantry 336 comprises a gantry bridge 337.

As shown in FIG. 7, the robot assembly 320 and the gantry assembly 334 each further comprises a control unit 340 coupled to the robot 322, or coupled to the gantry 336, to control the robot 322, or to control the gantry 336. In one version, the control unit 340 may comprise a computer numerical control (CNC) machine 341 (see FIG. 7), having one or more computers 342 (see FIG. 7). As further shown in FIG. 7, the robot assembly 320 and the gantry assembly 334 each further comprises a power unit 344 coupled to the robot 322, or coupled to the gantry 336, to provide power to the robot 322, or to provide power to the gantry 336.

As shown in FIG. 7, the automated removal system 12 further comprises a carrier apparatus 346 configured to carry, convey, or transfer, and carrying, conveying, or transferring during the ply-by-ply fabrication process 296, such as the composite laminate fabrication process 296a, the one or more trimmed portions 280, to and from the automated removal apparatus 10 of the automated removal system 12. As shown in FIG. 7, the carrier apparatus 346 preferably has a flat surface 348. The carrier apparatus 346 may be in the form of a mobile table 346a (see FIGS. 7, 9A), a conveyor belt apparatus 346b (see FIG. 7), or another suitable carrier apparatus.

As shown in FIG. 7, the automated removal system 12 further comprises one or more trimmed portions 280, discussed above, that may comprise one or more scrap portions 282, and that may comprise one or more non-scrap portions 284. As shown in FIG. 7, the one or more scrap portions 282 comprise one or more of, a scrap composite material portion 282a, a scrap backing material portion 282b, and a combination 282c of the scrap composite material portion 282a coupled to the scrap backing material portion 282b. When the scrap portion 282 is rolled up, wound up, or reeled up around the rotatable reel 14, the scrap portion 282 is in the form of a rolled-up scrap portion 282d (see FIG. 7).

As further shown in FIG. 7, the one or more non-scrap portions 284 comprise one or more of, a non-scrap composite material portion 284a, a non-scrap backing material portion 284b, and a combination 284c of the non-scrap composite material portion 284a coupled to the non-scrap backing material portion 284b. When the non-scrap portion 284 is rolled up, wound up, or reeled up around the rotatable reel 14, the non-scrap portion 284 is in the form of a rolled-up non-scrap portion 284d (see FIG. 7).

As shown in FIG. 7, the scrap composite material portion 282a and the non-scrap composite material portion 284a may comprise a composite material 286, in the form of a composite tape 286a, in the form of a composite sheet 286b, or in the form of another suitable composite material. The composite tape 286a may comprise unidirectional fiber material. The fibers may be made from natural and/or man-made materials such as fiberglass, graphite, and the like. The composite sheet 286b may comprise dry fabrics or a prepreg, i.e., a fabric pre-impregnated with resin. The composite material 286 may comprise carbon fiber reinforced polymer (CFRP) materials, including plastic or thermoplastic materials known in the art. The composite material 286 used in the ply-by-ply fabrication process 296 (see FIG. 7) is preferably in the form of one or more plies 287 (see FIG. 7), or layers.

As shown in FIG. 7, the scrap backing material portion 282b and the non-scrap backing material portion 284b may comprise a backing material 288, in the form of a backing film 288a comprising a thin plastic sheet; in the form of a release film 288b comprising a thin plastic sheet; in the form of a peel ply 288c comprising a synthetic material such as woven fabric, nylon, or another suitable synthetic material; or in the form of another suitable backing material. In one version, the non-scrap composite material portion 284a is preferably in the form of a net cut ply 290 (see FIG. 7) having a net shape 292 (see FIG. 7). The backing material 288 used in the ply-by-ply fabrication process 296 (see FIG. 7) is preferably in the form of one or more plies 289 (see FIG. 7), or layers.

The one or more trimmed portions 280 comprising the one or more scrap portions 282 are trimmed portions 280, such as one, two, three, or four trimmed portions 280 that are removed with the automated removal apparatus 10 from around one or more sides 285 (see FIGS. 7, 9A) of the perimeter of the non-scrap portion 284, such as the non-scrap composite material portion 284a, in the form of the net cut ply 290. The one or more trimmed portions 280 comprising the one or more non-scrap portions 284 are trimmed portions 280, such as one trimmed portion 280 comprising the non-scrap composite material portion 284a in the form of the net cut ply 290, coupled to one trimmed portion 280 comprising the non-scrap backing material portion 284b, where both are trimmed and both proceed through the ply-by-ply fabrication process 296, such as the composite laminate fabrication process 296a, after trimming and removal of the scrap portions 282, or where both may be removed with the automated removal apparatus 10 and transferred to a tool 300 (see FIG. 7), or mold apparatus. In one version, the tool 300, or mold apparatus, has a contoured surface 302 (see FIG. 7).

In the ply-by-ply fabrication process 296, the ply 287, or layer, of composite material 286 is laminated to the ply 289, or layer, of the backing material 288 to form the laminated ply 294 (see FIG. 7), such as a composite laminated ply 294a (see FIG. 7). The laminated ply 294, such as the composite laminated ply 294a, has edges 295 (see FIG. 7) that are trimmed or cut by a trimming or cutting machine, and the one or more trimmed portions 280 (see FIG. 7) are obtained. The one or more trimmed portions 280 include the scrap portions 282 that comprise the edges 295 of the laminated ply 294 that have been trimmed or cut. Additionally, the one or more trimmed portions 280 include the non-scrap portions 284 that have been trimmed and have a net shape 292 (see FIG. 7). After trimming and removal of the scrap portions 282, the net cut ply 290 having the net shape 292 is used to form a laminate 298 (see FIG. 7), such as a composite laminate 298a (see FIG. 7). The one or more trimmed portions 280 comprise trimmed portions 280 of the laminated ply 294 (see FIG. 7), such as the composite laminated ply 294a (see FIG. 7), used in the ply-by-ply fabrication process 296 (see FIG. 7), such as the composite laminate fabrication process 296a (see FIG. 7), to form the laminate 298 (see FIG. 7), such as the composite laminate 298a (see FIG. 7).

As shown in FIG. 7, the automated removal system 12 may further comprise one or more disposal assemblies 350, to collect and to compact the one or more trimmed portions 280 comprising scrap portions 282 removed by, and from, the rotatable reel 14 of the automated removal apparatus 10. As shown in FIG. 7, the disposal assembly 350 comprises a receptacle apparatus 352, such as a bin 352a. However, the receptacle apparatus 352 may comprise another suitable receptable apparatus known in the art. In one version, the receptable apparatus 352 has an automated compactor portion 354 (see FIGS. 7, 11B) for compacting and compressing the one or more trimmed portions 280, comprising the one or more scrap portions 282, removed by, and released from, the rotatable reel 14.

As further shown in FIG. 7, the automated removal system 12 may further comprise a tool 300, or mold apparatus. In one version, the one or more trimmed portions 280 comprising the non-scrap composite material portion 284a, in the form of the net cut ply 290, alone, or coupled to the non-scrap backing material portion 284b, may be transferred from the flat surface 348 of the carrier apparatus 346 to a contoured surface 302 (see FIG. 7) of the tool 300, or mold. For example, the rotatable reel 14 of the automated removal apparatus 10 rolls up, or winds up, the net cut ply 290 from the flat surface 348 of the carrier apparatus 346, and the robot assembly 320 (see FIGS. 9A-9B) moves the rolled-up non-scrap portion 284d (see FIG. 7) to the tool 300, or mold, having the contoured surface 302, and the rotatable reel 14 unrolls or unwinds the rolled-up non-scrap portion 284d (see FIG. 7) onto the contoured surface 302 of the tool 300, or mold. For example, the net cut plies 290 may be laid up on a flat surface and then transferred to a contoured surface using the rotatable reel 14 of the automated removal apparatus 10, as it may be easier to lay up on a flat surface initially, rather than a contoured surface, and then transfer the lay up to the contoured surface. This lay up, or preform, is generally built up on or within the tool 300, or mold, or over a form.

Figure 8:
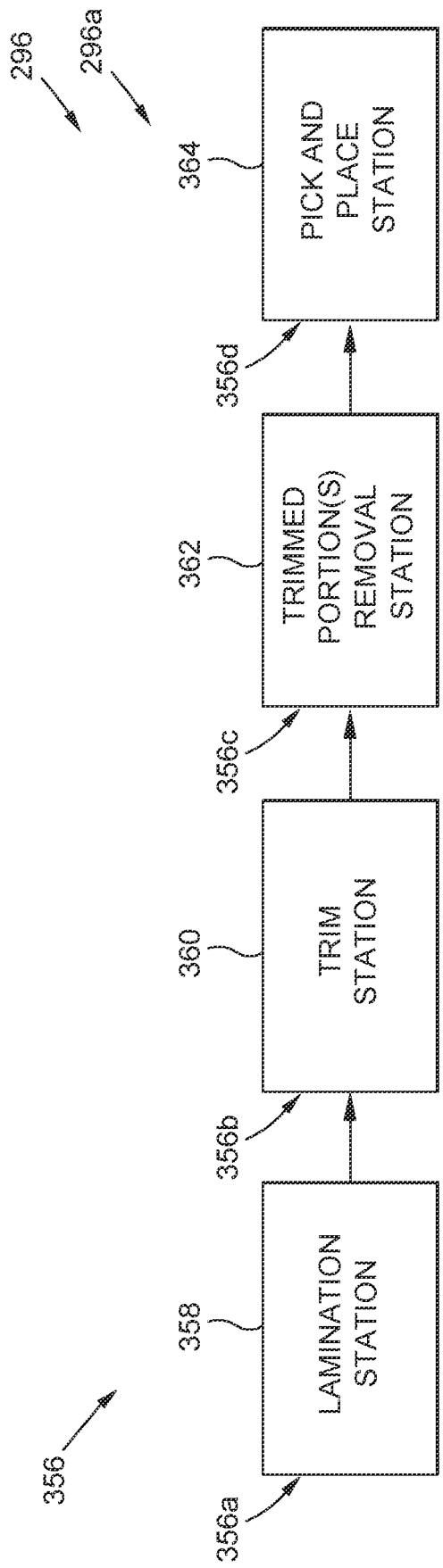
FIG. 8 is an illustration of a flow diagram of various automated production line stations in an exemplary ply-by-ply fabrication process.

Now referring to FIG. 8, FIG. 8 is an illustration of a flow diagram of various automated production line stations 356 in an exemplary ply-by-ply fabrication process 296, such as a composite laminate fabrication process 296a. As shown in FIG. 8, a first automated production line station 356a is a lamination station 358. At the lamination station 358, in one version, a ply 289 (see FIG. 7), or layer, of backing material 288 (see FIG. 7), such as backing film 288a (see FIG. 7), release film 288b (see FIG. 7), or a peel ply 288c (see FIG. 7), is laid down on the flat surface 348 (see FIGS. 7, 9A) of the carrier apparatus 346 (see FIGS. 7, 9A), such as in the form of a mobile table 346a (see FIG. 7), a conveyor belt apparatus 346b (see FIG. 7), or another suitable carrier apparatus. Then, a ply 287 (see FIG. 7), or layer, of composite material 286 (see FIG. 7), such as composite tape 286a (see FIG. 7), or composite sheet 286b (see FIG. 7), is laid over the ply 289 of backing material 288 and adhered to the backing material 288. The ply-by-ply process includes lamination of the composite tape 286a into a desired ply 287 or layer. The ply 287 of composite material 286 and the ply 289 of backing material 288 are laminated together with an automated lamination apparatus (not shown) known in the art to form a laminated ply 294 (see FIG. 7), such as a composite laminated ply 294a (see FIG. 7). The laminated ply 294, such as the composite laminated ply 294a, has edges 295 (see FIGS. 7, 9A) that need to be trimmed or cut.

As further shown in FIG. 8, a second automated production line station 356b is a trim station 360, or cutting station. The laminated ply 294, such as the composite laminated ply 294a, is carried on the carrier apparatus 346, from the lamination station 358 to the trim station 360. At the trim station 260, or cutting station, one or more edges 295 of the laminated ply 294, such as the composite laminated ply 294a, is/are trimmed or cut by a robot using an automated cutting apparatus (not shown), such as an automated ultrasonic knife, known in the art, while the laminated ply 294, such as the composite laminated ply 294a, is positioned on the flat surface 348 of the carrier apparatus 346. After the laminated ply 294 is trimmed or cut, the one or more edges 295 (see FIG. 9A) comprise one or more trimmed portions 280 (see FIGS. 7, 9A), such as one or more scrap portions 282 (see FIGS. 7, 9A). In one version, the one or more scrap portions 282 comprise a combination 282c (see FIG. 7) of the scrap composite material portion 282a and the scrap backing material portion 282b coupled together, where both the scrap composite material portion 282a and the scrap backing material portion 282b are both cut or trimmed all the way through. In another version, the one or more scrap portions 282 comprise a combination 282c (see FIG. 7) of the scrap composite material portion 282a and the scrap backing material portion 282b coupled together, where only the scrap composite material portion 282a is cut or trimmed all the way through but the scrap backing material portion 282b is not cut or trimmed, so that the scrap composite material portion 282a may be pulled off of the scrap backing material portion 282b by the rotatable reel 14. The laminated ply 294 that has been trimmed with the one or more edges 295 cut comprises non-scrap portions 284, such as, for example, the combination 284c of the non-scrap composite material portion 284a coupled to the non-scrap backing material portion 284b, in the form of the net cut ply 290 with the net shape 292. The automated cutting apparatus, such as an automated ultrasonic knife, may be used by the robot to cut the laminated ply 294 to the net cut ply 290 within +/−1 millimeter, or to within another suitable size.

As further shown in FIG. 8, a third automated production line station 356c is a trimmed portion(s) removal station 362. The net cut ply 290 that has been trimmed, or cut, to obtain trimmed portions 280 comprising scrap portions 282, for example, the scrap composite material portion 282a and the scrap backing material portion 282b coupled together, is carried on the carrier apparatus 346, from the trim station 360 to the trimmed portion(s) removal station 362. At the trimmed portion(s) removal station 362, the automated removal apparatus 10 (see FIGS. 1, 2A), as discussed above, of the automated removal system 12 (see FIG. 7), discussed above, is used to pull up, hold, roll up or wind up, and remove, in one version, the scrap composite material portion 282a, while the wheel assembly 278 (see FIG. 5) holds down the scrap backing material portion 282b. In another version, the automated removal apparatus 10 may pull up the scrap backing material portion 282b first, and then pull up, hold, roll up or wind up, and remove the scrap composite material portion 282a. In another version, the automated removal apparatus 10 may pull up, hold, roll up or wind up, and remove the combination 282c of the scrap composite material portion 282a and the scrap backing material portion 282b coupled together. In another version, discussed below, the non-scrap composite material portion 284a (see FIGS. 7, 9A) alone, or with, the non-scrap backing material portion 284b (see FIGS. 7, 9A), may be rolled up, wound up, or reeled up around the rotatable reel 14.

The automated removal apparatus 10 is designed to engage the one or more newly trimmed scrap portions 282 inline with the trim station 360, including the automated cutting apparatus, such as the automated ultrasonic knife. The automated removal apparatus 10 rolls up, winds up, or reels up, the one or more newly trimmed scrap portions 282, and leaves the net cut ply 290 on the carrier apparatus 346 to move forward to the next automated production line station 356. The rolled-up scrap portions 282d (see FIG. 7) rolled up, wound up, or reeled up on the rotatable reel 14 (see FIGS. 1, 2A) of the automated removal apparatus 10 may be removed and disposed of in the disposal assembly 350 (see FIGS. 7, 9A), which, in one version, is located at the trimmed portion(s) removal station 362.

As further shown in FIG. 8, a fourth automated production line station 356d is a pick and place station 364. The net cut ply 290 with the removed scrap portions 282 is carried on the carrier apparatus 346 from the trimmed portion(s) removal station 362 to the pick and place station 364 for part forming. At the pick and place station 364, an automated pick and place apparatus (not shown), such as a robot, known in the art, is used to pick up the net cut ply 290 from the carrier apparatus 346 and place the net cut ply 290 onto a tool 300 (see FIG. 7), or mold for subsequent processing and formation. A stack of multiple net cut plies 290 of one or more sizes, fiber directions, and/or shapes are built up or laid up on top of each other to create and form the laminate 298 (see FIG. 7), such as the composite laminate 298a (see FIG. 7), either on the tool 300, or mold, that is flat or contoured. Alternatively, the automated pick and place apparatus may pick up and place the net cut ply 290, along with other net cut plies 290, in a particular manner to create a roll or multiple sheets of material for subsequent downstream processing.

In addition, should it be desired that the one or more trimmed portions 280, such as one or more non-scrap portions 284, for example, the non-scrap composite material portion 284a (see FIG. 7) and the non-scrap backing material portion 284b (see FIG. 7), or only the non-scrap composite material portion 284a, be transferred from the flat surface 348 of the carrier apparatus 346 to a contoured surface 302 (see FIG. 7) of a tool 300, or mold, the automated removal apparatus 10 may be used to roll up, wind up, or reel up the non-scrap portions 284 at the trimmed portion(s) removal station 362. The one or more rolled-up non-scrap portions 284d (see FIG. 7) may be released from the rotatable reel 14 and transferred to the tool 300, or mold, that is moved to, or located at, the trimmed portion(s) removal station 362. The tool 300 with the transferred non-scrap portions 284 may then be moved to the pick and place station 364, or to another location for further processing.

Now referring to FIG. 9A, FIG. 9A is an illustration of an exemplary version of an automated removal system 12 of the disclosure having one automated removal apparatus 10 attached to a robot assembly 320 at the trimmed portion(s) removal station 362, and showing the carrier apparatus 346, such as a mobile table 346a, positioned on the floor 366, and having trimmed portions 280 on the flat surface 348 positioned with respect to the rotatable reel 14 of the automated removal apparatus 10. FIG. 9A shows the carrier apparatus 346 advancing in a direction 368 to the trimmed portion(s) removal station 362 from the trim station 360 (see FIG. 8), and after the one or more trimmed portions 280 are rolled up, wound up, or reeled up on the rotatable reel 14, the carrier apparatus 346 advances in a direction 370 to the pick and place station 364 (see FIG. 8) from the trimmed portion(s) removal station 362.

As shown in FIG. 9A, the robot assembly 320 comprises a robot 322 having an automated mechanical arm 324 with a first end 325a and a second end 325b. In one version, as shown in FIG. 9A, the automated mechanical arm 324 comprises a robotic arm 324a. As shown in FIG. 9A, the robotic arm 324a comprises a first end 326a attached to the second end 226b of the connector assembly 224 of the automated removal apparatus 10, and a second end 326b attached to a base 328. The automated removal apparatus 10 functions as an end effector 11 (see FIG. 9A) used with the robot 322 of the robot assembly 320.

As shown in FIG. 9A, the robotic arm 324a further comprises a wrist portion 329, a lower arm portion 330 attached to the wrist portion 329, an elbow portion 331 attached to the lower arm portion 330, an upper arm portion 332 attached to the elbow portion 331, and a shoulder portion 333 attached to the upper arm portion 332. As shown in FIG. 9A, the robot assembly 320 further comprises a control unit 340, such as in the form of a computer numerical control (CNC) machine 341, having one or more computers 342, for controlling the robot 322. The robot assembly 320 further comprises a power unit 344 (see FIG. 9A) for providing power to the robot 322. The control unit 340 and the power unit 344 are connected to the robot 322 by one or more connector elements 345 (see FIG. 9A), such as wired or wireless connector elements.

FIG. 9A further shows the automated removal apparatus 10 with some of the retractable vacuum panels 34 and some of the retractable vacuum pad assemblies 50 in contact with a surface 280b of the trimmed portion 280 at the leading edge of the trimmed portion 280, and in contact with an edge 295 comprising a first trimmed edge 295a to be removed. The automated removal apparatus 10 preferably rotates and travels from the leading edge, or front, of the trimmed portion 280, to the trailing edge, or back, of the trimmed portion 280. The automated removal apparatus 10 is not yet in contact with an edge 295 comprising a second trimmed edge 295b to be removed. FIG. 9A further shows the drive assembly 180 and the plunger element 210, such as the air cylinder plunger 210a, of the automated removal apparatus 10. FIG. 9A further shows an air line 276 attached to the automated removal apparatus 10, and attached to the robot 322, and attached to an air supply 112, such as a compressed air supply 112a. The air supply 112, such as the compressed air supply 112a, is a single source air supply 112b (see FIG. 9A), to provide an air flow 110 (see FIG. 1), such as a compressed air flow 110a (see FIG. 1), to the pneumatic system 230 (see FIGS. 1, 4A-4B) of the automated removal apparatus 10, as discussed above. Alternatively, the air supply 112, such as the compressed air supply 112a, may be delivered by the robot 322 directly, or the connector assembly 224 (see FIG. 2A), such as the tool change connector assembly 224a (see FIG. 2A), may have aligning ports with the block portion 203 (see FIG. 2A) of the drive assembly 180 (see FIG. 2A), and with the robot 322, so when the robot 322 picks up the automated removal apparatus 10, air flow 110 is automatically delivered through the connector assembly 224 to the drive assembly 180, and to the rotatable reel 14.

FIG. 9A further shows the trimmed portions 280 of the laminated ply 294, including scrap portions 282, such as scrap composite material portions 282a coupled to scrap backing material portions 282b, where the scrap backing material portion 282b is directly in contact with the flat surface 348 of the carrier apparatus 346. FIG. 9A further shows trimmed portions 280 including non-scrap portions 284, such as a non-scrap composite material portion 284a coupled to a non-scrap backing material portion 284b, where the non-scrap backing material portion 284b is directly in contact with the flat surface 348 of the carrier apparatus 346. The non-scrap portion 284, including the non-scrap composite material portion 284a, comprises the net cut ply 290 having the net shape 292 formed by the trimming, or cutting, made along sides 285 of the non-scrap portion 284 or net cut ply 290.

As further shown in FIG. 9A, a disposal assembly 350 is positioned next to the carrier apparatus 346 and below the automated removal apparatus 10. In one version, as shown in FIG. 9A, the disposal assembly 350 comprises a receptacle apparatus 352, such as in the form of a bin 352a. The disposal assembly 350 is configured to receive the scrap portions 282 once the rotatable reel 14 rolls up, winds up, or reels up a scrap portion 282 and disposes of it into the receptacle apparatus 352. Once the rotatable reel 14 has rolled up, wound up, or reeled up a scrap portion 282, around the rotatable reel 14, the robotic arm 324a is configured to move the automated removal apparatus 10 up and away from the carrier apparatus 346, and then is configured to rotate, or pivot, the automated removal apparatus 10 downwardly, so that it is positioned over the disposal assembly 350, and so that the rolled-up scrap portion 282d (see FIGS. 7, 11A), can slide off of the rotatable reel 14, and if needed, the removal can be assisted with the plunger element 210

(see FIG. 9A) pushing off the rolled-up scrap portion 282d off of the rotatable reel 14 and into the disposal assembly 350.

Figure 9B:
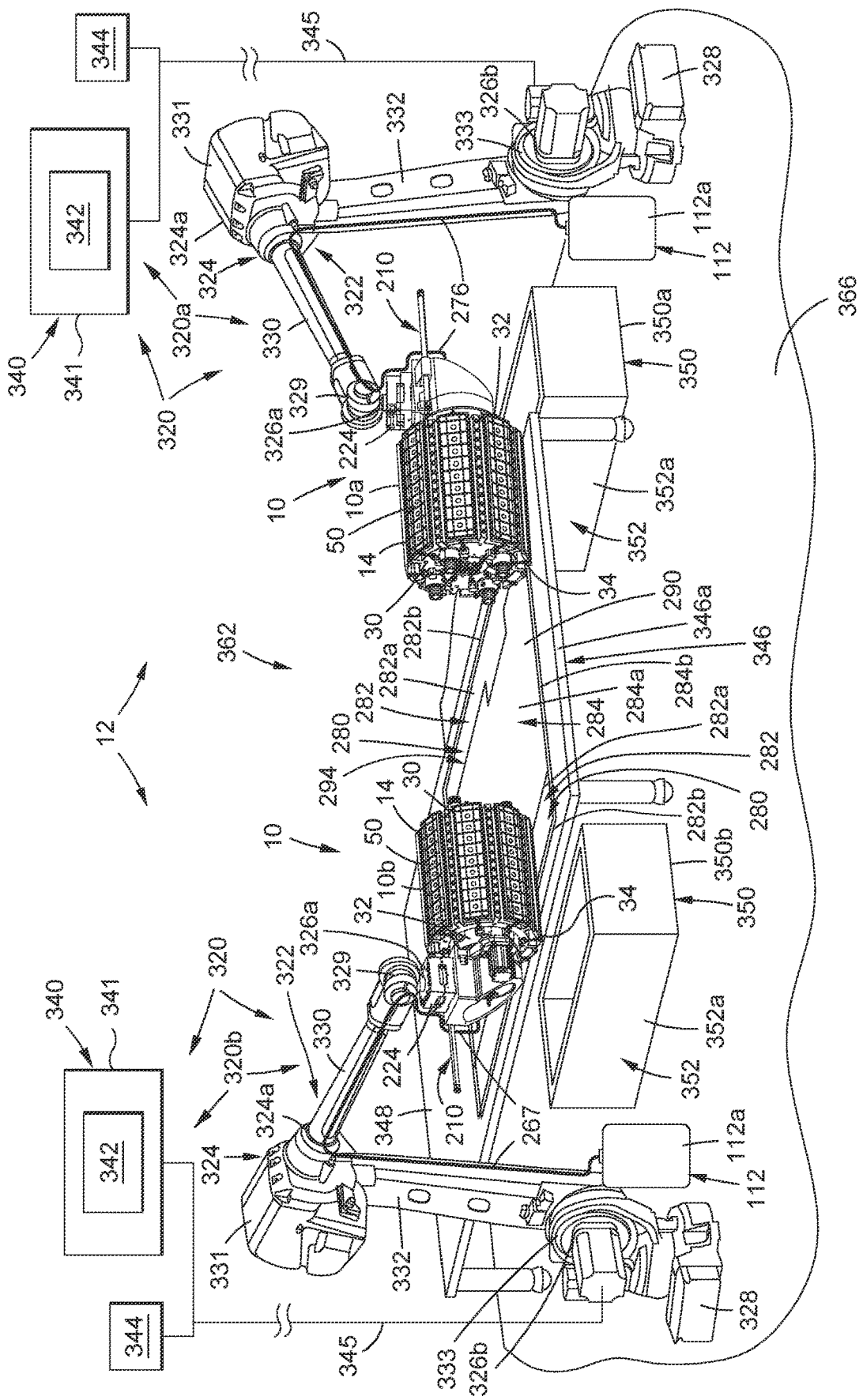
FIG. 9B is an illustration of another exemplary version of an automated removal system of the disclosure having two automated removal apparatuses, each attached to a separate robot assembly.

Now referring to FIG. 9B, FIG. 9B is an illustration of an exemplary version of an automated removal system 12 of the disclosure having two automated removal apparatuses 10, such as in the form of a first automated removal apparatus 10a and a second automated removal apparatus 10b, at the trimmed portion(s) removal station 362. FIG. 9B shows the carrier apparatus 346, such as the mobile table 346a, positioned on the floor 366, and having trimmed portions 280 on the flat surface 348 positioned with respect to the rotatable reels 14 of each of the first automated removal apparatus 10a and the second automated removal apparatus 10b.

As shown in FIG. 9B, the first automated removal apparatus 10a is attached to a robot assembly 320, such as a first robot assembly 320a, and the second automated removal apparatus 10b is attached to a robot assembly 320, such as a second robot assembly 320b. As shown in FIG. 9B, the first robot assembly 320a and the second robot assembly 320b each comprises a robot 322 having an automated mechanical arm 324, such as a robotic arm 324a, where the robotic arm 324a comprises the first end 326a attached to the connector assembly 224 of the automated removal apparatus 10, and the second end 326b attached to the base 328, and comprises the wrist portion 329, the lower arm portion 330, the elbow portion 331, the upper arm portion 332, and the shoulder portion 333. As shown in FIG. 9B, the first robot assembly 320a and the second robot assembly 320b each further comprise the control unit 340, such as in the form of the computer numerical control (CNC) machine 341, having one or more computers 342, for controlling the robot 322, and the power unit 344 for providing power to the robot 322. The control unit 340 and the power unit 344 are connected to the robot 322 by one or more connector elements 345 (see FIG. 9B), such as wired or wireless connector elements.

FIG. 9B further shows the vacuum end 30 and the drive end 32 of the first automated removal apparatus 10a, and the vacuum end 30 and the drive end 32 of the second automated removal apparatus 10b. FIG. 9B further shows for each of the first automated removal apparatus 10a and the second automated removal apparatus 10b, some of the retractable vacuum pad panels 34 and some of the retractable vacuum pad assemblies 50 in contact with the trimmed portions 280, such as the scrap portions 282, for example, the scrap composite material portions 282a, to be removed. The first automated removal apparatus 10a and the second automated removal apparatus 10b preferably rotate and travel from the leading edge, or front, of the trimmed portions 280, to the trailing edge, or back, of the trimmed portions 280. FIG. 9B further shows the first automated removal apparatus 10a and the second automated removal apparatus 10b, each with the air line 276 attached to the robot 322, and attached to an air supply 112, such as the compressed air supply 112a. The air supply 112, such as the compressed air supply 112a, for each of the first automated removal apparatus 10a and the second automated removal apparatus 10b, provides an air flow 110 (see FIG. 1), such as a compressed air flow 110a (see FIG. 1), to the pneumatic system 230 (see FIGS. 1, 4A-4B) of each of the respective first automated removal apparatus 10a and second automated removal apparatus 10b.

FIG. 9B further shows the trimmed portions 280 of the laminated ply 294, including the scrap portions 282, such as the scrap composite material portions 282a coupled to scrap backing material portions 282b, where the scrap backing material portion 282b is directly in contact with the flat surface 348 of the carrier apparatus 346. FIG. 9A further shows trimmed portions 280 including non-scrap portions 284, such as a non-scrap composite material portion 284a coupled to a non-scrap backing material portion 284b, where the non-scrap backing material portion 284b is directly in contact with the flat surface 348 of the carrier apparatus 346. The non-scrap portion 284, including the non-scrap composite material portion 284a, comprises the net cut ply 290.

As further shown in FIG. 9B, a disposal assembly 350, such as a first disposal assembly 350a, is positioned next to the carrier apparatus 346 and below the first automated removal apparatus 10a. As further shown in FIG. 9B, a disposal assembly 350, such as a second disposal assembly 350b, is positioned next to the carrier apparatus 346 and below the second automated removal apparatus 10b. As shown in FIG. 9B, in one version, the first disposal assembly 350a and the second disposal assembly 350b each comprises the receptacle apparatus 352, such as in the form of the bin 352a. Each disposal assembly 350 is configured to receive the scrap portions 282 once the rotatable reel 14 of each automated removal apparatus 10 rolls up, winds up, or reels up a scrap portion 282 and disposes of it into the respective receptacle apparatus 352. Once the rotatable reel 14 of each automated removal apparatus 10 has rolled up, wound up, or reeled up a scrap portion 282 around the rotatable reel 14, the respective robotic arm 324a is configured to move each automated removal apparatus 10 up and away from the carrier apparatus 346, and then is configured to rotate, or pivot, the respective automated removal apparatus 10 downwardly, so that it is positioned over the respective disposal assembly 350, and so that the rolled-up scrap portion 282d (see FIGS. 7, 11A) can slide off of the rotatable reel 14 into the respective disposal assembly 350, and if needed, the removal can be assisted with the plunger element 210 (see FIG. 9B) pushing the rolled-up scrap portion 282d off of the rotatable reel 14 and into the disposal assembly 350.

Now referring to FIG. 10, FIG. 10 is an illustration of an exemplary version of an automated removal system 12 of the disclosure having one automated removal apparatus 10 attached to a gantry assembly 334 at the trimmed portion(s) removal station 362, and showing the carrier apparatus 346, such as a mobile table 346a, positioned on the floor 366, and having trimmed portions 280 on the flat surface 348 positioned with respect to the rotatable reel 14 of the automated removal apparatus 10. FIG. 10 shows the carrier apparatus 346 advancing in a direction 368a to the trimmed portion(s) removal station 362 from the trim station 360 (see FIG. 8), and after the one or more trimmed portions 280 are rolled up, wound up, or reeled up on the rotatable reel 14, the carrier apparatus 346 advances in a direction 370a to the pick and place station 364 (see FIG. 8) from the trimmed portion(s) removal station 362.

As shown in FIG. 10, the gantry assembly 334 comprises a gantry 336 having an automated mechanical arm 324 with a first end 325a and a second end 325b. In this version, as shown in FIG. 10, the automated mechanical arm 324 comprises a gantry robotic arm 324b. As further shown in FIG. 10, the gantry robotic arm 324b comprises a first end 338a attached to the connector assembly 224 of the automated removal apparatus 10, and a second end 338b attached to the gantry 336. As shown in FIG. 10, the gantry assembly 334 further comprises a gantry bridge 339 located above the automated removal apparatus 10.

As shown in FIG. 10, the gantry assembly 334 further comprises a control unit 340a, such as in the form of a computer numerical control (CNC) machine 341a, having one or more computers 342a, for controlling the gantry 336.

The gantry assembly 334 further comprises a power unit 344a (see FIG. 10) for providing power to the gantry 336. The control unit 340a and the power unit 344a are connected to the gantry 336 by one or more connector elements 345a (see FIG. 10), such as wired or wireless connector elements.

FIG. 10 further shows the automated removal apparatus 10 with some of the retractable vacuum panels 34 and some of the retractable vacuum pad assemblies 50 in contact with a surface 280b of a trimmed portion 280 comprising a scrap portion 282. The automated removal apparatus 10 preferably rotates and travels from the leading edge, or front, of the trimmed portion 280, to the trailing edge, or back, of the trimmed portion 280. FIG. 10 further shows the air line 276 attached to the slip ring 268 of the automated removal apparatus 10, and the air line 276 attached to the gantry robotic arm 324b, attached to the gantry 336, and attached to an air supply 112, such as a compressed air supply 112a. The air supply 112, such as the compressed air supply 112a, is a single source air supply 112b (see FIG. 10), to provide an air flow 110 (see FIG. 1), such as a compressed air flow 110a (see FIG. 1) to the pneumatic system 230 (see FIGS. 1, 4A-4B) of the automated removal apparatus 10, as discussed above.

FIG. 10 further shows the trimmed portions 280 of the laminated ply 294, including scrap portions 282, such as scrap composite material portions 282a coupled to scrap backing material portions 282b, on each side of the non-scrap portions 284. The non-scrap portions 284 include a non-scrap composite material portion 284a (see FIG. 10) coupled to a non-scrap backing material portion 284b (see FIG. 10). The non-scrap portion 284, including the non-scrap composite material portion 284a, comprises the net cut ply 290. FIG. 10 shows the scrap backing material portion 282b and the non-scrap backing material portion 284b are directly in contact with the flat surface 348 of the carrier apparatus 346.

As further shown in FIG. 10, a disposal assembly 350 is positioned next to the carrier apparatus 346 and positioned below the automated removal apparatus 10. In one version, the disposal assembly 350 comprises the receptacle apparatus 352, such as in the form of a bin 352a. The disposal assembly 350 is configured to receive one or more scrap portions 282, once the rotatable reel 14 rolls up, winds up, or reels up a scrap portion 282 and disposes of it into the receptacle apparatus 352. Once the rotatable reel 14 has rolled up, wound up, or reeled up a scrap portion 282, around the rotatable reel 14, the gantry robotic arm 324b is configured to move the automated removal apparatus 10 up and away from the carrier apparatus 346, and then is configured to rotate, or pivot, the automated removal apparatus 10 downwardly, so that it is positioned over the disposal assembly 350, and so that the rolled-up scrap portion 282d (see FIGS. 7, 11A), can slide off of the rotatable reel 14, and if needed, the removal can be assisted with the plunger element 210 (see FIGS. 1, 11A) pushing the rolled-up scrap portion 282d off of the rotatable reel 14 and into the disposal assembly 350.

Now referring to FIG. 11A, FIG. 11A is an illustration of a bottom perspective partial view of an exemplary version of an automated removal apparatus 10 of the disclosure in a release position 374, to release, into a disposal assembly 350, a trimmed portion 280, such as a scrap portion 282, in the form of a rolled-up scrap portion 282d, that is rolled up, wound up, or reeled up, on the rotatable reel 14 after removal from the carrier apparatus 346 (see FIGS. 9A-9B, 10). As shown in FIG. 11A, the rolled-up scrap portion 282d is rolled up, wound up, or reeled up around, the outer circumference 24 of the rotatable reel 14. FIG. 11A further shows the disposal assembly 350 comprising the receptacle apparatus 352, such as in the form of a bin 352a, having an automated compactor portion 354 in an interior 376 of the receptacle apparatus 352.

To release the rolled-up scrap portion 282d into the receptacle apparatus 352 of the disposal assembly 350, as shown in FIG. 11A, in one version, the automated mechanical arm 324 rotates the automated removal apparatus 10, via the connector assembly 224, downwardly, and lowers the automated removal apparatus 10 partially into the interior 376 of the receptacle apparatus 352 of the disposal assembly 350. As further shown in FIG. 11A, the plurality of retractable vacuum panels 34 are retracted to the retracted position 146, such as the fully retracted position 146a, and the retractable vacuum pad assemblies 50 are retracted to the retracted position 148, such as the fully retracted position 148a. The plurality of friction reducing elements 168, such as the plurality of ball bearings 170, function as the sole, or only, contact points 178 (see FIG. 11A), and are the highest points in contact with, the interior of the rolled-up scrap portion 282d, so that the rolled-up scrap portion 282d may more easily slide off of the rotatable reel 14. The inner diameter of the rolled-up scrap portion 282d may be banked against the hard, smooth surfaces of the plurality of friction reducing elements 168, such as the plurality of ball bearings 170, to allow the rolled-up scrap portion 282d to slide off of the rotatable reel 14 having a reduced diameter. As further shown in FIG. 11, the plunger element 210, such as the air cylinder plunger 210a, is in an extended position 218 to assist in pushing the rolled-up scrap portion 282d off of the rotatable reel 14 and into the receptacle apparatus 352.

When the retractable vacuum pad assemblies 50 are in the extended position 144 (see FIG. 2A), such as the fully extended position 144a (see FIG. 2A), and the retractable vacuum panels 34 are in the extended position 142 (see FIG. 2A), such as the fully extended position 142a (see FIG. 2A), the rotatable reel 14 may have a diameter having a length in a range of from 18 inches to 40 inches, or another suitable length diameter, measured from the top-most portion of the retractable vacuum pad assemblies 50 on one side of the rotatable reel 14 to the top-most portion of the retractable vacuum pad assemblies 50 on the opposite side of the rotatable reel 14. When the retractable vacuum pad assemblies 50 are in the retracted position 148 (see FIG. 11A), such as the fully retracted position 148a (see FIG. 11A), and the retractable vacuum panels 34 are in the retracted position 146 (see FIG. 11A), such as the fully retracted position 146a (see FIG. 11A), and the friction reducing elements 168, such as the ball bearings 170, are the contact points 178 (see FIG. 11A) for the one or more trimmed portions 280, such as the rolled-up scrap portion 282d, the rotatable reel 14 may have a reduced diameter having a length in a range of from 15 inches to 37 inches, or another suitable length diameter, measured from the contact point 178 on one side of the rotatable reel 14 to the contact point 178 on the opposite side of the rotatable reel 14. Thus, with the reduction in diameter, the rolled-up scrap portion 282d may more easily slide off of the rotatable reel 14. The plunger element 210, such as the air cylinder plunger 210a, may assist in pushing the rolled-up scrap portion 282d off of the rotatable reel 14.

FIG. 11A further shows the plurality of actuator assemblies 130, such as the plurality of piston assemblies 132, where each of the piston rods 150 of the piston assemblies 132 is in the compressed position 166. FIG. 11A further shows the air line 276 attached to the slip ring 268 and extending from the slip ring 268 of the automated removal apparatus 10.

Now referring to FIG. 11B, FIG. 11B is an illustration of a bottom perspective view of the automated removal apparatus 10 of FIG. 11A in a post-release position 378, moved by the automated mechanical arm 324, via the connector assembly 224, out of the interior 376 of the receptacle apparatus 352, such as the bin 352a, and above the disposal assembly 350.

FIG. 11B shows the trimmed portion 280, such as the scrap portion 282, in the form of the rolled-up scrap portion 282d, that has been released from the rotatable reel 14 by sliding off of the plurality of friction reducing elements 168, such as the plurality of ball bearings 170, and by using the plunger element 210, such as the air cylinder plunger 210a, to assist in pushing the rolled-up scrap portion 282d off of the rotatable reel 14. FIG. 11B shows the plunger element 210, such as the air cylinder plunger 210a, in the retracted position 216 after the rolled-up scrap portion 282d has been released off of the rotatable reel 14 and collected inside the receptacle apparatus 352. FIG. 11B further shows the rolled-up scrap portion 282d compacted by the automated compactor portion 354 that has moved in a direction 355 inside the receptacle apparatus 352 to compact or compress the rolled-up scrap portion 282d. The rolled-up scrap portion 282d is compacted in a compacting area 380 (see FIG. 11B) of the receptacle apparatus 352 and has a compacted shape 382 (see FIG. 11B). FIG. 11B further shows the air line 276 attached to the slip ring 268 and extending from the slip ring 268 of the automated removal apparatus 10.

Now referring to FIG. 12A, FIG. 12A is schematic illustration of a scrap portion 282, such as a rolled-up scrap portion 282d, in a pre-compacted position 384, in a disposal assembly 350, before being compacted or compressed by the automated compactor portion 354. The rolled-up scrap portion 282d is released and collected within the compacting area 380 of the interior 376 of the receptacle apparatus 352, such as the bin 352a, of the disposal assembly 350. As shown in FIG. 12A, the scrap portion 282, such as the rolled-up scrap portion 282d, has a pre-compacted inner diameter 386a, prior to being compacted, or compressed, by the automated compactor portion 354.

Now referring to FIG. 12B, FIG. 12B is a schematic illustration of a top view of the scrap portion 282, such as the rolled-up scrap portion 282d, of FIG. 12A, compacted, or compressed, into a first compacted position 388 in the disposal assembly 350, by the automated compactor portion 354 having moved a first distance 390 in the interior 376 of the receptacle apparatus 352, such as the bin 352a. As shown in FIG. 12B, the rolled-up scrap portion 282d is compacted within the compacting area 380 of the receptacle apparatus 352 of the disposal assembly 350. As further shown in FIG. 12B, the scrap portion 282, such as the rolled-up scrap portion 282d, has a compacted shape 382, such as a first compacted shape 382a, having a first compacted shape inner diameter 386b. The first compacted shape inner diameter 386b (see FIG. 12B) is smaller in size than the pre-compacted inner diameter 386a (see FIG. 12A).

Now referring to FIG. 12C, FIG. 12C is a schematic illustration of a top view of the scrap portion 282, such as the rolled-up scrap portion 282d, of FIG. 12B, compacted, or compressed, further into a second compacted position 392 in the disposal assembly 350, by the automated compactor portion 354 having moved a second distance 394 in the interior 376 of the receptacle apparatus 352, such as the bin 352a. As shown in FIG. 12C, the rolled-up scrap portion 282d is further compacted within the compacting area 380 of the receptacle apparatus 352 of the disposal assembly 350 to obtain a compacted scrap portion 282e. As further shown in FIG. 12C, the scrap portion 282, such as the rolled-up scrap portion 282d, has a compacted shape 382, such as a second compacted shape 382b, having a second compacted shape inner diameter 386c. The second compacted shape inner diameter 386c (see FIG. 12C) is much smaller in size than the first compacted shape inner diameter 386b (see FIG. 12B).

Now referring to FIG. 12D, FIG. 12D is a schematic illustration of a top view of multiple scrap portions 282, such as multiple rolled-up scrap portions 282d, that are compacted, or compressed, together into a multiple scrap compacted position 396 in the disposal assembly 350, by the automated compactor portion 354, in the interior 376 of the receptacle apparatus 352, such as the bin 352a. As shown in FIG. 12D, the multiple rolled-up scrap portions 282d comprise compacted scrap portions 282e compacted together within the compacting area 380 of the receptacle apparatus 352 of the disposal assembly 350. As further shown in FIG. 12D, each scrap portion 282, such as each rolled-up scrap portion 282d, has a compacted shape 382, such as a third compacted shape 382c, having a third compacted shape inner diameter 386d. The third compacted shape inner diameter 386d (see FIG. 12D) is smaller in size than the second compacted shape inner diameter 386c (see FIG. 12C) and is much smaller in size than the first compacted shape inner diameter 386b (see FIG. 12B). As shown in FIG. 12D, the multiple scrap portions 282, such as the multiple rolled-up scrap portions 282d, of FIG. 12B, are compacted, or compressed, closely together with equal spacing 398, or substantially equal spacing, between each adjacent pair of rolled-up scrap portions 282d.

Figure 13:
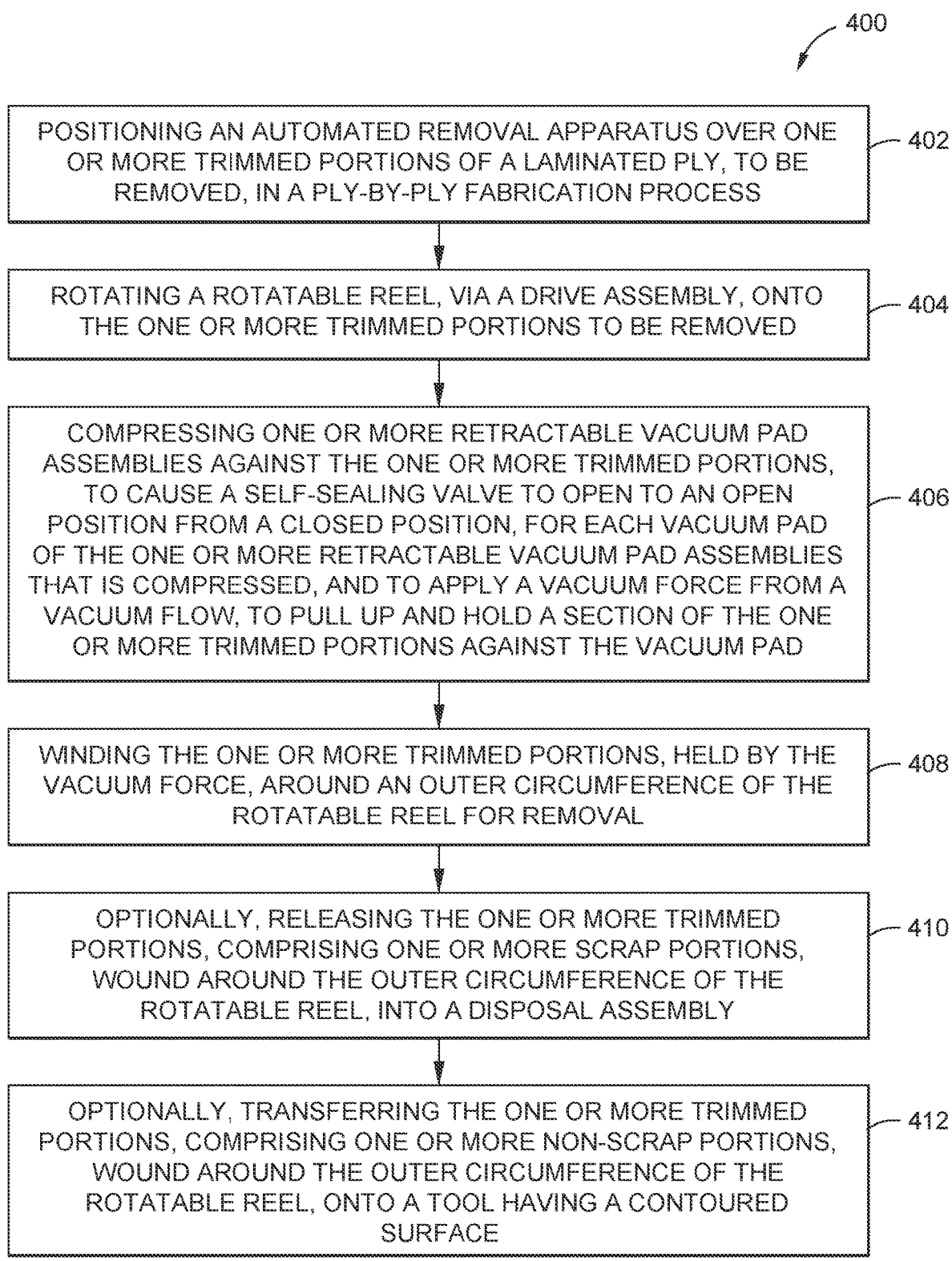
FIG. 13 is an illustration of a flow diagram of a version of an automated removal method of the disclosure.

Now referring to FIG. 13, FIG. 13 is an illustration of a flow diagram of a version of an automated removal method 400 of the disclosure. In another version of the disclosure, there is provided the automated removal method 400 for selectively removing one or more trimmed portions 280 (see FIGS. 5, 7, 9A-9B, 10) of a laminated ply 294 (see FIGS. 7, 9A-9B, 10), such as a composite laminated ply 294a (see FIG. 7), in a ply-by-ply fabrication process 296 (see FIGS. 7, 8), such as a composite laminate fabrication process 296a (see FIG. 7).

The blocks in FIG. 13 represent operations and/or portions thereof, or elements, and lines connecting the various blocks do not imply any particular order or dependency of the operations or portions thereof, or elements. FIG. 13 and the disclosure of the steps of the automated removal method 400 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 13, the automated removal method 400 comprises the step of positioning 402 an automated removal apparatus 10 (see FIGS. 1, 2A, 3A) over the one or more trimmed portions 280 of the laminated ply 294, to be removed, in the ply-by-ply fabrication process 296, such as a composite laminate fabrication process 296a. The automated removal method 400 may comprise positioning 402 one or more automated removal apparatuses 10 over the one or more trimmed portions 280. For example, in FIG. 9A, one automated removal apparatus 10 is positioned over the one or more trimmed portions 280, and in FIG. 9B, two automated removal apparatuses 10 are positioned over the one or more trimmed portions 280. In other versions, more than two automated removal apparatuses 10 may be positioned over the one or more trimmed portions 280, such as three or four automated removal apparatuses 10, or more.

The one or more trimmed portions 280 (see FIG. 7) to be removed with the rotatable reel 14 of the automated removal apparatus 10 may comprise one or more scrap portions 282 (see FIGS. 7, 9A-9B, 10) or one or more non-scrap portions 284 (see FIGS. 7, 9A-9B, 10). The one or more scrap portions 282, as discussed above, comprise one of, a scrap composite material portion 282*a* (see FIGS. 7, 9A-9B, 10), a scrap backing material portion 282*b* (see FIGS. 7, 9A-9B, 10), a combination 282*c* (see FIG. 7) of the scrap composite material portion 282*a* coupled to the scrap backing material portion 282*b*, or another suitable scrap portion. The one or more non-scrap portions 284, as discussed above, comprise one of, a non-scrap composite material portion 284*a* (see FIGS. 7, 9A-9B, 10), a non-scrap backing material portion 284*b* (see FIGS. 7, 9A-9B, 10), a combination 284*c* (see FIG. 7) of the non-scrap composite material portion 284*a* coupled to the non-scrap backing material portion 284*b*, or another suitable non-scrap portion.

As discussed in detail above, the automated removal apparatus 10 comprises the rotatable reel 14 (see FIGS. 1, 2A, 3A). The rotatable reel 14 comprises the plurality of retractable vacuum panels 34 (see FIGS. 1, 2A, 3A) attached around the hub portion 22 (see FIG. 2A) of the rotatable reel 14. Each of the plurality of retractable vacuum panels 34 comprises one or more retractable vacuum pad assemblies 50 (see FIGS. 1, 2A, 3A). Each retractable vacuum pad assembly 50 has the vacuum pad 58 (see FIGS. 1, 2A, 3A) with the vacuum port 64 (see FIGS. 1, 2A, 3A), the vacuum cylinder 66 (see FIGS. 1, 2B, 3B), the vacuum cavity 92 (see FIGS. 1, 2B, 3B), and the self-sealing valve 114 (see FIGS. 1, 2B, 3B).

The automated removal apparatus 10 further comprises the plurality of actuator assemblies 130 (see FIGS. 1, 2A, 3A) attached to the plurality of retractable vacuum panels 34. The plurality of actuator assemblies 130 preferably comprise the plurality of piston assemblies 132 (see FIGS. 1, 2A, 3A), or another suitable actuator assembly. Each of the plurality of piston assemblies 132 comprises the piston rod 150 (see FIGS. 1, 2A, 3A), the air cylinder 152 (see FIGS. 1, 2A, 3A), and the piston lock 154 (see FIGS. 1, 2A, 3A), connected together in a series configuration 156 (see FIGS. 1, 2A, 3A). In one version, the piston lock 154 is in the form of a unidirectional piston lock 154*a* (see FIGS. 1, 2A, 3A) that is configured to allow the piston rod 150 to be compressed and to be held, and compresses and holds, the piston rod 150 in a compressed position 166 (see FIG. 3A), and that is configured to prevent, and prevents, the piston rod 150 from extending to an extended position 164 (see FIG. 2A), The automated removal apparatus 10 further comprises the plurality of friction reducing elements 168 (see FIGS. 1, 2A, 3A) attached and disposed around the rotatable reel 14, and in particular, attached and disposed around the hub portion 22 (see FIGS. 2A, 3A) of the rotatable reel 14. The plurality of friction reducing elements 168 are positioned between the plurality of retractable vacuum panels 34. In one version, the plurality of friction reducing elements 168 comprise the plurality of ball bearings 170 (see FIGS. 1, 2A, 3A). As shown in FIG. 2D, a row 172 of the plurality of friction reducing elements 168, such as the plurality of ball bearings 170, is positioned between adjacent pairs 34*a* of the plurality of retractable vacuum panels 34. When the plurality of retractable vacuum panels 34 are retracted in the retracted position 146 (see FIGS. 3A, 11A), the plurality of friction reducing elements 168, such as the plurality of ball bearings 170, solely contact the one or more trimmed portions 280 wound around the outer circumference 24 (see FIGS. 1, 11A) of the rotatable reel 14, to facilitate release of the one or more trimmed portions 280 from around the rotatable reel 14.

As discussed above, the automated removal apparatus 10 further comprises the drive assembly 180 (see FIGS. 1, 2A) attached to the rotatable reel 14. The drive assembly 180 is configured to drive, power, and control, and drives, powers, and controls, the rotation of the rotatable reel 14. The drive assembly 180 comprises the rotary stage assembly 182 (see FIGS. 2A, 2F, 2G) attached to the support structure 184 (see FIGS. 2A, 2F). As shown in FIGS. 2F and 2G, the rotary stage assembly 182 of the drive assembly 180 comprises the motor 186, such as an electric motor 186*a*, or another suitable motor. The rotary stage assembly 182 of the drive assembly 180 further comprises the rotary stage 190 (see FIGS. 2F, 2G) connected to the motor 186, via the attachment assembly 192 (see FIG. 2G). The support structure 184, as shown in FIGS. 2A and 2F, comprises the cylindrical cover portion 202 coupled to the block portion 203.

As discussed above, the automated removal apparatus 10 may further comprise the plunger element 210 (see FIGS. 1, 2A), such as the air cylinder plunger 210*a* (see FIGS. 1, 2A), coupled to the drive assembly 180. The plunger element 210, such as the air cylinder plunger 210*a*, is operable to move from the retracted position 216 (see FIGS. 2A, 11B) to the extended position 218 (see FIGS. 3D, 11A), to assist in moving, pushing, and releasing the one or more trimmed portions 280 off the rotatable reel 14, when the one or more trimmed portions 280 are ready to be released from the rotatable reel 14. The plunger element 210 is operable to retract back to the retracted position 216 from the extended position 218 once the plunger element 210 has finished assisting in the release of the one or more trimmed portions 280 off of the rotatable reel 14. As shown in FIGS. 2A and 3A, the plunger element 210, such as the air cylinder plunger 210*a*, is coupled to the block portion 203 (see FIGS. 2A, 3A) of the support structure 184 of the drive assembly 180, via the bracket element 220.

As discussed above, the automated removal apparatus 10 may further comprise the connector assembly 224 (see FIGS. 1, 2A) attached to the drive assembly 180. In one version, the connector assembly 224 comprises the tool change connector assembly 224*a* (see FIG. 2A). As shown in FIGS. 2A and 3A, the connector assembly 224 has the first end 226*a*, the second end 226*b*, and one or more connector portions 228. As shown in FIG. 2A, the first end 226*a* of the connector assembly 224 is attached to the block portion 203 of the support structure 184 of the drive assembly 180. As shown in FIG. 9A, in one version, the second end 226*b* is attached to the first end 325*a* of the automated mechanical arm 324, such as the robotic arm 324*a*.

As discussed above, the automated removal apparatus 10 further comprises the pneumatic system 230 (see FIGS. 1, 2B, 3B, 4A-4B) attached to a cavity 234 (see FIGS. 4A-4B) within an interior 20 (see FIGS. 2B, 3B) of the rotatable reel 14. The pneumatic system 230 comprises the valve manifold 232 (see FIGS. 4A-4B), such as the pneumatic valve manifold 232*a* (see FIGS. 4A-4B), that is operable to control the air flow 110 (see FIG. 1), such as the compressed air flow 110*a* (see FIG. 1), from an air supply 112 (see FIGS. 1, 9A-9B, 10), such as a compressed air supply 112*a* (see FIGS. 1, 9A-9B, 10), to the air cylinder 152 of each of the plurality of actuator assemblies 130 (see FIGS. 1, 2A, 3A), such as the plurality of piston assemblies 132 (see FIGS. 1, 2A, 3A), to actuate the piston rods 150 (see FIGS. 1, 2A, 3A) of the plurality of actuator assemblies 130, such as the plurality of piston assemblies 132.

The valve manifold 232, such as the pneumatic valve manifold 232*a*, of the pneumatic system 230 is further operable to control the air flow 110 (see FIG. 1), such as the compressed air flow 110*a* (see FIG. 1), to the one or more vacuum generators 250 (see FIGS. 4A-4B), which, in turn, generates the vacuum flow 108 (see FIG. 1) to one or more of the retractable vacuum pad assemblies 50 and through one or more of the vacuum ports 64, and to further generate the vacuum force 113 (see FIG. 1) to pull up and hold one or more sections 280*a* of the trimmed portions 280 against one or more vacuum pads 58.

The step of positioning 402 (see FIG. 13) the automated removal apparatus 10 over the one or more trimmed portions 280 to be removed, may further comprise positioning 402 the automated removal apparatus 10 using an automated mechanical arm 324 (see FIGS. 9A-9B, 10), where the automated mechanical arm 324 has a first end 325*a* (see FIG. 9A) attached to the connector assembly 224 (see FIG. 9A) of the automated removal apparatus 10 (see FIG. 9A), and where the automated mechanical arm 324 comprises one of, a robotic arm 324*a* (see FIG. 9A) of a robot 322 (see FIG. 9A), or a gantry robotic arm 324*b* (see FIG. 10) of a gantry 336 (see FIG. 10), or another suitable automated mechanical arm.

The step of positioning 402 (see FIG. 13) the automated removal apparatus 10 over the one or more trimmed portions 280 to be removed, may further comprise positioning 402 the automated removal apparatus 10 further comprising a wheel assembly 278 (see FIGS. 1, 5) attached to the drive assembly 180 (see FIG. 5), where the wheel assembly 278 extends aft of, and in an offset position 312 (see FIGS. 1, 5) to, the rotatable reel 14. In one version, using the wheel assembly 278 with the automated removal apparatus 10, as shown in FIG. 5, the one or more trimmed portions 280 comprise a combination 282*c* (see FIG. 7) of the scrap composite material portion 282*a* coupled to the scrap backing material portion 282*b*, and the wheel assembly 278 is operable to hold down the scrap backing material portion 282*b*, to separate the scrap backing material portion 282*b* from the scrap composite material portion 282*a* being wound or reeled up around the outer circumference 24 of the rotatable reel 14 for removal.

As shown in FIG. 13, the automated removal method 400 further comprises the step of rotating 404 the rotatable reel 14, via the drive assembly 180, onto the one or more trimmed portions 280 to be removed. Before rotating the rotatable reel 14, the piston rods 150 (see FIG. 2A) of the plurality of actuator assemblies 130 (see FIG. 2A), such as the plurality of piston assemblies 132 (see FIG. 2A), are in the extended position 164 (see FIG. 2A), to extend the plurality of retractable vacuum panels 34 (see FIG. 2A) in the extended position 142 (see FIG. 2A), such as the fully extended position 142*a* (see FIG. 2A), and to extend the one or more retractable vacuum pad assemblies 50 (see FIG. 2A) in the extended position 144 (see FIG. 2A), such as the fully extended position 144*a* (see FIG. 2A). The piston rods 150 are actuated or extended due to the air flow 110, such as the compressed air flow 110*a*, flowing from the air supply 112 (see FIGS. 9A-9B, 10) into the air line 276 (see FIGS. 9A-9B, 10), into the slip ring 268 (see FIGS. 4A-4B, 10), into the rotary union 256 (see FIGS. 4A-4B), into the valve manifold 232 (see FIGS. 4A-4B), into air hoses 158 (see FIG. 4A), and into the air cylinders 152 (see FIG. 4A) that provide the air flow 110 to the piston rods 150 to actuate or extend them.

As shown in FIG. 13, the automated removal method 400 further comprises the step of compressing 406 the one or more retractable vacuum pad assemblies 50 against the one or more trimmed portions 280, to cause the self-sealing valve 114 to open to an open position 125 (see FIGS. 1, 3C) from a closed position 124 (see FIGS. 1, 2B, 2C), for each vacuum pad 58 of the one or more retractable vacuum pad assemblies 50 that is compressed, and to apply a vacuum force 113 (see FIGS. 1, 6B) from a vacuum flow 108 (see FIG. 1), to pull up and hold a section 280*a* (see FIG. 5) of the one or more trimmed portions 280 (see FIG. 5) against the vacuum pad 58. The air flow 110, such as the compressed air flow 110*a*, flows from the air supply 112 (see FIGS. 9A-9B, 10) into the air line 276 (see FIGS. 9A-9B, 10), into the slip ring 268 (see FIGS. 4A-4B, 10), into the rotary union 256 (see FIGS. 4A-4B), into the valve manifold 232 (see FIGS. 4A-4B), into air hoses 158 (see FIG. 4A), and into the first inlet opening 252*a* (see FIG. 4A) of one or more vacuum generators 250 (see FIG. 4A). The vacuum flow 108 flows through the second inlet opening 252*b* (see FIG. 4A) and through the vacuum tube 254 (see FIG. 4A) and pulls a vacuum and generates the vacuum force 113 to pull up and hold the one or more sections 280*a* of the one or more trimmed portions 280.

As shown in FIG. 13, the automated removal method 400 further comprises the step of winding 408 the one or more trimmed portions 280, held by the vacuum force 113, around the outer circumference 24 (see FIGS. 1, 5) of the rotatable reel 14 for removal. The vacuum flow 108 continues to flow after the one or more trimmed portions 280 are wound around, or reeled up around, the outer circumference 24 (see FIGS. 1, 5) of the rotatable reel 14, and until the one or more trimmed portions 280 are released from the rotatable reel 14, such as into the disposal assembly 350 (see FIGS. 11A-11B), or onto a tool 300 (see FIG. 7).

As shown in FIG. 13, the automated removal method 400 may further optionally comprise the step of releasing 410 the one or more trimmed portions 280, comprising one or more scrap portions 282 (see FIG. 7), wound around, or reeled up around, the outer circumference 24 of the rotatable reel 14, into a disposal assembly 350 (see FIGS. 11A-11B), by stopping the vacuum flow 108 (see FIG. 1), retracting the plurality of retractable vacuum panels 34 and retracting the one or more retractable vacuum pad assemblies 50 away from contact with the one or more trimmed portions 280, so that only the plurality of friction reducing elements 168 (see FIG. 11A), such as the plurality of ball bearings 170 (see FIG. 11A), are in contact as contact points 178 (see FIG. 11A) with the one or more trimmed portions 280, and moving, such as rotating, or pivoting, downwardly, the automated removal apparatus 10, so that the one or more trimmed portions 280 are positioned for release over the disposal assembly 350. When the plurality of retractable vacuum panels 34 are retracted in the retracted position 146 (see FIGS. 3A, 11A), and the one or more retractable vacuum pad assemblies 50 are retracted in the retracted position 148 (see FIGS. 3A, 11A), the plurality of friction reducing elements 168, such as the plurality of ball bearings 170, solely contact the one or more trimmed portions 280 wound around, or reeled up around, the outer circumference 24 of the rotatable reel 14, to facilitate release of the one or more trimmed portions 280 from around the rotatable reel 14.

The step of releasing 410 the one or more trimmed portions 280 wound around the outer circumference 24 of the rotatable reel 14 into the disposal assembly 350, further comprises moving the plunger element 210 (see FIGS. 2A, 11A), comprising the air cylinder plunger 210a (see FIGS. 2A, 11A), from the retracted position 216 (see FIGS. 2A, 11B) to the extended position 218 (see FIGS. 3D, 11A), to assist in pushing and releasing the one or more trimmed portions 280 off the rotatable reel 14 and into the disposal assembly 350 (see FIG. 11A). The one or more trimmed portions 280 are moved, ejected, and/or pushed into the disposal assembly 350, to dispose of and compact the one or more trimmed portions 280 in the receptacle apparatus 352 (see FIGS. 11A-11B), such as a bin 352a (see FIGS. 11A-11B), or another suitable receptacle apparatus, of the disposal assembly 350.

As shown in FIG. 13, the automated removal method 400 may further optionally comprise the step of transferring 412 the one or more trimmed portions 280, comprising one or more non-scrap portions 284 (see FIGS. 7, 9A), wound around the outer circumference 24 of the rotatable reel 14, onto a tool 300 (see FIG. 7), or mold, having a contoured surface 302 (see FIG. 7), by stopping the vacuum flow 108 (see FIGS. 1, 6B), retracting the plurality of retractable vacuum panels 34 and retracting the one or more retractable vacuum pad assemblies 50 away from contact with the one or more trimmed portions 280, so that only the plurality of friction reducing elements 168, such as the plurality of ball bearings 170, are in contact with the one or more trimmed portions 280, and moving the automated removal apparatus 10, so that the one or more trimmed portions 280 are positioned for transfer and release over the contoured surface 302 of the tool 300. The one or more non-scrap portions 284, such as the combination 284c (see FIG. 7) of the non-scrap composite material portion 284a (see FIG. 7) coupled to the non-scrap backing material portion 284b (see FIG. 7), or the non-scrap composite material portion 284a alone, may be transferred, or moved, from the carrier apparatus 346 (see FIGS. 7, 9A, 10) having the flat surface 348 (see FIGS. 7, 9A, 10) to the tool 300, or mold, having the contoured surface 302, by using the automated removal apparatus 10.

Figure 14:
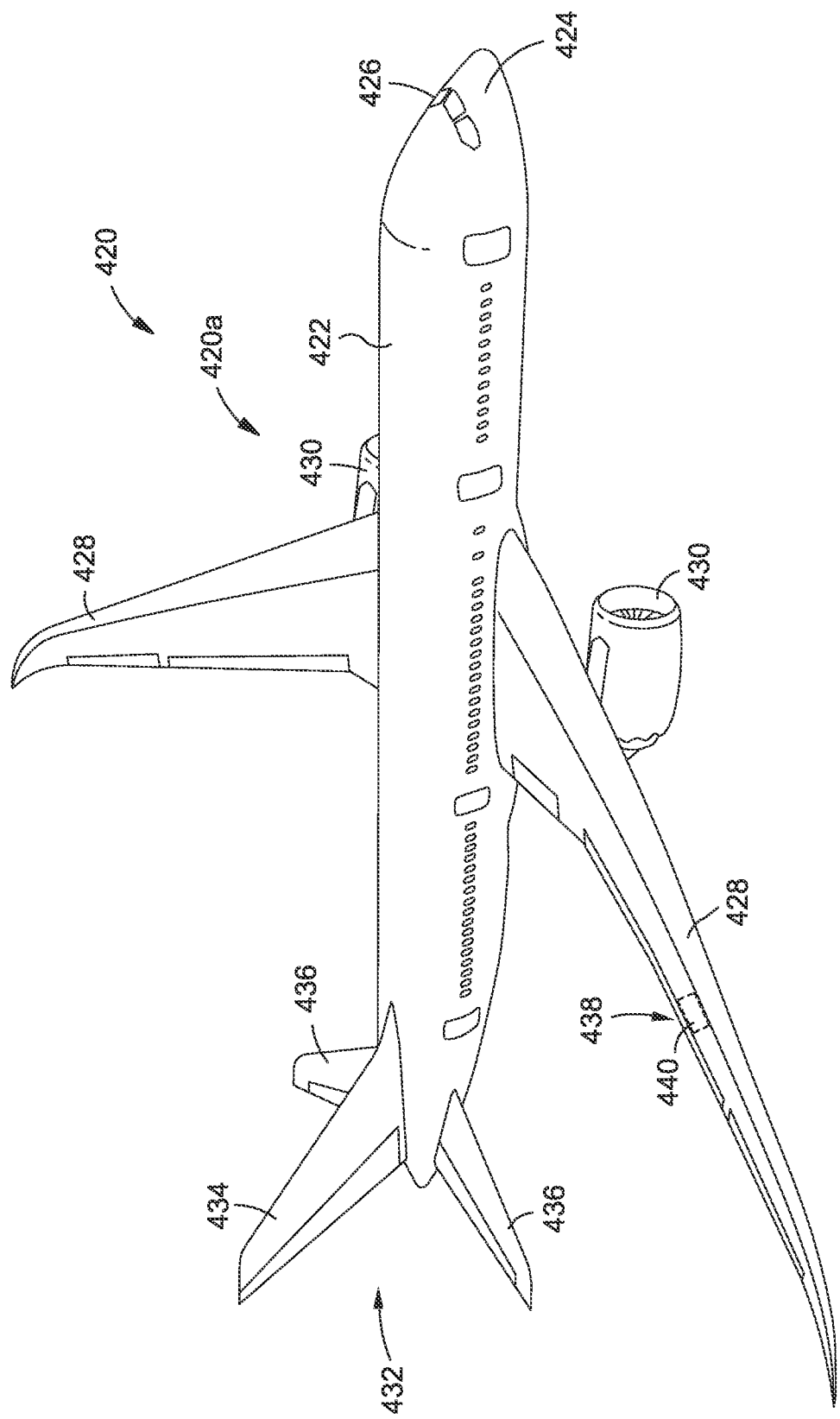
FIG. 14 is an illustration of a perspective view of an aircraft incorporating a composite part made with a ply-by-ply fabrication process using an automated removal apparatus, system, and method of the disclosure.

Now referring to FIG. 14, FIG. 14 is an illustration of a perspective view of an air vehicle 420, such as an aircraft 420a, incorporating a composite part 438 made with a ply-by-ply fabrication process 296 (see FIGS. 7, 8), and using a version of the automated removal apparatus 10 (see FIGS. 1, 2A, 3A), a version of the automated removal system 12 (see FIGS. 7, 9A-9B, 10), and a version of the automated removal method 400 (see FIG. 13) of the disclosure. As shown in FIG. 14, the air vehicle 420, such as the aircraft 420a, includes a fuselage 422, a nose 424, a cockpit 426, wings 428, engines 430, and a tail 432. As shown in FIG. 14, the tail 432 comprises a horizontal stabilizer portion 434 and vertical stabilizer portions 436.

As further shown in FIG. 14, in one version, the composite part 438 comprises a wing panel 440 on a wing 428 of the aircraft 420a. The composite part 438 may also comprise other aircraft composite parts on the wings 428, on the fuselage 422, and/or on the tail 432. For example, in other versions, the composite part 438 may comprise a spar, a stringer, or another suitable composite part for the aircraft 420a. In other versions, the composite part 438 may comprise one incorporated in a rotorcraft, a spacecraft, a satellite, a watercraft, an automobile, a truck, or another suitable composite structure.

Figure 15:
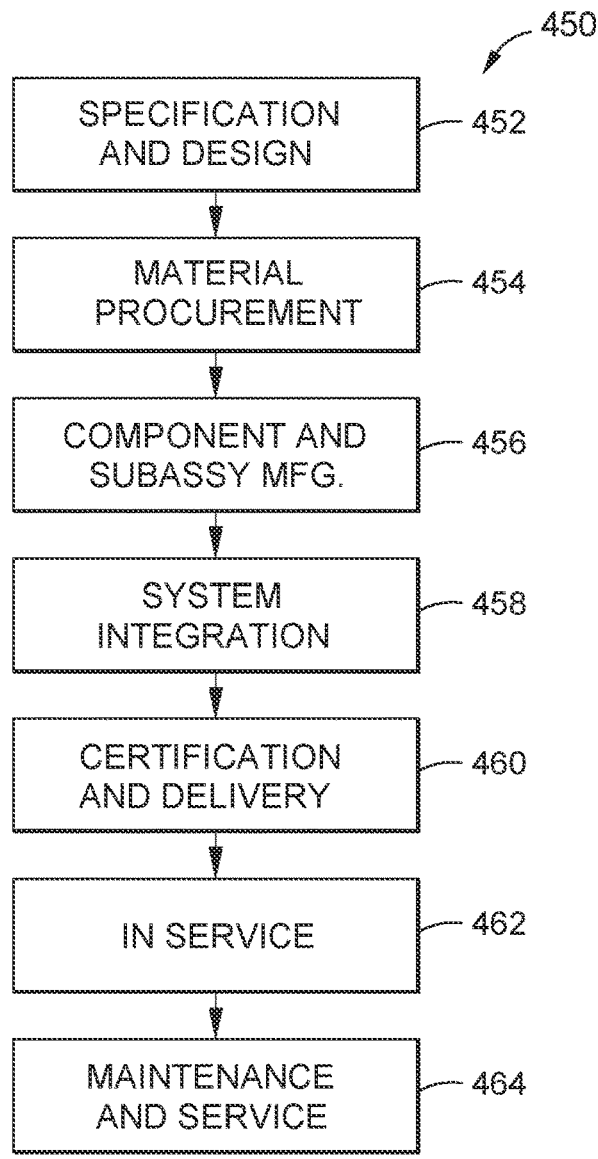
FIG. 15 is an illustration of a flow diagram of an exemplary aircraft manufacturing and service method.
Figure 16:
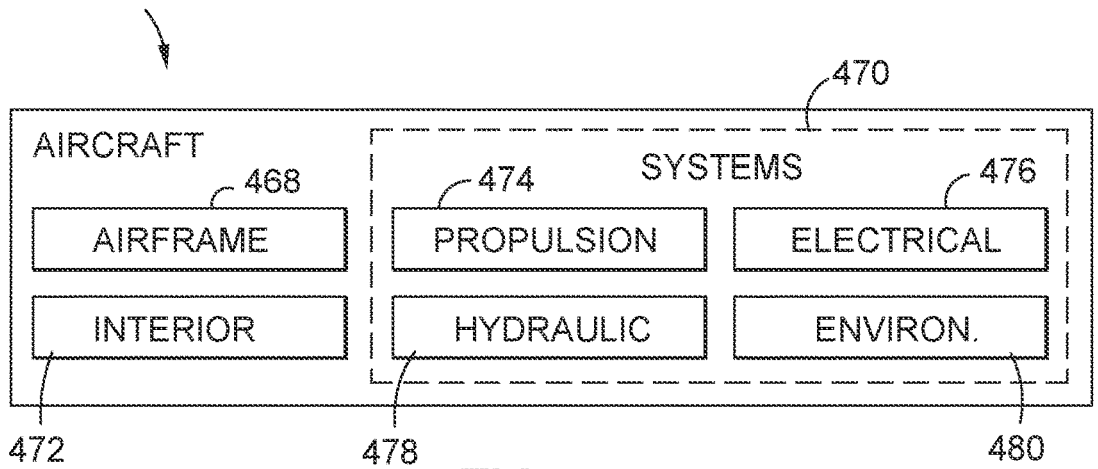
FIG. 16 is an illustration of an exemplary block diagram of an aircraft.

Now referring to FIGS. 15 and 16, FIG. 15 is an illustration of a flow diagram of an exemplary aircraft manufacturing and service method 450, and FIG. 16 is an illustration of an exemplary block diagram of an aircraft 466. Referring to FIGS. 15 and 16, versions of the disclosure may be described in the context of the aircraft manufacturing and service method 450 as shown in FIG. 15, and the aircraft 466 as shown in FIG. 16.

During pre-production, exemplary aircraft manufacturing and service method 450 may include specification and design 452 of the aircraft 466 and material procurement 454. During manufacturing, component and subassembly manufacturing 456 and system integration 458 of the aircraft 466 takes place. Thereafter, the aircraft 466 may go through certification and delivery 460 in order to be placed in service 462. While in service 462 by a customer, the aircraft 466 may be scheduled for routine maintenance and service 464 (which may also include modification, reconfiguration, refurbishment, and other suitable services).

Each of the processes of the aircraft manufacturing and service method 450 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 16, the aircraft 466 produced by the exemplary aircraft manufacturing and service method 450 may include an airframe 468 with a plurality of systems 470 and an interior 472. Examples of the plurality of systems 470 may include one or more of a propulsion system 474, an electrical system 476, a hydraulic system 478, and an environmental system 480. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 450. For example, components or subassemblies corresponding to component and subassembly manufacturing 456 may be fabricated or manufactured in a manner similar to components or subassemblies produced while the aircraft 466 is in service 462. Also, one or more apparatus embodiments, method embodiments, or a combination thereof, may be utilized during component and subassembly manufacturing 456 and system integration 458, for example, by substantially expediting assembly of or reducing the cost of the aircraft 466. Similarly, one or more of apparatus embodiments, method embodiments, or a combination thereof, may be utilized while the aircraft 466 is in service 462, for example and without limitation, to maintenance and service 464.

Disclosed versions of the automated removal apparatus 10 (see FIGS. 1, 2A, 3A, 5), the automated removal system 12 (see FIGS. 7, 9A-9B, 10), and the automated removal method 400 (see FIG. 13) provide for the automated removal of one or more trimmed portions 280 (see FIG. 7) of the laminated ply 294 (see FIG. 7), including scrap portions 282 (see FIG. 7) and non-scrap portions 284 (see FIG. 7), in the ply-by-ply fabrication process 296 (see FIG. 7), such as the composite laminate fabrication process 296a (see FIG. 7) in the manufacture of composite parts 438 (see FIG. 14), such as for aircraft 420a (see FIG. 14), and for other vehicles and structures. Manual removal of the one or more trimmed portions 280 of the laminated ply 294 during the ply-by-ply fabrication process 296 is eliminated, and may result in decreased labor involved in scrap management for each laminated ply 294, decreased time involved in removing and disposing of the scrap portions 282, and overall decreased costs of forming laminates 298 (see FIG. 7), such as composite laminates 298a (see FIG. 7). In addition, by eliminating manual removal of the one or more trimmed portions 280, engagement with and peeling of one or more portions of the net cut ply 290 during removal of the one or more trimmed portions 280, such as the scrap portions 282 from around the net cut ply 290, may be avoided.

Moreover, disclosed versions of the automated removal apparatus 10 (see FIGS. 1, 2A, 3A, 5), the automated removal system 12 (see FIGS. 7, 9A-9B, 10), and the automated removal method 400 (see FIG. 13) provide for a fully automated and programmed scrap removal and non-scrap removal process that is repeatable and adaptable, where the quality of the laminates 298, such as composite laminates 298a, formed is highly repeatable, and in turn, the quality of the composite parts 438 manufactured is highly repeatable. The rotatable reel 14 (see FIG. 2A) of the automated removal apparatus 10 functions as a gripping device 16 (see FIGS. 1, 2A) to grip the one or more trimmed portions 280 (see FIG. 7) around the rotatable reel 14 for removal using a vacuum force 113 (see FIG. 1) generated by a vacuum flow 108 (see FIG. 1) from a Venturi effect in the vacuum generators 250 (see FIGS. 4A-4B), to pull up and hold one or more trimmed portions 280 (see FIG. 7) of the laminated ply 294 (see FIG. 7) around the rotatable reel 14. No separate vacuum tube is required to be attached to the rotatable reel 14 and to a separate vacuum source on the ground, or elsewhere, to pull vacuum. Rather, a vacuum tube 254 (see FIG. 4A) is attached within the interior 20 (see FIG. 2B) of the rotatable reel 14 (see FIGS. 2B, 4A) to the second inlet opening 252b (see FIG. 4A) of the vacuum generator 250 (see FIG. 4A), and the vacuum flow 108 generated by the Venturi effect, discussed above, flows through the vacuum tube 254, through the vacuum channels 107 (see FIGS. 2B, 6B), through the channel openings 106 (see FIG. 4A), and through the one or more retractable vacuum pad assemblies 50, to pull vacuum for one or more of the vacuum pads 58 (see FIGS. 2A, 4A) through one or more vacuum ports 64 (see FIGS. 2A, 4A). By using one valve manifold 232 (see FIG. 4A) and generating the vacuum flow 108 to the vacuum channels 107 and channel openings 106 to each retractable vacuum pad assembly 50, this avoids the costly use of separate dedicated valve manifolds to each retractable vacuum pad assembly 50.

Further, disclosed versions of the automated removal apparatus 10 (see FIGS. 1, 2A, 3A, 5), the automated removal system 12 (see FIGS. 7, 9A-9B, 10), and the automated removal method 400 (see FIG. 13) use only a single source air supply 112b (see FIG. 1) and a single source of vacuum. The plurality of retractable vacuum pad assemblies 50 each include a self-sealing valve 114 that remains in a closed position 124 (see FIG. 2C) until the rotatable reel 14 applies compression to the one or more trimmed portions 280, and causes the self-sealing valve 114 to open to the open position 125 (see FIG. 3B), so that the vacuum flow 108 may flow through the vacuum pads 58 and the vacuum ports 64. Thus, the self-sealing valves 114 of the retractable vacuum pad assemblies 50 control the vacuum flow 108 along sections 280a (see FIG. 5), or contact points, of the one or more trimmed portions 280, such as the scrap portions 282 and the non-scrap portions 284. In other versions, the rotatable reel 14 may use an adhesive 17 (see FIG. 1), or another suitable gripping mechanism, to grip or hold the one or more trimmed portions 280 of the laminated ply 294 around the rotatable reel 14.

The rotatable reel 14 changes diameter or size depending on whether the retractable vacuum panels 34 (see FIG. 2A) and the retractable vacuum pad assemblies 50 (FIG. 2A) are expanded or retracted using air flow 110 (see FIG. 1), such as compressed air flow 110a (see FIG. 1), controlled with the valve manifold 232 (see FIG. 4A), to the plurality of actuator assemblies 130 (see FIGS. 1, 2A), such as the plurality of piston assemblies 132 (see FIGS. 1, 2A), attached to the retractable vacuum panels 34. The rotatable reel 14 may be used with the wheel assembly 278 (see FIG. 5) to separate the scrap backing material portion 282b (see FIG. 5) from the scrap composite material portion 282a (see FIG. 5), and to selectively remove the scrap composite material portion 282a by rolling or winding it up around the rotatable reel 14 for removal, while the wheel assembly 278 holds the scrap backing material portion 282b down. The rolled-up scrap portion 282d (see FIG. 11A) rolled up or wound around the rotatable reel 14 may be removed from the rotatable reel 14 with automated release and disposal into the disposal assembly 350 (see FIG. 11A), and the plunger element 210 (see FIG. 11A) may be used to assist in pushing the rolled-up scrap portion 282d off of the rotatable reel 14. One or more rolled-up scrap portions 282d may be collected and compacted in the disposal assembly 350 for scrap or waste consolidation. This provides for efficient removal of the scrap portions 282 (see FIG. 7) from a factory or manufacturing facility.

In addition, disclosed versions of the automated removal apparatus 10 (see FIGS. 1, 2A, 3A, 5), the automated removal system 12 (see FIGS. 7, 9A-9B, 10), and the automated removal method 400 (see FIG. 13) provide a means of transferring one or more trimmed portions 280 comprising one or more non-scrap portions 284 (see FIG. 7), such as the non-scrap composite material portion 284a (see FIG. 7) in the form of a net cut ply 290 (see FIG. 7) alone, or coupled to the non-scrap backing material portion 284b, from the carrier apparatus 346 (see FIGS. 9A-9B, 10) with the flat surface 348 (see FIGS. 9A-9B, 10) to the tool 300 (see FIG. 7), or mold, having the contoured surface 302 (see FIG. 7). For example, the rotatable reel 14 of the automated removal apparatus 10 rolls up, or winds up, the net cut ply 290 from the flat surface 348 of the carrier apparatus 346, the robot assembly 320 (see FIGS. 9A-9B) moves the rolled-up non-scrap portion 284d (see FIG. 7) on the rotatable reel 14 to the tool 300, or mold, having the contoured surface 302, and the rotatable reel 14 unrolls, or unwinds, and releases the rolled-up non-scrap portion 284d onto the contoured surface 302 of the tool 300, or mold. For example, the net cut plies 290 may be laid up on a flat surface and then transferred to a contoured surface using the rotatable reel 14 of the automated removal apparatus 10.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation.

What is claimed is:

1. An automated removal apparatus for selectively removing one or more trimmed portions of a laminated ply in a ply-by-ply fabrication process, the automated removal apparatus comprising:
   a rotatable reel comprising a plurality of retractable vacuum panels attached around a hub portion of the rotatable reel, each of the plurality of retractable vacuum panels comprising one or more retractable vacuum pad assemblies, each having a vacuum pad with a vacuum port and a self-sealing valve;
   a plurality of actuator assemblies attached to the plurality of retractable vacuum panels;
   a plurality of friction reducing elements attached around the rotatable reel;
   a drive assembly attached to the rotatable reel; and
   a pneumatic system attached to the rotatable reel, the pneumatic system comprising a valve manifold operable to control an air flow to actuate the plurality of actuator assemblies, and operable to control the air flow to one or more vacuum generators to generate a vacuum flow through one or more of the vacuum ports, and the vacuum flow generating a vacuum force configured to pull up and hold the one or more trimmed portions against one or more of the vacuum pads, when the rotatable reel is rotated over the one or more trimmed portions to be removed.

2. The automated removal apparatus of claim 1, further comprising a connector assembly having a first end attached to the drive assembly, and having a second end configured to attach to an automated mechanical arm, the automated mechanical arm configured to hold and position the automated removal apparatus with respect to the one or more trimmed portions to be removed.

3. The automated removal apparatus of claim 2, wherein the automated mechanical arm comprises one of, a robotic arm of a robot, or a gantry robotic arm of a gantry.

4. The automated removal apparatus of claim 1, further comprising a wheel assembly attached to the drive assembly, the wheel assembly extending aft of, and in an offset position to, the rotatable reel.

5. The automated removal apparatus of claim 4, wherein the one or more trimmed portions comprise a scrap composite material portion coupled to a scrap backing material portion, and wherein the wheel assembly is operable to hold down the scrap backing material portion, as the rotatable reel winds the scrap composite material portion around an outer circumference of the rotatable reel for removal.

6. The automated removal apparatus of claim 1, wherein the one or more trimmed portions to be removed with the rotatable reel comprise one of, a scrap composite material portion, a scrap backing material portion, a combination of the scrap composite material portion coupled to the scrap backing material portion, a non-scrap composite material portion, a non-scrap backing material portion, and a combination of the non-scrap composite material portion coupled to the non-scrap backing material portion.

7. The automated removal apparatus of claim 1, wherein the plurality of actuator assemblies comprise a plurality of piston assemblies, each comprising a piston rod, an air cylinder, and a piston lock, connected together in a series configuration.

8. The automated removal apparatus of claim 7, wherein the piston lock is a unidirectional piston lock that allows the piston rod to be compressed and held in a compressed position, and that prevents the piston rod from extending to an extended position, to enable the self-sealing valve to remain in an open position, and to enable the vacuum flow to continue after the one or more trimmed portions are wound around an outer circumference of the rotatable reel, and until the one or more trimmed portions are released from the rotatable reel.

9. The automated removal apparatus of claim 1, wherein the plurality of friction reducing elements comprise a plurality of ball bearings positioned between adjacent pairs of the plurality of retractable vacuum panels, and further wherein, when the plurality of retractable vacuum panels are retracted in a retracted position, the plurality of ball bearings solely contact the one or more trimmed portions wound around an outer circumference of the rotatable reel, to facilitate release of the one or more trimmed portions from around the rotatable reel.

10. The automated removal apparatus of claim 1, further comprising a plunger element coupled to the drive assembly, the plunger element operable to move from a retracted position to an extended position, to assist in moving the one or more trimmed portions off the rotatable reel, when the one or more trimmed portions are released from the rotatable reel.

11. An automated removal system for selectively removing one or more trimmed portions of a laminated ply in a ply-by-ply fabrication process, the automated removal system comprising:
    a robot assembly comprising a robot having a robotic arm, and comprising a control unit, and a power unit;
    a carrier apparatus for carrying the one or more trimmed portions;
    an automated removal apparatus attached to the robot assembly, the automated removal apparatus comprising:
       a rotatable reel comprising a plurality of retractable vacuum panels attached around a hub portion of the rotatable reel, each of the plurality of retractable vacuum panels comprising one or more retractable vacuum pad assemblies, each having a vacuum pad with a vacuum port and a self-sealing valve;
       a plurality of piston assemblies attached to the plurality of retractable vacuum panels;
       a plurality of friction reducing elements attached around the rotatable reel, and positioned between the plurality of retractable vacuum panels;
       a drive assembly attached to the rotatable reel;
       a connector assembly attached between the drive assembly and the robotic arm of the robot; and
       a pneumatic system attached to the rotatable reel, the pneumatic system comprising a valve manifold operable to control an air flow to actuate the plurality of piston assemblies, and operable to control the air flow to one or more vacuum generators to generate a vacuum flow through one or more of the vacuum ports, and the vacuum flow generating a vacuum force configured to pull up and hold the one or more trimmed portions against one or more of the vacuum pads, when the rotatable reel is rotated over the one or more trimmed portions to be removed.

12. The automated removal system of claim 11, further comprising at least one disposal assembly, to collect and to compact the one or more trimmed portions removed from the rotatable reel of the automated removal apparatus.

13. The automated removal system of claim 11, wherein the automated removal apparatus further comprises a wheel assembly attached to the drive assembly, the wheel assembly extending aft of, and in an offset position to, the rotatable reel.

14. The automated removal system of claim 11, wherein the one or more trimmed portions to be removed with the rotatable reel comprise one of, a scrap composite material portion, a scrap backing material portion, a combination of the scrap composite material portion coupled to the scrap backing material portion, a non-scrap composite material portion, a non-scrap backing material portion, and a combination of the non-scrap composite material portion coupled to the non-scrap backing material portion.

15. An automated removal method for selectively removing one or more trimmed portions of a laminated ply in a ply-by-ply fabrication process, the automated removal method comprising the steps of:

positioning an automated removal apparatus over the one or more trimmed portions of the laminated ply, to be removed, in the ply-by-ply fabrication process, the automated removal apparatus comprising:

a rotatable reel comprising a plurality of retractable vacuum panels attached around a hub portion of the rotatable reel, each of the plurality of retractable vacuum panels comprising one or more retractable vacuum pad assemblies, each having a vacuum pad with a vacuum port and a self-sealing valve;

a plurality of actuator assemblies attached to the plurality of retractable vacuum panels;

a plurality of friction reducing elements attached around the rotatable reel;

a drive assembly attached to the rotatable reel;

a connector assembly attached to the drive assembly; and a pneumatic system attached to the rotatable reel, the pneumatic system comprising a valve manifold operable to control an air flow to actuate the plurality of actuator assemblies, and operable to control the air flow to one or more vacuum generators to generate a vacuum flow through one or more of the vacuum ports;

rotating the rotatable reel, via the drive assembly, onto the one or more trimmed portions to be removed, wherein piston rods of the plurality of actuator assemblies are in an extended position, to extend the plurality of retractable vacuum panels and the one or more retractable vacuum pad assemblies;

compressing the one or more retractable vacuum pad assemblies against the one or more trimmed portions, to cause the self-sealing valve to open to an open position from a closed position, for each vacuum pad of the one or more retractable vacuum pad assemblies that is compressed, and to apply a vacuum force from the vacuum flow, to pull up and hold a section of the one or more trimmed portions against the vacuum pad; and winding the one or more trimmed portions, held by the vacuum force, around an outer circumference of the rotatable reel for removal.

16. The automated removal method of claim 15, further comprising the step of releasing the one or more trimmed portions, comprising one or more scrap portions, wound around the outer circumference of the rotatable reel, into a disposal assembly, by stopping the vacuum flow, retracting the one or more retractable vacuum pad assemblies away from contact with the one or more trimmed portions, so that only the plurality of friction reducing elements are in contact with the one or more trimmed portions, and moving the automated removal apparatus, so that the one or more trimmed portions are positioned for release over the disposal assembly.

17. The automated removal method of claim 16, wherein releasing the one or more trimmed portions wound around the outer circumference of the rotatable reel into the disposal assembly, further comprises moving a plunger element coupled to the drive assembly, from a retracted position to an extended position, to assist in pushing and releasing the one or more trimmed portions off the rotatable reel and into the disposal assembly.

18. The automated removal method of claim 15, further comprising the step of transferring the one or more trimmed portions, comprising one or more non-scrap portions, wound around the outer circumference of the rotatable reel, onto a tool having a contoured surface, by stopping the vacuum flow, retracting the one or more retractable vacuum pad assemblies away from contact with the one or more trimmed portions, so that only the plurality of friction reducing elements are in contact with the one or more trimmed portions, and moving the automated removal apparatus, so that the one or more trimmed portions are positioned for transfer and release over the contoured surface of the tool.

19. The automated removal method of claim 15, wherein positioning the automated removal apparatus over the one or more trimmed portions to be removed, further comprises positioning the automated removal apparatus using an automated mechanical arm having a first end attached to the connector assembly, the automated mechanical arm comprising one of, a robotic arm of a robot, or a gantry robotic arm of a gantry.

20. The automated removal method of claim 15, wherein positioning the automated removal apparatus, further comprises positioning the automated removal apparatus further comprising a wheel assembly attached to the drive assembly, and extending aft of, and in an offset position to, the rotatable reel, and further wherein the one or more trimmed portions comprise a combination of a scrap composite material portion coupled to a scrap backing material portion, and the wheel assembly is operable to hold down the scrap backing material portion, to separate the scrap backing material portion from the scrap composite material portion being wound around the outer circumference of the rotatable reel for removal.

* * * * *